(12) United States Patent
Martin et al.

(10) Patent No.: US 9,361,069 B2
(45) Date of Patent: Jun. 7, 2016

(54) SYSTEMS AND METHODS FOR DEFINING A SIMULATED INTERACTIVE WEB PAGE

(71) Applicant: iRise, El Segundo, CA (US)

(72) Inventors: Maurice Martin, Hermosa Beach, CA (US); Stephen Brickley, Hermosa Beach, CA (US); Leon Amdour, Los Angeles, CA (US); Alex Kravets, Marina del Rey, CA (US); Brian Fan, Irvine, CA (US); Dominic Infante, Redondo Beach, CA (US); Stuart Larking, Redondo Beach, CA (US); Paul Aldama, Los Angeles, CA (US); Brian Russell, Malibu, CA (US)

(73) Assignee: iRise, El Segundo, CA (US)

( * ) Notice: Subject to any disclaimer, the term of this patent is extended or adjusted under 35 U.S.C. 154(b) by 54 days.

(21) Appl. No.: 14/518,702

(22) Filed: Oct. 20, 2014

(65) Prior Publication Data

US 2015/0040097 A1 Feb. 5, 2015

Related U.S. Application Data

(63) Continuation of application No. 14/339,706, filed on Jul. 24, 2014, which is a continuation of application No. 13/856,137, filed on Apr. 3, 2013, which is a continuation of application No. 11/671,331, filed on (Continued)

(51) Int. Cl.
*G06F 9/44* (2006.01)
*G06F 9/45* (2006.01)
(Continued)

(52) U.S. Cl.
CPC ............... *G06F 8/20* (2013.01); *G06F 3/0484* (2013.01); *G06F 3/04842* (2013.01); *G06F 8/10* (2013.01);
(Continued)

(58) Field of Classification Search
CPC ............. G06F 8/10; G06F 8/20; G06F 9/455; G06F 8/51
USPC ........................................................ 717/104
See application file for complete search history.

(56) References Cited

U.S. PATENT DOCUMENTS 4,347,565 A 8/1982 Kaneda et al.
4,730,258 A 3/1988 Takeda et al.
(Continued)

FOREIGN PATENT DOCUMENTS

EP 0 476 533 A2 3/1992
EP 0622729 A2 11/1994
(Continued)

OTHER PUBLICATIONS

Prague, Cary, and Irwin, Michael, Access 2002 Bible, Wiley, pp. i, ii, xvi, xvii, 3-7, 23-25, 42-48, 55-60, 64, 65, 119, 241, 24-9267, 326-330, 393-421, 429-443, 483, 484, 512, 519-522, 531-533, 696-714, 738-740, 742, 818, 819, 897-904, 909-939, 941-947, 970-972, 1024, 1025, 1049-1065, 1126, 1127, 1179-1271 (2001).*

(Continued)

*Primary Examiner* — Doon Chow
*Assistant Examiner* — Conrad Pack
(74) *Attorney, Agent, or Firm* — Knobbe, Martens, Olson & Bear LLP

(57) ABSTRACT

The system includes a novel software application interactive representation modeling language, a software application (82) operative to use the modeling language to create, read and modify interactive representation models of the proposed applications, a memory (86) to store requirement data and interactive representation model data, a software application (92) operative to read and update the interactive representation model data across a computer network, a software application (76) operative to maintain a record of the requirements and to administer operation of the system, a software application (78) operative to render interactive representations of the proposed applications in browser readable format, a software application (82) operative to allow multiple instances of other applications to access interactive representation data and requirement data residing in the memory and a software application (84) operative to allow an individual user's interactions with the system to be broadcast across a networked system to other users.

1 Claim, 29 Drawing Sheets

Related U.S. Application Data

Feb. 5, 2007, now abandoned, which is a continuation of application No. 10/763,080, filed on Jan. 22, 2004, now Pat. No. 7,174,286, which is a continuation of application No. PCT/US02/23816, filed on Jul. 26, 2002.

(60) Provisional application No. 60/308,052, filed on Jul. 26, 2001.

(51) Int. Cl.
  G06F 9/455 (2006.01)
  G06F 3/0484 (2013.01)
  G06F 17/22 (2006.01)
  H04L 12/18 (2006.01)

(52) U.S. Cl.
  CPC ........ *G06F 8/51* (2013.01); *G06F 9/455* (2013.01); *G06F 17/2247* (2013.01); *H04L 12/1813* (2013.01); *Y10S 707/99945* (2013.01); *Y10S 707/99948* (2013.01)

(56) References Cited

U.S. PATENT DOCUMENTS

| | | | |
|---|---|---|---|
| 5,008,853 A | 4/1991 | Bly et al. | |
| 5,019,961 A * | 5/1991 | Addesso | G06F 17/5022 700/87 |
| 5,041,992 A | 8/1991 | Cunningham et al. | |
| 5,187,788 A | 2/1993 | Marmelstein | |
| 5,247,650 A | 9/1993 | Judd et al. | |
| 5,247,651 A | 9/1993 | Clarisse | |
| 5,255,360 A | 10/1993 | Peaslee et al. | |
| 5,261,100 A | 11/1993 | Fujinami | |
| 5,265,254 A | 11/1993 | Blasciak et al. | |
| 5,269,014 A | 12/1993 | Ogino | |
| 5,297,238 A | 3/1994 | Wang et al. | |
| 5,301,301 A | 4/1994 | Kodosky et al. | |
| 5,313,575 A | 5/1994 | Beethe | |
| 5,323,452 A | 6/1994 | Dickman et al. | |
| 5,325,534 A | 6/1994 | Galy et al. | |
| 5,416,900 A | 5/1995 | Blanchard et al. | |
| 5,420,978 A | 5/1995 | Tozawa et al. | |
| 5,428,729 A | 6/1995 | Chang et al. | |
| 5,446,842 A | 8/1995 | Schaeffer et al. | |
| 5,473,754 A | 12/1995 | Folwell et al. | |
| 5,560,014 A | 9/1996 | Imamura | |
| 5,564,048 A | 10/1996 | Eick et al. | |
| 5,566,291 A | 10/1996 | Boulton et al. | |
| 5,572,430 A | 11/1996 | Akasaka et al. | |
| 5,581,677 A | 12/1996 | Myers et al. | |
| 5,589,856 A | 12/1996 | Stein et al. | |
| 5,598,359 A | 1/1997 | Montag et al. | |
| 5,610,828 A | 3/1997 | Kodosky et al. | |
| 5,630,081 A | 5/1997 | Rybicki | |
| 5,675,753 A * | 10/1997 | Hansen | G06F 8/34 707/999.102 |
| 5,689,286 A | 11/1997 | Wugofski | |
| 5,715,432 A | 2/1998 | Xu et al. | |
| 5,734,915 A * | 3/1998 | Roewer | G06F 3/04845 715/202 |
| 5,745,712 A | 4/1998 | Turpin et al. | |
| 5,745,738 A | 4/1998 | Ricard | |
| 5,748,188 A | 5/1998 | Hu et al. | |
| 5,754,738 A | 5/1998 | Saucedo et al. | |
| 5,764,992 A | 6/1998 | Kullick et al. | |
| 5,771,370 A | 6/1998 | Klein | |
| 5,793,368 A | 8/1998 | Beer | |
| 5,838,948 A | 11/1998 | Bunza | |
| 5,860,004 A | 1/1999 | Fowlow et al. | |
| 5,911,059 A | 6/1999 | Profit, Jr. | |
| 5,917,730 A | 6/1999 | Rittie et al. | |
| 5,926,176 A | 7/1999 | McMillan et al. | |
| 5,949,999 A | 9/1999 | Song et al. | |
| 5,960,182 A | 9/1999 | Matsuoka et al. | |
| 5,960,411 A | 9/1999 | Hartman et al. | |
| 5,978,811 A | 11/1999 | Smiley | |
| 5,986,654 A | 11/1999 | Alexander et al. | |
| 5,991,533 A | 11/1999 | Sano et al. | |
| 5,991,535 A | 11/1999 | Fowlow et al. | |
| 6,034,681 A | 3/2000 | Miller et al. | |
| 6,038,567 A | 3/2000 | Young | |
| 6,046,740 A | 4/2000 | LaRoche et al. | |
| 6,047,314 A | 4/2000 | Pommier et al. | |
| 6,063,128 A | 5/2000 | Bentley et al. | |
| 6,071,316 A | 6/2000 | Goossen et al. | |
| 6,092,081 A | 7/2000 | Alpert et al. | |
| 6,167,395 A * | 12/2000 | Beck | G06F 17/30017 |
| 6,167,564 A | 12/2000 | Fontana et al. | |
| 6,177,942 B1 | 1/2001 | Keong et al. | |
| 6,182,116 B1 | 1/2001 | Namma et al. | |
| 6,188,400 B1 | 2/2001 | House et al. | |
| 6,189,142 B1 | 2/2001 | Johnston et al. | |
| 6,199,193 B1 | 3/2001 | Oyagi et al. | |
| 6,205,412 B1 | 3/2001 | Barskiy et al. | |
| 6,212,672 B1 | 4/2001 | Keller et al. | |
| 6,215,502 B1 | 4/2001 | Ferguson | |
| 6,219,065 B1 | 4/2001 | Mashita et al. | |
| 6,225,998 B1 | 5/2001 | Okita et al. | |
| 6,237,004 B1 | 5/2001 | Dodson et al. | |
| 6,243,092 B1 | 6/2001 | Okita et al. | |
| 6,247,032 B1 | 6/2001 | Bernardo et al. | |
| 6,259,445 B1 | 7/2001 | Hennum et al. | |
| 6,275,223 B1 | 8/2001 | Hughes | |
| 6,289,502 B1 | 9/2001 | Garland et al. | |
| 6,292,187 B1 | 9/2001 | Gibbs et al. | |
| 6,330,007 B1 | 12/2001 | Isreal et al. | |
| 6,385,765 B1 | 5/2002 | Cleaveland et al. | |
| 6,397,117 B1 | 5/2002 | Burrows et al. | |
| 6,405,364 B1 | 6/2002 | Bowman-Amuah | |
| 6,408,263 B1 | 6/2002 | Summers | |
| 6,434,607 B1 | 8/2002 | Haverstock et al. | |
| 6,463,460 B1 | 10/2002 | Simonoff | |
| 6,502,233 B1 | 12/2002 | Vaidyanathan et al. | |
| 6,507,848 B1 | 1/2003 | Crosby et al. | |
| 6,518,979 B1 | 2/2003 | Spertus et al. | |
| 6,564,368 B1 | 5/2003 | Beckett et al. | |
| 6,591,271 B1 | 7/2003 | Ceri et al. | |
| 6,604,068 B1 | 8/2003 | Bukowski et al. | |
| 6,634,008 B1 | 10/2003 | Dole | |
| 6,668,369 B1 | 12/2003 | Krebs et al. | |
| 6,681,383 B1 | 1/2004 | Pastor et al. | |
| 6,715,130 B1 | 3/2004 | Eiche et al. | |
| 6,725,399 B1 | 4/2004 | Bowman | |
| 6,741,265 B2 | 5/2004 | Ghosh et al. | |
| 6,762,777 B2 | 7/2004 | Carroll | |
| 6,792,608 B1 | 9/2004 | Theeten | |
| 6,802,055 B2 | 10/2004 | Jade et al. | |
| 6,816,914 B1 | 11/2004 | Heinzman et al. | |
| 6,832,270 B2 | 12/2004 | Das Sharma et al. | |
| 6,859,451 B1 | 2/2005 | Pasternack et al. | |
| 6,868,370 B1 | 3/2005 | Burbridge et al. | |
| 6,880,126 B1 | 4/2005 | Bahrs et al. | |
| 6,907,546 B1 | 6/2005 | Haswell et al. | |
| 6,944,584 B1 | 9/2005 | Tenney et al. | |
| 6,945,780 B2 | 9/2005 | Perry | |
| 6,959,268 B1 | 10/2005 | Myers Jr. et al. | |
| 6,965,800 B2 | 11/2005 | Schmit et al. | |
| 6,966,049 B2 | 11/2005 | Lepejian et al. | |
| 6,968,539 B1 | 11/2005 | Huang et al. | |
| 6,970,813 B1 | 11/2005 | Houlding et al. | |
| 6,971,065 B2 | 11/2005 | Austin | |
| 6,975,976 B1 | 12/2005 | Casavant et al. | |
| 6,983,227 B1 | 1/2006 | Thalhammer-Reyero | |
| 7,000,220 B1 | 2/2006 | Booth | |
| 7,139,686 B1 | 11/2006 | Critz et al. | |
| 7,146,615 B1 | 12/2006 | Hervet et al. | |
| 7,174,286 B2 | 2/2007 | Martin et al. | |
| 7,194,489 B2 | 3/2007 | Bentley et al. | |
| 7,194,679 B1 * | 3/2007 | Green | G06F 17/2247 707/E17.116 |
| 7,349,837 B2 | 3/2008 | Martin et al. | |
| 7,451,403 B1 | 11/2008 | Srinivasan et al. | |
| 7,577,907 B2 | 8/2009 | Vishnia-Shabtai et al. | |

(56) References Cited

U.S. PATENT DOCUMENTS

| | | |
|---|---|---|
| 7,594,181 B2 | 9/2009 | Rothwein et al. |
| 7,757,207 B2 | 7/2010 | Van et al. |
| 7,861,158 B2 | 12/2010 | Martin et al. |
| 7,873,591 B2 | 1/2011 | Mital et al. |
| 8,209,378 B2 | 6/2012 | Allen et al. |
| 8,352,966 B2 | 1/2013 | Clayton et al. |
| 8,418,070 B2 | 4/2013 | Mayer-Ullmann |
| 2001/0002834 A1 | 6/2001 | Mashita et al. |
| 2001/0024211 A1 | 9/2001 | Kudukoli et al. |
| 2001/0027456 A1 | 10/2001 | Lancaster et al. |
| 2001/0035879 A1 | 11/2001 | Washington et al. |
| 2002/0010739 A1 | 1/2002 | Ferris et al. |
| 2002/0032699 A1 | 3/2002 | Edwards et al. |
| 2002/0032900 A1 | 3/2002 | Charisius et al. |
| 2002/0049787 A1* | 4/2002 | Keely ............... G06F 17/211 715/205 |
| 2002/0054051 A1 | 5/2002 | Ladd |
| 2002/0059054 A1* | 5/2002 | Bade ............... G06F 17/5022 703/20 |
| 2002/0060566 A1 | 5/2002 | Debbins et al. |
| 2002/0065645 A1 | 5/2002 | Wall et al. |
| 2002/0066073 A1* | 5/2002 | Lienhard ............. G06F 8/34 717/105 |
| 2002/0083413 A1 | 6/2002 | Kodosky et al. |
| 2002/0085020 A1 | 7/2002 | Carroll, Jr. |
| 2002/0108101 A1 | 8/2002 | Charisius et al. |
| 2002/0109717 A1 | 8/2002 | Li et al. |
| 2002/0112225 A1 | 8/2002 | Charisius et al. |
| 2002/0120921 A1 | 8/2002 | Coburn et al. |
| 2002/0130834 A1 | 9/2002 | Madarasz et al. |
| 2002/0145627 A1 | 10/2002 | Whitmarsh et al. |
| 2002/0149629 A1 | 10/2002 | Craycroft et al. |
| 2002/0163535 A1 | 11/2002 | Mitchell et al. |
| 2002/0180783 A1 | 12/2002 | Broussard |
| 2002/0180784 A1 | 12/2002 | Broussard |
| 2002/0191027 A1 | 12/2002 | Morrow et al. |
| 2002/0196282 A1 | 12/2002 | Washington et al. |
| 2002/0196283 A1 | 12/2002 | Petruk et al. |
| 2003/0023527 A1 | 1/2003 | Wilce et al. |
| 2003/0035005 A1 | 2/2003 | Kodosky et al. |
| 2003/0035009 A1 | 2/2003 | Kodosky et al. |
| 2003/0038842 A1 | 2/2003 | Peck et al. |
| 2003/0184585 A1 | 10/2003 | Lin et al. |
| 2004/0015849 A1 | 1/2004 | Sanchez, II |
| 2004/0021679 A1 | 2/2004 | Chapman et al. |
| 2004/0030516 A1 | 2/2004 | Dunhill et al. |
| 2004/0117759 A1 | 6/2004 | Rippert, Jr. et al. |
| 2004/0123272 A1 | 6/2004 | Bailey et al. |
| 2004/0133509 A1 | 7/2004 | McCoy et al. |
| 2004/0133596 A1 | 7/2004 | Fujita et al. |
| 2004/0216044 A1 | 10/2004 | Martin et al. |
| 2004/0216045 A1 | 10/2004 | Martin et al. |
| 2004/0221238 A1 | 11/2004 | Cifra et al. |
| 2004/0221256 A1 | 11/2004 | Martin et al. |
| 2005/0004789 A1 | 1/2005 | Summers |
| 2005/0075966 A1 | 4/2005 | Duka |
| 2005/0102632 A1 | 5/2005 | Klinger et al. |
| 2007/0283243 A1 | 12/2007 | Beiser et al. |
| 2008/0082627 A1 | 4/2008 | Allen et al. |
| 2010/0257196 A1 | 10/2010 | Waters et al. |
| 2011/0214078 A1 | 9/2011 | Klask et al. |

FOREIGN PATENT DOCUMENTS

| | | |
|---|---|---|
| EP | 0 909 070 A2 | 4/1999 |
| JP | 06-083936 | 3/1994 |
| JP | 08-171484 | 7/1996 |
| JP | 10-260961 | 9/1998 |
| WO | WO 85/05204 | 11/1985 |
| WO | WO 92/11724 | 7/1992 |
| WO | WO 96/16379 | 5/1996 |
| WO | WO 99/08182 | 2/1999 |
| WO | WO 99/27443 | 6/1999 |
| WO | WO 00/28397 | 5/2000 |
| WO | WO01/33344 | 5/2001 |
| WO | WO01/44932 | 6/2001 |

OTHER PUBLICATIONS

AppWatcher—A Version Control Utility for Microsoft Access, DatabaseCreations, Inc., available at https://web.archive.org/web/20011024094059/http://secure.necaweb.com/caryp-cgi/hazel.cgi?action=serve&item=appwatcher.htm (archived Oct. 24, 2001).*

Prague, Cary, and Irwin, Michael, Access 2002 Bible, Wiley, pp. i, ii, xvi, xvii, 3-7, 23-25, 42-49, 55-60, 64, 65, 90-93, 119, 129-134, 141-144, 205-209, 228-230, 241, 249-267, 295-313, 326-330, 393-421, 429-446, 462, 463, 483-489, 512, 519-522, 531-533, 623-654, 696-714, 738-740, 742, 818, 819, 897-904, 909-947, 970-972, 1024, 1025, 1049-1065.*

Alison Balter; *Mastering Microsoft Access 2000 Development* (Sams Publishing, 1999), pp. 21-29, 118-169, 275-281, 430-496, 592, and 1100-1106.

Axure Software Solutions, Inc., Defendant Axure Software's Preliminary Invalidity Contentions for U.S. Pat. No. 7,349,837, Feb. 24, 2009, Case No. 2:08-cv-03601 SJO (JWJx), United State District Court, Central District of California, Western Division, Hon. S. James Otero; pp. 1-9.

Axure Software Solutions, Inc., Preliminary Invalidity Contentions Exhibit A; pp. 1-54.

Axure Software Solutions, Inc., Preliminary Invalidity Contentions Exhibit B; pp. 1-58.

Axure Software Solutions, Inc., Preliminary Invalidity Contentions Exhibit C; pp. 1-59.

Axure Software Solutions, Inc., Preliminary Invalidity Contentions Exhibit D; pp. 1-20.

Boy, G., "Active Design Documents," *Proceedings of the Conference on Designing Interactive Systems Processes, Practices, Methods, and Techniques, DIS '97*, Jan. 1997, pp. 31-36.

Canadian Intellectual Property Office; Office Action dated Aug. 3, 2010, from related Canadian application No. 2,704,080.

Canadian Intellectual Property Office; Office Action dated Dec. 6, 2011, from related application Canadian Patent Application No. 2,704,294.

Canadian Intellectual Property Office; Office Action dated Jul. 30, 2010, from related Canadian application No. 2,704,252.

Canadian Intellectual Property Office; Office Action dated Nov. 22, 2010 from related Canadian application No. 2,704,294.

Danny Goodman, Dynamic HTML: The Definitive Reference, Jul. 1998, O'Reilly, Chapter 8.

David A. Edson, Visio 2000 Technical Articles: Using Visio as a Forms Tool: Checkbook Example [online], Dec. 1999 [retrieved on Feb. 24, 2009], Microsoft Corporation, Retrieved from the Internet: <http://msdn.microsoft.com/en-us/library/aa140249(office.10,printer).aspx>, pp. 1-6.

Ed Bott and Ron Person, Special Edition Using Windows 95 with Internet Explorer 4.0, Feb. 17, 1998, Que, Chapter 22.

European Patent Office; Decision to refuse a European Patent Application dated Jun. 19, 2013 of Related European Application, Application No. 02752592.2.

European Patent Office; Extended Search Report dated Mar. 26, 2013 of Related European Application, Application No. 10010665.7.

European Patent Office; Extended Search Report dated Oct. 15, 2012 of Related European Application, Application No. 10010666.5.

European Patent Office; Extended Search Report of Related European Application, Application No. 10010666.5.

European Patent Office; Office Action dated Aug. 8, 2012 of Related European Application, Application No. 02752592.2.

European Patent Office; Office Action dated Jul. 9, 2013 of Related European Application, Application No. 10010666.5.

European Patent Office; Office Action dated Sep. 27, 2005 of Related European Application, Application No. 02752592.2.

European Patent Office; Search Report dated Mar. 11, 2013 of Related European Application, Application No. 10010664.0.

European Patent Office; Summons to attend oral proceedings pursuant to Rule 115(1) EPC dated Mar. 7, 2013 of Related European Application, Application No. 02752592.2.

(56) References Cited

OTHER PUBLICATIONS

Examiner's Answer in U.S. Appl. No. 10/484,541 (filed: Jan. 22, 2004); dated Aug. 10, 2007; USPTO.
Gregg Keizer; *Demo It Without Being There*; PC Magazine; vol. 14, No. 7 (Apr. 11, 1995), pp. 46.
Grundy, J., Engineering Component-Based, User-Configurable Collaborative Editing Systems; *Proceedings of the IFIP TC2/TC13 WG2.7/WG13.4 Seventh Working Conference on Engineering for Human-Computer Interaction*; 1999; pp. 111-128.
Grundy, J., Human Interaction Issues for User-Configurable Collaborative Editing Components; *Computer Human Interaction*, 1998. Proceedings. 3rd Asia Pacific Shonan Village Center, Japan Jul. 15-17, 1998.
Grundy, John; Engineering Component-Based, User-Configurable Collaborative Editing Systems; Proceedings of the IFIP TC2/TC13 WG2.7NVG13.4 Seventh Working Conference on Engineering for Human-Computer Interaction; 1999; pp. 111-128.
Grundy, John; Human Interaction Issues for User-Configurable Collaborative Editing Components; Computer Human Interaction, 1998. Proceedings. 3rd Asia Pacific Shonan Village Center, Japan Jul. 15-17, 1998.
HTML 4.01 Specification—Forms in HTML Documents, World Wide Web Consortium, available at http://web.archive.org/web/20000816154958/http://www.w3.org/TR/html4/interact/forms.html (archived Aug. 16, 2000).
John Hedtke and Elisabeth Knottingham; *Visio 2000: The Official Guide* (California, McGraw-Hill, 2000), pp. vi-xii, 293-296, 326-331, 354-356, and 358-359.
John L. Viescas; *Running Microsoft Access 2000* (Washington, Microsoft Press, 1999), pp. 81-82.
Koshizuka, et al.; "Windows Real-Objects: A Distributed Shared Memory for Distributed Implementations of GUI Applications"; ACM; 1993.
Leu, et al; X Window Based Group Collaborative Editing System; Information And Software Technology, Elsevier, Amsterdam; vol. 35, No. 11-12, pp. 639-646; Nov. 1, 1993.
Microsoft Corporation, Visio 2000 in Large Organization [online], Apr. 1, 2000 [retrieved on Feb. 24, 2009], Microsoft Corporation, Retrieved from the Internet<http://technet.microsoft.com/en-US/library/cc751331(printer).aspx>, pp. 1-9.
Microsoft Corporation, Visio 2000 Technical Articles: Basic Shapes Development [online], Oct. 2000 [retrieved on Feb. 24, 2009], Microsoft Corporation, Retrieved from the Internet: <http://msdn.microsoft.com/en-us/library/aa140248(office.10,printer).aspx>, pp. 1-13.
Microsoft Corporation; *Building Applications for Microsoft Access* (Washington, Microsoft Corporation, 1994), pp. 58.
Microsoft Corporation; *Microsoft Access User's Guide* (Washington, Microsoft Corporation, 1994), pp. iii-x, 325-327, 342, 353-361, 369-370, 372, 390-391, 404-405, 792-793, 802, and 807.
Microsoft Corporation; *Step by Step Microsoft Access 2000* (Washington, Microsoft Press, 1999) pp. iii-x, 81-86, and 291-292.
Minor Sten, et al.; A Model for Semi-(a)Synchronous Collaborative Editing; Proceedings of the Third European Conference on Computer-Supported Cooperative Work Sep. 13-17, 1993; vol. 14, pp. 219-231.
Minor, S., et al.; A Model for Semi-(a)Synchronous Collaborative Editing; Proceedings of the Third European Conference on Computer-Supported Cooperative Work Sep. 13-17, 1993; vol. 14, pp. 219-231.
Nabavi, R.; "APL Windowing Systems—Where Next?"; ACM; 1989.
Nystrom M. et al., "A Method for Specification of Graphical User Interfaces by Prototyping (Master Thesis, Lulea University of Technology)", Examensarbete, Nov. 1995, 42 pages.
Office Action of U.S. Appl. No. 10/484,541 (filed: Jan. 22, 2004); Jun. 28, 2006; USPTO.
Office Action of U.S. Appl. No. 10/762,428 (filed: Jan. 22, 2004); May 23, 2007; USPTO.
Office Action of U.S. Appl. No. 10/763,012 (filed: Jan. 22, 2004); May 17, 2007; USPTO.
Office Action of U.S. Appl. No. 10/763,080 (filed: Jan. 22, 2004); Aug. 29, 2006; USPTO.
PCT International Search Report dated Nov. 29, 2002 from PCT/US02/23816.
Ron Bel Bruno; *Captivating presentations (Lifeboat Publishing's Dan Bricklin's demo-it presentation software)*; Windows Magazine; vol. 6, No. 5 (May 1995), pp. 150.
Sung, et al.; "A Top-Down Approach to Teaching Introductory Computer Graphics"; ACM; 2003.
Unknown, Cover Art for Dan Bricklin's demo-it! Version 2.0 software; LIFEBOAT Publishing; Shrewsbury, New Jersey; date unknown.
USPTO, Advisory Action dated Apr. 21, 2008, from related application U.S. Appl. No. 10/763,012 (filed Jan. 22, 2004).
USPTO, Office Action dated Aug. 29, 2006, from related application U.S. Appl. No. 10/763,080 (filed Jan. 22, 2004).
USPTO, Office Action dated Jan. 12, 2007, from related application U.S. Appl. No. 10/484,541 (filed Jan. 22, 2004).
USPTO, Office Action dated Jun. 28, 2006, from related application U.S. Appl. No. 10/484,541 (filed Jan. 22, 2004).
USPTO, Office Action dated May 17, 2007, from related application U.S. Appl. No. 10/763,012 (filed Jan. 22, 2004).
USPTO, Office Action dated May 23, 2007, from related application U.S. Appl. No. 10/762,428 (filed Jan. 22, 2004).
USPTO, Office Action dated Sep. 29, 2008, from related application U.S. Appl. No. 10/763,012 (filed Jan. 22, 2004).
USPTO, Supplemental Notice of Allowability dated Feb. 13, 2008, from related application U.S. Appl. No. 10/762,428 (filed Jan. 22, 2004).
USPTO; Examiner's Answer in U.S. Appl. No. 10/484,541 (filed: Jan. 22, 2004); dated Aug. 10, 2007.
USPTO; Notice of Allowance dated Nov. 13, 2007, from related application U.S. Appl. No. 10/762,428 (filed Jan. 22, 2004).
USPTO; Office Action dated Nov. 1, 2007, from related application U.S. Appl. No. 10/763,012 (filed Jan. 22, 2004).
Virginia Andersen; *Access 2000: The Complete Reference* (California, McGraw-Hill, 2000), pp. v-xviii, 370-371, 374-379, 396-402, 464-471, 474-479, 1112, and 1314-1317.
Visio Corporation; *Developing Visio Solutions, Visio 2000* (Washington, Visio Corporation, 1999), pp. iii-xiv, 61-82, 139-144, 270-272, 505-519, and 556-557.
Visio Corporation; *Visio 2000 User Guide* (Washington, Visio Corporation, 1999), pp. iii-x,1-44, 61-65, 92-101, 104-147, 164-176, 189-202, 258-279, and 302-303.
W3C, Tables, Aug. 25, 2000, W3C, Chapter 11—Section 11: pp. 1-3, http://web.archive.org/web/20000815093932/http://www.w3.org/TR/html4/struc/tables.html.
Wallace Wang; *Visual Basic 6 for Dummies* (California, IDG Books Worldwide, 1998), pp. 9-14, 18-34, 60-125, 140-142, 210-220, 293-296, 404-406, and 417-432.
European Office Action for Application No. 10 010 665.7, dated Apr. 8, 2015.
Declaration of Nenad Medvidovic Under 37 C.F.R. §1.68; Axure Software Solutions, Inc.; U.S. Pat. No. 7862158; Feb. 18, 2015; 136 pages.
Petition for *Inter Partes* Review of U.S. Pat. No. 7861158; Axure Software Solutions, Inc. v. iRise, Inc.; Feb. 19, 2015; 62 pages.
Order Granting in Part, Denying in Part Motion of Plaintiff iRise for Partial Summary Judgment of Infringement of U.S. Pat. No. 7349837; Irise v. Axure Software Solutions, Inc., No. CV 08-03601; Denying Axure's Motion for Summary Judgment of Non-Infringement and Invalidity; Sep. 11, 2009; F.Supp.2d(2009); pp. 1-38.
White, Michael et al.; "Exemplars: A Practical, Extensible Framework for Dynamic Text Generation"; 1998; pp. 1-10.
White, Michael; "Designing Dynamic Hypertext"; Proceedings of the 2nd Workshop on Adaptive Hypertext and Hypermedia, Hypertext'98; Pittsburgh, USA, Jun. 20-24, 1998; 3 pages.
"Microsoft Computer Dictionary" 4th Edition; Microsoft Press, Redmond, WA; 1999; 4 pages.
Elderbrock, David et al.; Microsoft Front Page 2000 Bible; IDG Books Worldwide; 3313-4; 1999; 852 pages.

(56) References Cited

OTHER PUBLICATIONS

File History of U.S. Appl. No. 10/484,541; "System and Process for Gathering, Recording and Validating Requirements for Computer Applications"; filed Jan. 22, 2004 1,071 pages.
Petition for *Inter Partes* Review of U.S. Pat. No. 7861158; Axure Software Solutions, Inc. v. iRise, Inc.; Feb. 19, 2015; 63 pages.
Declaration of Nenad Medvidovic Under 37 C.F.R. §1.68; Axure Software Solutions, Inc.; Feb. 18, 2015; U.S. Pat. No. 7861158; 120 pages.
Webster's Unabridged Dictionary of the English Language; 2001 by Random House, Inc, NY; 3 pages.
File History of U.S. Appl. No. 10/762,428; "Systems and Methods for a Programming Environment for a Simulation of a Computer Application"; filed Jan. 22, 2004; 587 pages.
Provisional U.S. Appl. No. 60/308,052; "An Automated Process for Formally Describing and Validating Requirements of Computer-Based Applications"; filed Jul. 26, 2001; 38 pages.
iRise v. Axure; Redacted Memorandum of Points and Authorities in Support of Motion of Plaintiff iRise for Partial Summary Judgment of Infringement of U.S. Pat. No. 7349837; Jun. 15, 2009; 31 pages.
Robbins, Jason Elliot; "Dissertation re: Cognitive Support Features for Software Development Tools"; 1999; UMI Microform 9942715; 252 pages.
ACM Digital Library; information regarding ROBBINS, Jason Elliot; http://dl.acm.org/citation.cfm?id=929838&preflayout=flat; 1999; 3 pages.
University of California, Irvine Libraries; information regarding ROBBINS, Jason Elliot; copyright 2004; http://antpac.lib.uci.edu/search~S7?/.b2699349/.b2699349/1%2C1%2C1%2CB/marc~b2699349; 1 page.
Decision on Appeal; U.S. Appl. No. 10/484,541; Appeal 2009-013355; Decided Apr. 21, 2010; 11 pages.
Petition for Covered Business Methods Review of U.S. Pat. No. 7349837; Feb. 20, 2015; 83 pages.
Declaration of Nenad Medvidovic Under 37 C.F.R. §1.68; Axure Software Solutions, Inc.; Petition for Covered Business Method Review; U.S. Pat. No. 7349837; Feb. 18, 2015; 124 pages.
Petition for Covered Business Methods Review of U.S. Pat. No. 7349837; Feb. 20, 2015; 85 pages.
Declaration of Nenad Medvidovic Under 37 C.F.R. §1.68; Axure Software Solutions, Inc.; Petition for Covered Business Method Review; U.S. Pat. No. 7349837; Feb. 18, 2015; 114 pages.
Myers, Brad A. et al.; "Garnet, Comprehensive Support for Graphical, Highly Interactive User Interfaces"; Carnegie Mellon University; Nov. 1990; 15 pages.
Plomp, C.J. et al.; "A Generic Widget Vocabulary for the Generation of Graphical and Speech-Driven User Interfaces"; Jan. 1, 2002; International Journal Speech Technology, v. 5, issue 1, pp. 39-47 (abstract only).
Miyashita, Ken et al.: "Interactive Generation of Graphical User Interfaces by Multiple Visual Examples"; 1994; UIST '94 Proceedings of the $7^{th}$ annual ACM symposium on User interface software and technology, pp. 85-94 (abstract only).
Johnson, Jeff; "Selectors: going beyond user-interface widgets"; 1992; CHI '92 Proceedings of the SIGCHI Conference on Human Factors in Computing Systems; pp. 273-279 (abstract only).
HTML 4.01 Specification—Forms in HTML Documents, World Wide Web Consortium, available at http://web.archive.org/web/20000816154958/http://www.w3.org/TR/html4/interactlforms.html (archived Aug. 16, 2000).
Prague, Cary, and Irwin, Michael, Access 2002 Bible, Wiley, pp. i, ii, xvi, xvii, 3-7, 23-25, 42- 48, 55-60, 64, 65, 241, 249-267, 393-421, 429-443, 483, 484, 512, 519-522, 531-533, 696-714, 818, 819, 909-939, 941-947, 970-972, 1024, 1025, 1179-1271 (2001).
European Office Action dated Apr. 2, 2015 regarding Application No. 10010666.5.

\* cited by examiner

FIG. 6

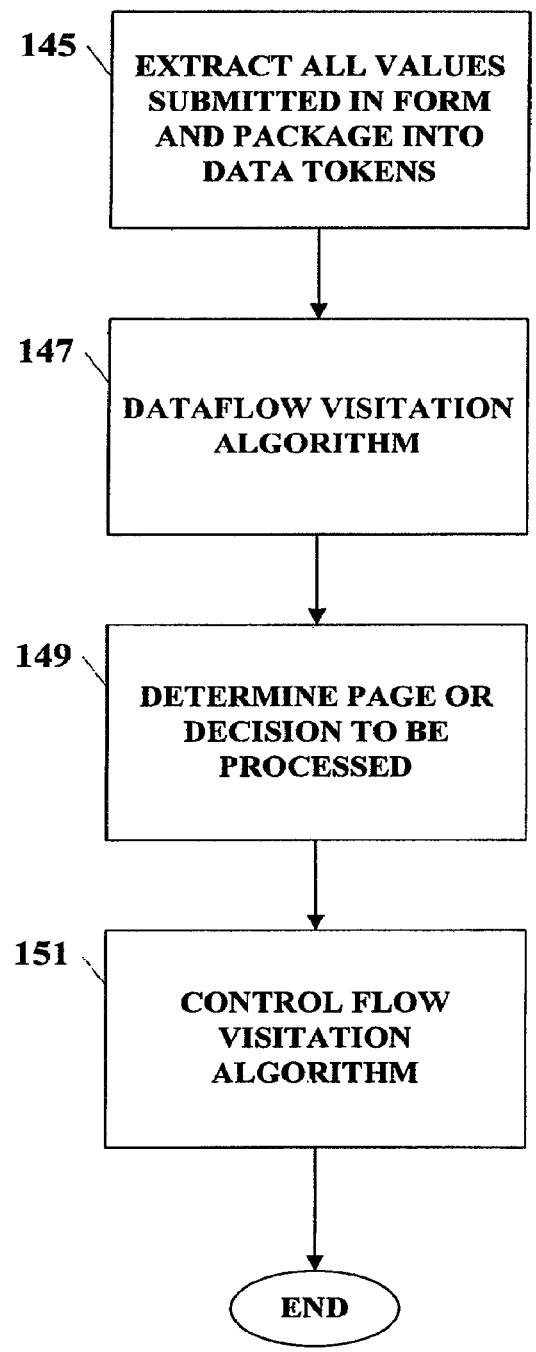

504

| REQUIREMENTS - LOGIN PAGE | | |
|---|---|---|
| 🗀 (1) - Login Page | | Number of Requirements: 1 |
| ID: 7Q010D  Type: FDD | This is the html for the login page. | |
| Priority: Unassigned | | |
| Assigned To: | This is the html for the login page. | |
| Subtype: | | |
| Status: | | |
| Scope/Release: In Scope/Unassigned | | |
| Requestor: | | |
| Modified: 08-Apr-2002 06: 41 PM iRiseSupport | | |
| T (14) - MA | | Number of Requirements: 1 |
| ID: 8016WW  Type: Intent | Marketing Adminstrator requirement. | |
| Priority: Unassigned | | |
| Assigned To: | Marketing Adminstrator requirement. | |
| Subtype: | | |
| Status: | | |
| Scope/Release: / | | |
| Requestor: | | |
| Modified: 08-Apr-2002 06: 41 PM iRiseSupport | | |

| NAVIGATION INBOUND - LOGIN PAGE | |
|---|---|
| Pages | |
| 🗀 Login Page | 🗀 Budget Entry Worksheet |
| 🗀 Project Budget Full Life View | 🗀 Select Project |
| 🗀 Set Project Stage | 🗀 Workbench -MA and FM |
| 🗀 Workbench -PM and DH | 🗀 Present View Full Life View |
| F  NAVIGATION OUTBOUND - LOGIN PAGE FOR FORM: FORM | |
| Element Name | |
| 🔲 (BUTTON) Log In  ➔  f (DECISION) Is Login Valid? | |
| f  F. (DECISION) Pull Error Message | |
| 🗀 F. (PAGE) Login Page | |
| f  T. (DECISION) continue | |
| f  T. (DECISION) Department Head? | |
| f  F. (DECISION) Finance Manager? | |
| f  F. (DECISION) Product Manager? | |
| f  F. (DECISION) WS Accepted (MA only) | |
| 🗀 0. (PAGE) Select Project | |
| f  1. (DECISION) route | |
| 🗀 2. (PAGE) Workbench -MA and FM | |
| 🗀 T. (PAGE) Workbench -PM and DH | |
| T (TEXT) MA  ➔  f (DECISION) Login As MA | |
| T (TEXT) PM  ➔  f (DECISION) Login As PM | |
| T (TEXT) DH  ➔  f (DECISION) Login As DH | |
| T (TEXT) FM  ➔  f (DECISION) Login As FM | |

| PAGE LOAD DATAFLOW (INBOUND) FOR LOGIN PAGE | | | | |
|---|---|---|---|---|
| Type | Element Name | Flow Label | Type | Element Name |
| (TEXT) | Error Msg | → _msg → | (SESSION) | Session |
| (SELECT) | CompanyList | → | (CONSTANT) | Company |
| F | DATAFLOW OUTBOUND - LOGIN PAGEDATAFLOW OUTBOUND - LOGIN PAGEFOR FORM: | | | |
| Type | Element Name | Flow Lable | Type | Element Name |
| (TEXTINPUT) | username | → username → | (DATA.FIND) | Valid Login |
| (TEXTINPUT) | password | → password → | (DATA.FIND) | Valid Login |
| (DATA.FIND) | Valid Login | → userRecord → | (SESSION) | Session |
| (SESSION) | Session | → userRecord → | (DECISION) | Is Login Valid? |
| (SESSION) | Session | → userRecord → | (DATA.UNPACK) | Get Role |
| (DATA.UNPACK) | Get Role | → _role → | (SESSION) | Session |

FIG. 14

| 3.00 LIST PAGE |
|---|
| USER INTERFACE - 3.00 LIST PAGE |

FAT ²     M C A  PARENTAL ADVISORY ³     RHINO ⁴

Main
Create
List

Genre ⁸ [ ]⁹ ▼Define Plan ¹⁰ Find ¹¹
Title¹³ Artist¹⁴ Genre¹⁵ Update¹⁶
12

FIG. 15

| iRise |

Here is the Title
Report Type: Testing Scenario Specifications Report
Here is the header.  Application: CD_manager

Page Functionality 3.00 List CDs (3 of 3)

00110S  Default Search Criteria
FDD

THe List page (3.00) should load showing the results of a search on the last Genre selected (on page 2.00, 3.00, or 3.01).

Scope: Undecided      Release: Unassigned     Locked By: (none)
Modeled: No           Subtype: None           Estimate:
Requestor: Temporary  Status: Proposed        Assigned To: Temporary
Administrator                                 Administrator
Priority: Unassigned Test Scenario
Go to page 2.00 and create a CD in the Country genre. Click Create. When the system presents page 3.00, the list should contain all the Country CDs that exist in the database

---

20Z11J            No CDs Found
FDD

If there are no CDs found for the Genre selected by the user on the List page, then a error message should be displayed in place of the CD list. The error message should read "No (Genre) CDs Found."

Scope: Undecided      Release: Unassigned     Locked By: (none)
Modeled: No           Subtype: None           Estimate:
Requestor: Temporary  Status: Proposed        Assigned To: Temporary
Administrator                                 Administrator
Priority: Unassigned Test Scenario
Go to page 3.01 to remove all the CDs from the "Rock" Genre. Go to page 3.00 and apply the Genre filter to show all Rock CDs. Click the "Go" button.

The sensor should re-present page 3.00 with an error message that states "No Rock CDs Found"

---

5QR012            Title Colum
FDD

The Record list should be sorted by Title when the user clicks on the Title column header.

FIG. 18

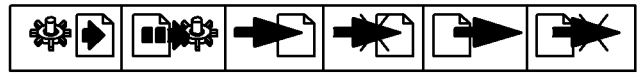 
FIG. 29          FIG. 30
 
FIG. 31          FIG. 32
 
FIG. 33          FIG. 34
 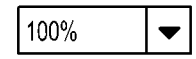
FIG. 35          FIG. 36

SYSTEMS AND METHODS FOR DEFINING A SIMULATED INTERACTIVE WEB PAGE

This application is a continuation application of U.S. application Ser. No. 14/339,706, filed Jul. 24, 2014, which is a continuation application of U.S. application Ser. No. 13/856,137, filed Apr. 3, 2013, which is a continuation application of U.S. application Ser. No. 11/671,331, filed Feb. 5, 2007, now abandoned, which is a continuation application of U.S. application Ser. No. 10/763,080, filed Jan. 22, 2004, now U.S. Pat. No. 7,174,286, issued Feb. 6, 2007, which is a continuation application under 35 U.S.C. §365(c) and 35 U.S.C. §120 of prior PCT application PCT/US02/23816, filed Jul. 26, 2002, which was published as WO 03/010684 A1 on Feb. 6, 2003 under PCT Article 21(2) in English, which claims the benefit under 35 U.S.C. §119(e) of U.S. Provisional Application No. 60/308,052, filed Jul. 26, 2001, the entireties of which are hereby incorporated by reference herein.

This application is related to (i) copending application entitled SYSTEM AND PROCESS FOR GATHERING, RECORDING AND VALIDATING REQUIREMENTS FOR COMPUTER APPLICATIONS, Ser. No. 10/484,541, which is the National Phase of prior PCT application PCT/US02/23816 filed Jul. 26, 2002; to (ii) copending application entitled SYSTEMS AND METHODS FOR COLLABORATIVE PROGRAMMING OF SIMULATIONS OF COMPUTER PROGRAMS, Ser. No. 10/763,012, filed Jan. 22, 2004, which is also a continuation application of prior PCT application PCT/US02/23816; and to (iii) copending application entitled SYSTEMS AND METHODS FOR A PROGRAMMING ENVIRONMENT FOR A SIMULATION OF A COMPUTER APPLICATION, Ser. No. 10/762,428, filed Jan. 22, 2004, now U.S. Pat. No. 7,349,837, issued Mar. 25, 2008, which is also a continuation application of prior PCT application PCT/US02/23816.

TECHNICAL FIELD

The present invention is directed to a system and process for gathering, recording and validating requirements for computer applications in the fields of requirements analysis for computer application development and of computer application development.

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

INDUSTRIAL APPLICABILITY

The present invention has applicability in the field of design and development of computer software applications for businesses and other entities, particularly concerning large, complex systems adapted for networks, including private networks as well as public networks such as the Internet.

BACKGROUND OF THE INVENTION

With the increasing complexity involved in the development of computer programs that embody very sophisticated business logic, specification of the requirements of these programs before they are actually built, i.e., programmed into computer readable code is important to timely and cost-effective production of these systems.

As organizations are forced to do more with less, the need to deliver such applications on-time and on-budget without sacrificing quality presents a bigger challenge than ever before. One of the major problems in these fields is system definition, i.e., the effective identification of accurate, complete and unambiguous requirements for the system or application. This is especially true of applications used on the Internet. These applications must meet requirements related not only to graphic design, content and usability, but also related to complex scenarios of user system interactions that are not complete and accurate requirements from outset and may not even be documented before starting the application design.

Traditional software development falls typically into several main disciplines. The first is known as the "waterfall" software development life cycle approach. The second approach attempts to improve the effectiveness of the waterfall approach by introducing prototypes into the development lifecycle early in the development cycle. Each of these approaches is associated with significant problems.

The waterfall approach is a development method that is linear and sequential. Waterfall development has distinct goals for each phase of development. Once a phase of development is completed, the development proceeds to the next phase and there is no turning back. This phase of development is analogous to the flow of water over a waterfall; it cannot flow back to the top of the waterfall. In the waterfall design approach, the requirements gathering phase typically results with capture of requirements on paper documents. Typically, the system designers generate a paper-based design from the paper-based requirements. The system developers then interpret the paper-based design and convert it into executable computer code. Typically, the executable code is then delivered to the testers, who then evaluate the code to determine if the resulting computer application meets the requirements.

While waterfall development allows for departmentalization and managerial control, it does not allow for much reflection or revision. Iterations of the design process require iterations of the entire process. However, once an application is in the testing stage, it is very difficult to go back and change something that was not well thought out in the concept stage. Also, typically, problems are not discovered until system testing, and requirements must be fixed before the system is designed. Requirements evolution makes the development method unstable. Often during the design and code writing phases, requirements inconsistencies, missing system components and unexpected development needs are discovered. Also, system performance cannot be tested until the system is almost coded, and under-capacity may be difficult to correct. For these reasons the standard waterfall model has been associated with the failure or cancellation of a number of large systems.

Known alternatives to the standard waterfall design approach include modified waterfall approaches that include those that start with a very rough notion of the system and become more detailed over time, analogous to going over several smaller waterfalls (spiral waterfall design); and those that include overlapping phases and sub-projects (modified waterfalls).

Other known design approaches include the staged delivery approach, in which the designer reviews the concept, requirements analysis, and architectural design phases, and then implements these phases, shows them to the customer as the components are completed, and then goes back to the previous phase(s) if needed.

All of these waterfall type approaches suffer from the same or similar problems, however. The iterative approach through the phases, even when overlapped, results in static requirements being interpreted into static designs and developments. Because the requirements for most systems are not well understood in the beginning, the costs for development often become excessive and delivery schedules originally estimated must be revised. Finally, because complex systems typically are not well understood in terms of their actual implemented behaviors, it is only through actual interaction with the system that the system designers and business analysts truly begin to understand what has been built. Although the lessons learned may be valuable during waterfall implementations, they cannot easily be taken advantage of, due to the prohibitive costs of re-factoring the designs and implementations to reflect the new requirements that spring from these lessons.

The second general approach, the prototyping of critical parts of the application, was developed, partly in response to the problems associated with the waterfall and modified waterfall approaches. As used herein, the term prototype, and its variations, in the context of the design of computer applications means the use of some form or stage of application code, or the use of static images to represent computer screen display.

The prototyping of critical parts, referred to sometimes herein as code prototyping, also was developed in response to awareness in the field of the invention that software product development tends to move along four paths: (1) ideas to product; (2) low technology to high technology; (3) drawings to code; and (4) appearance and behavior to performance. In the code prototyping approach, a prototype code is built to test the results of the planning phase, during which the developers attempt to understand the users and the users' needs and how those were to be addressed in the software application. The prototype code is then measured to see how the user reacts and understands the developer's work, and is analyzed to see which parts of the prototype are doing well and which parts are not. In this prototyping approach, the prototype is actually code that is intended to accomplish the intended purpose of designated parts of the overall software application, and is therefore referred to herein as a "coded prototype."

The prototyping approach also has been associated with numerous problems, foremost among them is that prototypes are typically written in computer languages that only programmers can understand and use. Thus the prototypes are still developed as traditional computer programs, by programmers. This has several drawbacks. The first drawback is that business analysts, who are the people most likely to understand the needs and desires for the computer application, cannot develop the prototype without reliance on computer programmers, and must translate and communicate these needs and desires to computer programmers in order to have them construct the prototype. This communication is traditionally inefficient and translation errors tend to be introduced because of the differences in the interpretation of the needs and desires for the prototype between two constituencies with differing backgrounds and skill sets. Second, in many organizations, skilled programming resources are preferentially assigned to fixing existing computer systems or completing development of systems that are soon to be placed in production. Thirdly, programming resources need potentially expensive hardware and software tools to accomplish their work. Fourthly, because prototypes are frequently constructed using the same infrastructure that the eventual application will be deployed upon, prototyping efforts are frequently delayed until strategic hardware acquisition, development software acquisition and training have been completed.

Yet another problem with prototyped systems is that they tend to become a replacement for actual development of the envisioned system. There is a tendency to attempt to field a completed, or near-completed prototype. Because the programmers were originally building just a subset of the system for demonstration purposes, short cuts typically are taken in this phase that lead to systems that do not scale well and have significant performance problems.

Yet another problem with coded prototypes is that they suffer from poor documentation, often because the prototype and the requirements are not represented within the same context.

Another problem with coded prototype based developments arises from the tendency for difficult problems to be pushed to the future, and not solved by the time of product completion, so that the initial hope of the prototype is not met by the subsequent product.

Because of these limitations, another prototyping approach, referred to as static prototyping, has evolved. In this approach, only an image of the user interface of the prospective computer application is developed. This image may be created using commonly available drawing and diagramming software, and may be created without some of the drawbacks associated with employing programming resources to create a coded prototype. Prototypes created in this manner, however, suffer from additional drawbacks. Foremost among them is that such static prototypes created with drawing and diagramming software are unable to convey to stakeholders an understanding of or how the application will behave. Prototypes constructed in this manner do not exhibit many of the interactive behaviors of computer applications, e.g., navigation from screen display to other screen display, computation, storage and retrieval of data. They are therefore referred to as "static image prototypes" herein. It is commonly known in the field of the current invention, that stakeholders are much more apt to identify potential errors or omissions in the early phases of software development if they are permitted to interact with a prototype that does exhibit these interactive behaviors.

To summarize the forgoing discussion of background art; coded prototypes suffer from drawbacks derived from the need to utilize computer programmers in their construction and static image prototypes suffer from drawbacks derived from the fact that they are inherently not interactive.

In addition, the evolutionary delivery design process, a cross between evolutionary prototyping and staged delivery, is known.

Within the context of the above described software design approaches, many systems analysts simply use a pad of paper to record requirements they gather from the eventual users of the computer program being envisioned for development. Still other systems analysts use word-processing programs to write specifications in a prose style. Several design methodologies have emerged to graphically describe the use of iteration with computer programs, and how these programs are to be organized internally. Ultimately, these specifications all coalesce to static representations of the proposed or prospective computer program that computer programmers must either read on paper, or read from a computer screen to gain an understanding of what the systems analysts interpreted what the users meant when they designed the system. The programmers must then write the code that represents their best interpretation of what the systems analysts and the users meant when the static system specification was created. Finally, after the computer programmers create the computer software code, it is tested by the systems analysts and users to determine if the programmers' interpretation of the system specification (that is, in turn, the system analysts' interpretation of the requirements from users of the proposed computer system) meets the users' requirements. In complex systems that must interact with multiple users, playing different roles, and in turn interact with multiple other computer programs, also playing different roles, the probability of interpreting the users' requirements correctly the first time is quite remote. This necessitates frequent code changes and reinterpretations, first by the users, second by the systems analysts and third, by the computer programmers. This cycle is repeated until the computer programmers rewrite the software enough times to embody what the users require of the system. The reliance on static documents to transfer the requirements into a correct computer program results in repeated cycles of development. These cyclic and redundant development activities inflate the cost of the resulting system.

As such, the programmers, at the end of the cycle of research and development of a large program or system, typically are left to discover all of the ambiguous, hidden and conflicting requirements as they actually write software code. This invariably leads to failures of the code to correctly embody the users' requirements, longer development cycles, increased costs and lower quality end products.

In addition, known computer application development approaches typically do not include input from all of the various stakeholders. Rather, it is generally business managers who determine the need for the application, and then business analysts translate these needs into the domain specific jargon appropriate to the problem being solved, and finally the computer programmers translate the business domain information into executable code. This serial process leads to misunderstandings, unresolved issues and misconceptions.

Finally, another problem with known software application development approaches is that software testers are provided with only a document for use in developing quality assurance and acceptance tests, and acceptance testing can occur only at the end of the development cycle. This is an additional source of delay and problems because the quality assurance engineers are then required to conduct their own interpretation of all of the prior development work.

SUMMARY OF THE INVENTION

The right of priority for the present invention is claimed on the basis of U.S. Provisional Patent Application Ser. No. 60/308,052, filed Jul. 26, 2001. The disclosure of invention contained therein is incorporated by reference as if set forth fully herein.

With reference to FIG. 1, the overall process of a preferred mode of the present invention is shown at 50, including its requirements gathering, recording and validation steps. Upon starting the process, initial requirements for a proposed or prospective computer software implemented application are collected at 52. The computer application that is intended to be developed and deployed based on the requirements and an interactive representation generated using the present invention, is referred to alternatively as the proposed application, the prospective application, the intended application and the subject application.

The requirements are then recorded in an electronic requirements repository or memory, shown at 54. Next an initial interactive representation model, sometimes referred to as an IRM, of the prospective application is created at 56. In the course of adding to or creating the initial interactive representation model at 56, associations between requirements and elements of the interactive representation may be recorded in an electronic repository or memory. Then the interactive representation model and the requirements, along with their associations between them, may be reviewed at 58. During the course of reviewing the interactive representation and requirements at 58, requirements may be added and associated to elements of the interactive representation. Following the review at 58 a determination is made at 66 on whether the interactive representation model and the requirements are sufficiently complete. If they are sufficiently complete, then they are provided as outputs of the process at 68, which serve as inputs for generation of the actual code for the prospective application. If they are not sufficiently complete, then the requirements are modified at 60 and/or the interactive representation model is modified at 62. In the course adding to and/or modifying requirements at 60 or when modifying and/or adding to the interactive representation model at 62, associations between requirements and elements of the interactive representation may be recorded in the electronic repository or memory.

The term user(s) and the term stakeholder(s) herein refer collectively and individually to persons who participate in the process of the present invention and/or utilize the software components of the present invention. The term user(s) include(s), but is not limited to business analysts, programmers, project managers, business managers and users of the prospective or subject application. The term user(s) also means (1) individuals who will use, or are intended to use the subject application once it has been developed and deployed; and/or (2) individuals who represent the proposed application users in the process of the present invention, particularly with respect to communicating their needs and desires relative to the behavior of the prospective application. For example, when gathering and validating the requirements for a subject application that will be used by the general public, for example, a retail internet application for the sale of books or compact disks, it is unlikely that a significant number of the subject application's eventual users, the general public, will be available to participate in the process of the present invention. Instead, marketing representatives, product mangers and similar individuals would act as proxies or surrogates for the subject application's end users. Thus, as used herein, the term proposed application user(s) refers to both the true user(s) of the subject application, as well as to those acting as their proxies.

As used herein the term requirement(s) refers to a statement or portion of a statement regarding the desired or necessary behavior of a prospective or subject computer implemented software application or a set of proposed applications. A collection of one or more requirements is a subset of the information that is typically provided to computer programmers and typically enables them to develop a computer application. For example, a subset of the requirements for a retail internet application might include the following requirements:

1. "The system shall require the user to enter the user's zip code before allowing the user to submit the user's order."
2. "The order entry page shall have the corporate logo in the upper left corner."
3. "If the user has ordered more than US$50.00 worth of qualifying merchandise during the previous three months, adjust the shipping cost of all items that are domestically sourced to the lower of USD$15 or 50% of the standard shipping cost."

The initial requirements for the subject application are recorded at 54 and subsequently modified or added to at 60 by business managers, business analysts, programmers and subject application users. Within this context an advantageous feature of the present invention is its ability to enable multiple users to view and edit the requirements over a computer network.

Another advantageous feature of the present invention is its ability to enable flexible definition of a classification structure for the requirements and assignment of each requirement to one or more of these classifications. For example, different classifications could include "order management requirements," "technical requirements" and "requirements from external clients." Another advantageous feature of the present invention is its ability to designate the e-mail addresses of other users and interested parties such that any change to the electronic record of the requirements causes an e-mail to be sent to each address to notify the recipient of the change. Also, the present invention provides the ability to establish the value of several attributes of the requirements. For example, "type," "subtype," "priority," "status" and "assigned to" attributes may be established. Other advantageous features of the present invention include its ability to record electronic discussions regarding the requirements; its ability to store and retrieve various electronic documents with each requirement; and its ability to produce on-screen or printed reports of the requirements. Still other advantageous features of the present invention include its ability to record defect reports and tasks related to requirements. In this context a defect report includes statements regarding incorrect or undesirable behavior of the prospective application, that can optionally be tracked in the present invention after providing the outputs of the invention at 68 to individuals involved in the development and deployment of the prospective application. In this context tasks refer to an optional record of activities to be performed, or activities that have been performed by users during the course of the use of the invention. These functions are provided by a software application that is part of the present invention. This application is programmed, preferably, in Java® language and provides requirements management functionality for the preferred implementation of the present invention.

A feature of the overall process is creation of an interactive representation, sometimes referred to as IR, and/or an interactive representation model, sometimes referred to as an IRM, of the prospective application. For the purposes of the present invention, the term interactive representation means (1) a simulation of the behavior of a prospective application that is used to review conformance of behavior to the desired or necessary behavior of the prospective application before it is developed and deployed; or, (2) the result of interpreting and executing an IRM. The IRM is an executable set of computer data that defines how an IR behaves. In a preferred embodiment of the present invention, this computer data is stored in terms of fundamental units, referred to as "primitives," or rules, and relationships among these rules that are permitted by an interactive representation modeling language, sometimes referred to herein as "IRML." More specifically, IRML refers to a language created as part of the present invention, and used in the embodiments of the invention to specify the behavior of an interactive representation. That language is represented in terms of the fundamental rules, or primitives that are used to create and execute interactive representations. As used herein, the term primitive refers to the most basic, indivisible unit in a language, specifically including the IRML used in the present invention and its alternate embodiments. A list of preferred IRML primitives for preferred embodiments is provided in Table II.

One or more users create the initial IRM at 56, and modify and/or add to the IRM at 62 through various mouse and keyboard gestures understood by one of the software components of the present invention, as will be described in detail. Using this software, referred to as "Studio," a user defines the appearance and behavior of an interactive representation by (1) adding IRML primitives to the IRM; (2) setting their attributes, and in some cases, their location; and (3) establishing relationships between and among these IRML primitives, as will also be described in detail. The requirements for the prospective application are then associated to the primitives in the interactive representation. Each association is recorded in a single, electronic system of record. Examples of activities that can be performed by a user during creation of the initial interactive representation model at 56 or modifying and/or adding to the interactive representation model at 62 include:

1. Initiating the "Studio" computer program component. The process of creating the interactive representation begins with a user initiating a computer application component referred to as "Studio." Once the user has been authenticated to this component the user selects a particular proposed application on which to work. An advantageous feature of the present invention is that the requirements that were previously recorded at 54, 58 or 60 appear on the screen presented by the Studio software component of the system and provide useful information to the user as the user proceeds with building or creating the interactive representation model, as well as the ability to record associations between these requirements and elements with the IRM.
2. Initially defining the user interface of the IRM. In initially defining the user interface of the IRM, the user reviews the requirements previously recorded at 54, 60 or 58 and then, through various mouse and keyboard sequences, instructs the Studio software component to perform certain pre-designated functions such as add (1) pages; (2) forms; (3) tables; (4) text inputs; (5) buttons, and other functions or components to the interactive representation model. Throughout the use of various mouse and keyboard gestures, the user may define the relative positioning of various user interface components and their containment within other user interface components. Within the context of the present invention the term containment refers to the relationship between two primitives that effects the manner in which the contained primitive is treated by a software component of the system referred to as the "simulator." One of these two primitives is referred to as a container primitive and the other as a contained primitive. Containment, as used herein, is conceptually derived from, and causes behaviors similar to the nesting of HTML tags in a conventional HTML document. For example, a "text input" primitive may be contained in a "table cell" primitive. The simulator software component of the present invention renders this relationship by generating HTML, with an HTML tag equivalent to the "text input" nested within the HTML tag equivalent to the "table cell", as will be described in detail below. When the HTML tag equivalent is interpreted by a browser, the text input appears graphically within the table cell. The containment relationship among primitives also implies the association between various user interface components and the user interface component "form," and is used by the simulator software component to extract values submitted in a form, and to package them into data tokens.

The user may also define attributes effecting the appearance and behavior of these various user interface components in the interactive representation. Alternatively, users may choose to specify very minimal information regarding the appearance of the subject application, and focus instead on later steps in this process. The process of creating the user interface of the IRM continues until the user has defined one or more pages that are intended to represent the user's understanding of the desired or needed behavior of the subject application.

The Studio software component enables the user to request that the interactive representation be displayed by the simulation software component at any time. This is also an advantageous feature of the present invention because in permits users to review the work done to date and/or to evaluate the extent to which the interactive representation reflects the users' interpretation of the requirements. In accordance with the principles of the present invention, it is intended that users will iteratively modify the IRM and review its compliance with the requirements through use of the simulator component of the invention, as will be described in detail hereinafter.

3. Subsequently defining the user interface flow of the IRM. Once preliminary compliance of the user interface components with the requirements has been reached, the user subsequently can define the user interface flow of the IRM by connecting various primitives in ways that define the user interface flow of the interactive representation and, hence, the intended user interface flow of the proposed application. This task typically involves (1) selection of a user interface primitive, such as an image, text or button; (2) selecting a destination "page" primitive; and (3) choosing a menu option labeled "connect." An advantageous feature of the present invention is its capability to interpret the user's intention to designate the user interface flow of the application simply because of the types of primitives they have chosen to connect, and without further specification of a user's intention to designate user interface flow. During this activity of defining the user interface flow of the IRM the Studio software component of the system continues to support viewing of requirements and of the dynamic display of the interactive representation. Another advantageous feature of the present invention is its ability to enable the user to designate several potential pages at a particular point in the user interface flow. This function is accomplished through use of a "decision" primitive. Through various mouse and/or keyboard gestures, a user (1) connects a user interface component to a primitive called "decision" in the preferred embodiment; (2) connects the decision to one or more potential pages; and, (3) connects another primitive to the decision using the system's "data flow" function, as described below in detail. These actions cause the simulator software component of the system to display one of the potential pages during review of the interactive representation and requirements shown at 58 in FIG. 1, and as described in greater detail below. This display is based on the value of the data flow function at the time the interactive simulation is rendered. Hence, the user is provided with structure and functioning components of the system of the present invention to define different behaviors of the model, with the behaviors being contingent on data values present at the time the interactive representation is rendered.

4. Defining additional behaviors in the IRM. Subsequent to defining the user interface and user interface flow of the IRM, the user may then specify other behaviors of the IRM. These other behaviors, include, by way of example, and not by way of limitation, such functions as the capture, storage and retrieval of data. Through use of various mouse and keyboard gestures, the user may connect user interface components to primitives referred to as "actions" in the preferred embodiment. Actions generally correspond to functions or behaviors that are common among known computer programs, for example the action labeled "data create" causes the IRM to store some specified data for later retrieval by an action labeled "data find." Similarly, actions are provided in the preferred embodiment for string manipulation, sorting lists of data and simple mathematical functions. A list of these preferred actions is provided as part of Table II. In the preferred embodiment each action takes zero, one or many input parameters and provides zero, one or many outputs. These inputs and outputs are connected, using the Studio component, to other actions or user interface components, and these connections are referred to as "data flow" connections. By connecting the outputs of an action to the inputs of another action, users are enabled by the present invention to define complex manipulation of data in the IRM. An advantageous feature of the present invention relative to this process is that the definition of such complex behavior in the IRM does not require knowledge or use of a computer language.

It might appear that the presentation of the process for developing an IRM as described herein implies a progression from user interface definition to user interface flow definition, and only then to definition of more complicated behavior of the IRM. However, another advantageous feature of the present invention is that it enables these activities to occur, to varying degrees, as will be described in detail below, in any order in the overall system, as desired by the users. Furthermore, the activities described in this process may be distributed among multiple users, working collaboratively on one or more IRMs. Furthermore, in other implementations of the present invention, one or more of such activities may be omitted from the process without significant impact on the efficacy of the process. For example, the activity of defining additional behaviors in the IRM may be omitted if the users conclude that the requirements and interactive representations are sufficiently complete to express the users' needs and desires. With respect to the above functions, another advantageous feature of the present invention is the ability of its Studio software component to enable the user, through a series of simple mouse movements, to record an association between one or more requirements and one or more primitives that have been added to the IRM. Similarly, the Studio software component enables the display of associations that have been previously defined.

Yet another advantageous feature of the present invention is the capability of the Studio software component, working in concert with the Music software component, to enable multiple users to collaboratively and simultaneously work on the same IRM. In the preferred embodiment of the present invention, several users may utilize individual copies of the Studio component on different computers, and in the context of the present invention each individual copy is referred to as an "instance" of the Studio. Modifications to the IRM made by one user working with that user's instance of the Studio are seen by other users working with their instances of the Studio on a near real-time basis. Furthermore, these changes are immediately visible to any user who is executing the IRM. As would be evident to a person skilled in the art, this near real-time capability constitutes another advantage of the invention relative to computer systems in which users must publish the results of their work to other users or computer systems in which users must actively retrieve the results of others' work. For example, consider two users Jon and Stephen, working collaboratively and simultaneously on the creation of a single IRM. As Jon adds new primitives to the model using his instance of the Studio component, Stephen's instance of the Studio program displays the new primitives on a near real time basis. Unlike many known computer systems, Jon does not need to instruct his instance of the Studio to update Stephen's instance, nor does Stephen need to request the latest IRM from Jon's instance. As used herein the term collaboration, and its variations, refer to the shared creation of two or more individuals with complementary skills by their interacting to create a shared understanding of a proposed software application that none had previously possessed or could have created alone. The goal of collaboration is the creation of value resulting from interactions among the collaborators. Collaboration, as thus defined, and as enabled by the system and process of the present invention, enables near real-time access by all collaborators. Thus, in accordance with the principles of the present invention the IRM serves as both a model and as a guide or "road map" for identifying and reducing ambiguity that arises during creation of a proposed software application before it is coded or deployed.

Similarly, changes to the requirements made by the ION or Studio software components are reflected in all other instances of ION and the Studio. This dynamic sharing of requirements and IRM information facilitates effective communication between all users of the system and contributes to higher quality requirements and IRMs. Furthermore, this dynamic sharing of information, coupled with the feature of a single electronic record of the requirements and IRM of a particular subject application, reduces the need for users to maintain and reconcile multiple copies of the same information.

The next step in the overall process of the present invention is the review of interactive representation and requirements, shown at 58. In this step, the interactive representation of the subject application, in conjunction with the associated requirements, may be reviewed iteratively by business managers, business analysts, programmers, and proposed application users. In the presently most preferred embodiment or mode of practicing the invention, two activities are available for accomplishing this task: simulation and simulcasting, as will be described in detail below.

Simulation is an activity that begins when a user executes an interactive representation model by choosing the "simulate" menu item in the ION software component or the "simulate" menu item in the Studio software component. This choice causes the simulator component of the present invention to render the selected page of the IRM to the user's browser. As referred to in the present invention, the term simulator means a software component of the present invention that renders an interactive representation of a proposed application and related requirement information based on an interactive representation model and associated requirement information.

The simulator initially provides a list of the pages in the application to the user. The user then chooses the page at which they would like to simulate and calls the simulator again. Upon receiving the request for this page, the simulator creates a temporary memory area to build a response to the user's request. The simulator then "visits" the primitive that represents the page requested by the user and processes that primitive along with all of the primitives contained by that page. As it "visits" primitives, the simulator incrementally builds up its response. Some primitives are used to display variable data to users, and for each of these primitives, the simulator starts a separate process to determine the values of these variables. Once all the necessary primitives have been "visited" and their corresponding portion of the response has been appended to the response, the response is sent back to the user. Typically, the user then enters data and clicks on a button or link to submit this data for processing. The simulator receives this submission and extracts the values entered by the user into the fields that were presented to them. It then passes these values to primitives in the IRM that call standard sub-routines that process the data, and, in turn, pass the results of such processing on to other sub-routines for further processing. This continues until all processing is complete, at which point the simulator begins construction of the response to the user in the same way it constructed the user's first request for a page. Once completed, the simulator passes its response to the user, and waits for another request. This process repeats until the user has completed their interactive representation session.

Another advantageous feature of the present invention is its capability to display the requested page in a certain format referred to as "Meta" mode. In Meta mode the requirements associated to the primitives contained on the page through use of the Studio software component are displayed on the user's browser in addition to display of the page itself. Furthermore, each of the primitives that is visually represented on the page is automatically assigned a reference number, and each of the requirements displayed is cross referenced to these numbers. In the present invention, this display of the IRM page and the cross-referenced requirements is referred to as "requirements in context". This feature of the present invention is intended to facilitate each user's understanding of the requirements and to significantly increase the likelihood of discovery of erroneous or incomplete requirements at this stage of the overall process. In addition, preferred embodiments of the present invention provide the capability to produce a report that contains the image of the page, the automatically assigned cross-reference numbers and the cross-referenced requirements.

Simulation continues as the user, though mouse and keyboard gestures, interacts with the interactive representation. For example, the user may enter text into text inputs presented in the interactive representation, or may click buttons presented in the interactive representation. Each of these interactions is then communicated by the user's browser to the simulator software component. The simulator software component then evaluates each interaction and responds by rendering a new page to the user's browser, with the new page including the result of each interaction. In this way, the user is presented with an experience very similar to what would be experienced if that user were interacting with the completed proposed application. This capability is also advantageous because it greatly increases the likelihood of discovering erroneous or incomplete requirements at this stage of the overall process.

The simulator software component also provides, as yet another advantageous feature, a capability for the user to enter newly discovered requirements directly into the user's browser during simulation, and for these requirements to be stored by the ION software component into the repository of requirements for the subject application.

As used in describing the present invention, the term simulcasting refers to an activity that is identical to that of simulation, but with the following differences. When simulcasting, an individual user's interaction with the IRM through the simulator is broadcast to other users. The individual user whose interaction is broadcast is referred to as the lead user. The users viewing the interaction are referred to as following users. This provides another way in the present invention to review interactive representations and requirements, as shown at 58. Furthermore, the simulcastor software component provides the capability for a following user who is viewing the interaction broadcast through the simulcastor software to temporarily initiate each such user's own interaction with the IRM and, at a time chosen by the lead user, to be returned to the broadcast simulation. In the preferred implementation this capability is provided by the simulcastor. The simulcastor is a software program application implemented using Java® language in an applet framework. Alternatively, known, commercial web-casting applications, such as for example, Web-Ex, could be used to provide this or similar functionality. The preferred embodiment, however, is advantageous relative to this alternative because the preferred embodiment does not require purchase or configuration of additional software, nor does it require additional training for effective use.

In the next step of the overall process 50 of the present invention the user, or several users determine if the requirements and the IRM are completed sufficient at 66 to warrant proceeding to providing outputs to design and delivery of the actual code for the prospective application at 68.

If the requirements and/or the IRM of the proposed application is determined to be incomplete, the process of the present invention enables the user to modify and/or add requirements at 60 and/or to modify and/or add to the IRM at 62. As used herein, the terms incomplete or insufficiently complete, when used in reference to requirements or the interactive representation, by way of example, and not by way of limitation, refer to instances where either the requirement or interactive representation does not accurately represent the needs and/or desires of the users regarding the behavior of the prospective application, or when changes to the interactive representation or requirements could better communicate to the designers and developers the intended behavior of the application.

The actions taken at 62 are operationally the same as the combination of actions taken at 52 and at 54, with one difference. The difference is that in the case of step 60, users edit the previously described requirements to increase conformity with the needs and/or desires of the users and/or by adding newly discovered requirements.

The actions taken at 62 are operationally the same as those at 56, with one difference. The difference is that the users modify or add to the interactive representation model to increase conformity with the needs and/or desires of the users.

The process then proceeds to step 58, review interactive representation and requirements, and subsequently to step 68 in which, again, a determination is made on whether the requirements and/or the interactive representation model are sufficiently complete.

When the interactive representation model and the requirements are sufficiently complete, the process proceeds to provide outputs to design and delivery at 68. These outputs are used by the individuals involved in the design, programming, testing and deployment of the proposed application as a description of the needed and desired behavior of the proposed application. This step preferably includes utilizing the ION software component of the invention to generate various reports that can then be provided to programmers, designers, architects, testing personnel and others involved in the actual development and/or deployment of code for the proposed application.

These reports are the result of yet another advantageous feature of the present invention, i.e., the ability of the ION software component, working in conjunction with the simulator software component to generate such reports, such as a functional specification report. An example of such a report is shown in FIGS. 11-14, described below. This report depicts a visual image of the appearance of a page or pages in the IRM as well as a list of requirements that are associated with user interface components that appear on the page or pages. Furthermore, the functional specification report automatically provides a numerical cross-reference between the user interface components and their associated requirements. In practical application of the present invention, steps 58, 66, 60 and 62 occur iteratively, as the requirements and IRM incrementally approach completion. Another advantageous feature of the present invention is that (1) this iterative process results in better communication between and among users regarding the needs and desires of the users relative to the subject application, and (2) changes made in steps 60 and 62 are immediately recorded such that step 58 can occur within seconds of steps 60 and 62.

Also, in practical application of the principles of the present invention, users may elect to begin the process at step 56, when it is believed that the user(s) has/have sufficient knowledge regarding the needs and/or desires for the subject or prospective application to begin at this step in the overall process.

One embodiment is a method of defining a simulated interactive Web page, where the method includes: displaying on a computer display a programming area comprising one or more HTML user interface components for the simulated interactive Web page; displaying on the computer display an area for primitives; and enabling a user to draw a graphical coupling from a selected HTML user interface component to a selected primitive, wherein execution of the simulated interactive Web page is based at least in part on an interpretation of the graphical coupling.

One embodiment is an interpreted interactive representation modeling apparatus that is executable in an interactive graphical user interface, where the apparatus includes: a user interface component displayed in the interactive graphical user interface, where the user interface component includes at least two visible branches, where the visible branches are visible at least during configuration of the instruction for the interpreted interactive representation modeling language; a Boolean condition associated with at least a first branch and a second branch of the at least two visible branches, where the first branch is associated with a first state of the Boolean condition, and where the second branch is associated with a second state of the Boolean condition, where the association of the Boolean condition is visibly displayed in the interactive graphical user interface at least during configuration of the instruction; an interactive component responsive to user interaction during execution of the instruction, where the interactive component monitors data flow inputs to the interactive graphical user interface for a selection of a state of the Boolean condition; at least a first executable instruction associated with the first branch, where the first executable instruction is activated upon the detection of a selection of the first state of the Boolean condition such that the first executable instruction is conditionally executed; and at least a second executable instruction associated with the second branch, where the second executable instruction is activated upon the detection of a selection of the second state of the Boolean condition such that the second executable instruction is conditionally executed.

One embodiment is an interpreted interactive representation modeling apparatus, where the apparatus includes: a user interface component displayed in an interactive graphical user interface, where the user interface component includes at least three visible branches, where the visible branches are visible at least during configuration of the instruction for the interpreted interactive representation modeling language; an integer-mode condition associated with at least a first branch, a second branch, and a third branch of the at least three visible branches, wherein: the first branch is associated with a first integer value of the integer-mode condition; the second branch is associated with a second integer value of the integer-mode condition; the third branch is associated with a third integer value of the integer-mode condition; wherein the association of the integer-mode condition is visibly displayed at least during configuration of the instruction; an interactive component responsive to user interaction during execution of the instruction, where the interactive component monitors for a selection of a value for the integer-mode condition; at least a first executable instruction associated with the first branch, where the first executable instruction is activated upon the detection of a value corresponding to the first integer value of the integer-mode condition; at least a second executable instruction associated with the second branch, where the second executable instruction is activated upon the detection of a value corresponding to the second integer value of the integer-mode condition; and at least a third executable instruction associated with the third branch, where the third executable instruction is activated upon the detection of a value corresponding to the third integer value of the integer-mode condition.

One embodiment is a method of interacting with a user to define a behavior of a portion of an interactive presentation, where the interactive presentation corresponds to a simulation model, where the interactive presentation and the user interact via an interactive graphical user interface, where the method includes: monitoring a manipulation of a cursor by a pointing device; monitoring a graphical dragging and dropping of a first graphical symbol to a first area in the interactive graphical user interface such that a user interface component appears in the first area, where the user interface component corresponds to a conditionally-executed instruction; receiving a name for the user interface component; receiving a name and a text description for a requirement for the user interface component; identifiably storing the name of the user interface component, the name of the requirement, and the text description of the requirement with the user interface component; monitoring a dropping of a second graphical symbol into the first graphical symbol in the pane of the interactive graphical user interface, and at least partly in response to the dropping of the second graphical symbol, adding a first branch to the first graphical symbol, where the first branch corresponds to a first code that is executed upon selection of the first branch during run time; monitoring a dropping of a third graphical symbol into the first graphical symbol in the pane of the interactive graphical user interface, and at least partly in response to the dropping of the third graphical symbol, adding a second branch to the first graphical symbol, where the second branch corresponds to a second code that is executed upon selection of the second branch during run time; and receiving a data flow input control for the first graphical symbol, where the data flow input is associated with the first graphical symbol such that when the interactive simulation of the simulation model runs in the interactive graphical user interface, a combination of the data flow input control and a data flow input received during run-time control the branching of the first graphical symbol to the first branch and to the second branch.

One embodiment is a method of automatically configuring at least a portion of a behavior for an instruction for a requirements validation computer program, where the method includes: providing a user interface component in an interactive graphical user interface; monitoring conditional branches added to the user interface component, where the conditional branches control program flow for the requirements validation computer program; automatically associating the conditional branches with a Boolean state when there are two conditional branches associated with the user interface component; and automatically associating the conditional branches with an integer-mode when there are at least three conditional branches associated with the user interface component.

One embodiment is a computer system that is configured to define a simulated interactive Web page, where the computer system includes: a component configured to display on a computer display a programming area comprising one or more HTML user interface components for the simulated interactive Web page; a component configured to display on the computer display an area for primitives; and a component configured to enable a user to draw a graphical coupling from a selected HTML user interface component to a selected primitive, wherein execution of the simulated interactive Web page is based at least in part on an interpretation of the graphical coupling.

One embodiment is a computer system that is configured to define a simulated interactive Web page, where the computer system includes: a means for displaying on a computer display a programming area comprising one or more HTML user interface components for the simulated interactive Web page; a means for displaying on the computer display an area for primitives; and a means for enabling a user to draw a graphical coupling from a selected HTML user interface component to a selected primitive, wherein execution of the simulated interactive Web page is based at least in part on an interpretation of the graphical coupling.

One embodiment is a computer program embodied in a tangible medium for defining a simulated interactive Web page, where the computer program includes: instructions configured to display on a computer display a programming area comprising one or more HTML user interface components for the simulated interactive Web page; instructions configured to display on the computer display an area for primitives; and instructions configured to enable a user to draw a graphical coupling from a selected HTML user interface component to a selected primitive, wherein execution of the simulated interactive Web page is based at least in part on an interpretation of the graphical coupling.

BRIEF DESCRIPTION OF THE DRAWINGS

Various objects, features and attendant advantages of the present invention are described in conjunction with the accompanying drawings, in which like reference characters designate the same or similar parts throughout the several views, and wherein:

FIG. 6 is a depiction of an interactive representation of the interactive representation model of FIG. 5.

FIG. 7 is a flow diagram of process form submit algorithm of the FIG. 1 embodiment.

FIG. 12 is an example of the requirements section of the functional specification report of the preferred embodiment of the present invention.

FIG. 13 is an example of the control flow section of the functional specification report of the preferred embodiment of the present invention.

FIG. 14 is an example of the data flow section of the functional specification report of the preferred embodiment of the present invention.

FIG. 15 is another example of the interactive representation page section of the functional specification report of the preferred embodiment of the present invention.

FIGS. 18 and 19 display examples various reports of a preferred embodiment of the present invention.

FIGS. 29 through 36 display examples of icons for use in a preferred embodiment of the present invention.

MODE(S) FOR CARRYING OUT THE INVENTION

Figure 1:
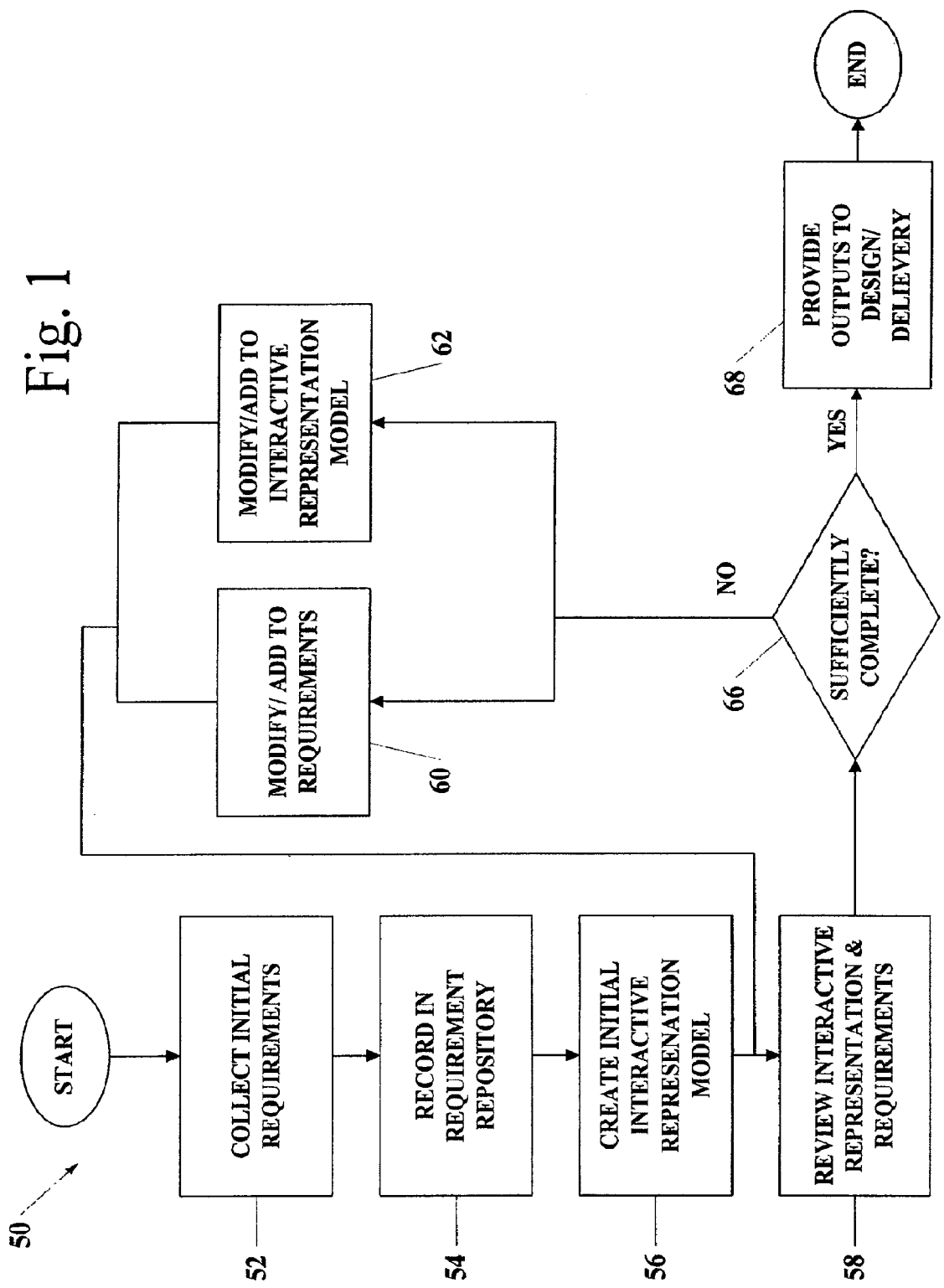
FIG. 1 depicts the overall process of a preferred mode of practicing, i.e., a preferred embodiment of the present invention.

Overview of Software Components and their Interaction

One preferred embodiment of the current invention includes several software components. These components and their interaction are described in this section, with reference to FIG. 2. The software components of the present invention may stored, individually or collectively on any computer-readable medium, such as, by way of example, including but not limited to conventional hard disks, CD-ROMS, Flash ROMS, nonvolatile ROM, RAM and floppy disks.

A standard browser (such as, preferably, Microsoft® Internet Explorer® 70) is used to present the user interface of the ION component 76 of the present invention, as well as the user interface to the simulator component 78 of the present invention. The browser 70 and ION component 76 interact over a computer network 72 utilizing a TCP/IP and HTTP or HTTPS communication protocols 74. Similarly, the browser 70 and the simulator 78 interact over the computer network 72 utilizing TCP/IP and HTTP or HTTPS 74. The browser component runs on a computer system 80, typically referred to as a client computer.

The ION component 76 of the present invention is used to edit information regarding requirements, defect reports and tasks, and information regarding administration used for the operation of the present invention, such as user names and passwords.

The simulcastor component 64 runs within a standard browser (not depicted in FIG. 2) and is used to present the interactive representation to multiple users concurrently. The simulcastor component 64 also interacts with the simulator component 78, over computer network 72 utilizing TCP/IP and HTTP or HTTPS protocol 74.

The studio component 82 of the present invention is used to edit the IRM and the requirements, and interacts with the music client component 84. Communication between these components is implemented through use of conventional Java method calls. The music client component 84 communicates with the music server component 92 over computer network 72 utilizing TCP/IP and HTTP or HTTPS prototype 74.

The music client component at 84 and 94 of the present invention, working in conjunction with the music server component 92 of the present invention provide access to information about the requirements and IRM, as well as administrative information stored in the repository files 86 to the ION component 76, the simulator component 78 and the studio component 82.

The music server component 92 mediates the storage and retrieval of information regarding the requirements, tasks, defect reports and the IRM among multiple users of this information and reads and writes transactions reflecting changes to this information to the repository files 86. The music server component also communicates any changes to the information made by one user, on a near real-time basis, to other users accessing the same information and provides for grouping of related updates to this information.

The repository files 86 component is a set of computer files, encoded in an industry standard format called Extensible Markup Language (XML) that contains information regarding the IRM, requirements, defect reports, tasks and administrative information used in the operation of the present invention, such as user names and passwords. XML offers a flexible format for storing different data and other advantages as would be understood by an individual skilled in the art. The ION, simulator, and music server components, as well as an instance 94 of the music client, run on a computer system 88, typically a server, that runs a Servlet and Java Server Page (JSP) container 90. Communication among these components is implemented through use of conventional Java method calls.

Alternative embodiments of the present invention could be implemented through use of a commercially available version of a container, such as BEA™ WebLogic™ or IBM WebSphere™ containers. However, such alternative embodiments would require users of the present invention to pay license fees to the vendor of those containers.

Another way to describe the role and interaction of the Studio, IRML, and the simulator in the present invention is to relate each to common definitions that are familiar to those skilled in the art. The studio can be considered to be a specialized "editor", used to edit the IRML "language." IRML is subsequently processed by the simulator, which is similar in function to an "interpreter." As with other editors, including, for example, text editors, integrated development environment editors, and language specific editors, the studio is used to create and maintain a set of computer instructions, i.e., a "program", or in the present invention, an IRM, for later execution by another program or application. IRML, in this context, is a specialized computer language designed for use by business analysts and other users not familiar with traditional computer languages like HTML, Java™ or C++. The IRML language is designed to be presented graphically by the Studio, and is another advantageous feature that permits individuals without programming experience to create IRM's Like other interpreters, the simulator is capable of translating a language, in this case, IRML into instructions that can be ultimately executed by a computer, and when so executed, results in the interactive representation of the present invention.

In an alternative embodiment of the present invention, a commercially available "editor" computer program such as Microsoft® .NET Studio® and/or a commercially available "interpreter" computer program could be used in place of the studio and/or simulator respectively. However, these commercially available computer programs would need to be modified significantly to provide the ability to associate requirements to elements of the interactive representation model and to present these requirements in the context of the interactive representation. Furthermore, this alternative embodiment would suffer from some of the drawbacks of prior art, with respect to the fact that commercially available "editors" and "interpreters" are designed for use by computer programmers. Another disadvantage of this alternative embodiment is that these commercially available computer programs are not specifically designed for creation of interactive representation models, but rather for the development of prospective computer applications, and, therefore, may require performance of additional costly activities to achieve a similar effect, e.g., declaration of variable types, declaration of database record definitions, specification of deployment configuration and/or installation and configuration of additional database management computer programs.

Similarly, in an alternative embodiment of the present invention, IRML could be replaced by a single or combination of several existing computer languages, such as C++, Java® or Visual Basic®. Because these are general purpose computing languages, they contain many more primitives and rules for construction than IRML, and, therefore require additional time and effort in the creation of an IRM. Furthermore, this alternative embodiment would suffer from some of the drawback of prior art, with respect to the fact that commercially available computing languages are designed for use by computer programmers.

DETAILED DESCRIPTION OF THE PREFERRED EMBODIMENT

With reference to FIGS. 2-9, preferred, and alternate software components of the preferred embodiment of the present invention will be described.

The first software component is a computer program that enables the user to read, create and modify interactive representation models. Preferably the program is written in Java® language. For convenience this program is referred to as "Studio" and is shown at 82 in FIG. 2. The IRM's in Studio are represented in IRML. FIG. 3 depicts operation of the Studio component.

Studio implements three high level processes: start up process 96, process user input 98 and process incoming messages 100.

During the start up process 96 the Studio software calls another software component of the system, referred to as the Music Client 84 and requests that an interactive representation model be retrieved from the server 88 and made available for reading and modification at 102. Upon successful retrieval of an IRM, the Studio component 82 displays a visual representation of the IRM as well as other information about the IRM and enters an await state 104, during which time it can receive and process either user input 106 or incoming messages 100.

The Studio program monitors for user input 106 via keystroke or mouse action. Upon receipt of such information, the Studio program performs a function, represented at 108 in FIG. 3, based on what information was received from the user. The following are examples of the functions that the Studio software performs:

1. Choosing an IRM for viewing or modification.
2. Adding new instances of primitives to the IRM.
3. Modifying the attributes associated with the primitives in the IRM.
4. Deleting instances of primitives in the IRM.
5. Declaring relationships between primitives in the IRM.
6. Modifying the visual display of the IRM.
7. Declaring relationships between requirements and instances of IRM primitives.

The Studio program then evaluates whether the requested function is valid at 110. At determination is made at 118 whether or not to exit the program. If the requested function is valid, the Studio program executes that function 108.

If the function changes the information contained in the IRM as determined at 120, then the Studio component updates the IRM by calling the Music Client 112 and updating the electronic record as will be described in greater detail below. In some cases, as determined at 122, the Studio program makes immediate changes to the screen displayed to the user that reflect the update at 114. In other cases, the Studio program does not make immediate changes, but waits until the music server 92 responds via the music client 84 and then processes the update as incoming messages are processed, shown at 116.

During processing of incoming messages, at 100, the studio program receives messages from the local music client whenever a remote music client updates the IRM via the music server. The Studio program then updates the screen displayed to the user reflecting the update, shown at 116, unless the studio program has already made these changes under the process user input process 98 described above.

In the preferred embodiment, the studio program is written in Java® language and utilizes some components of the conventional "Swing" and "AWT" libraries that are part of the Java®™ System Developers Kit (Java® SDK). Alternatively, the Studio program could be written in another language, such as, for example C++, C# or Visual Basic.

The second software component of the preferred embodiment of the present invention is a computer program used to read and update IRM's stored on a server computer across a computer network. The term computer network refers to a private network, usually internal to a company or some other organization, and also refers to a public computer network, such as the Internet. This second software component is, for convenience, referred to as the music client. The music client preferably is written in Java® language. The other software components of the preferred system of the present invention, i.e., the Studio, ION and simulator programs also use the music client 84 to read and update IRM's. The music client program also enables changes made to an IRM by a studio program running on a computer at one user's location to be transmitted on a near real-time basis to other studio programs that are running on different computers. The music client software program that is running on the same computer as a particular studio software program is referred to as the local music client. Music client software programs that are running on other computers are referred to as remote music clients.

The music client software program implements numerous commands that relate to reading and updating IRM's. The preferred commands that the music client of the preferred embodiment processes are listed below in Table I, along with a description of the effect of each. The music client software program can be best understood by a person skilled in the art as the implementation of an Application Programming Interface (API), which is shown in Table I. The first column of the table contains Java method calls that are supported by the music component, as would be understood by a person skilled in the art. Commands in this preferred embodiment are provided as Java® method calls. The other software components of the preferred embodiment of the present invention that use the music client utilize these commands to access and manipulate information regarding the requirements and the IRM. The descriptions of the effect of the commands listed in Table I below include the terms "Tape" and "Note." Note refers to the basic record that the music software program processes, and may contain information about IRML primitives that are part of the IRM, and may contain information about the IRM itself and/or about requirements. Tape refers to a collection of notes, typically the set of notes that collectively comprise a single IRM of a proposed application and its requirements.

TABLE I

MUSIC CLIENT API
© 2002 iRise, Inc.

| Command | Description of Effect |
| --- | --- |
| public String name( ) | // returns the name of the tape instance<br>// may return the namespace separator character '/' |
| public int index( ) | returns an int representing the index (current state) of the tape instance<br>indexes are completely relative with lesser index(es) representing older state(s) |
| public String user( ) | returns the user for the tape instance |
| public String host( ) | returns the http(s) server host for the current tape instance |
| public int port( ) | returns the http(s) server port for the current tape instance |
| public String file( ) | returns the http(s) file for the current tape instance |
| public String get Property(String name) | returns a string property on the tape instance |
| public void set Property(String name, String value) | sets a string property on the tape instance |
| public Note new Note(String type) | creates a new Note instance within the tape instance of the given type |
| public Note load Note(String key) | attempts to find and return a Note instance with the specified key within the tape instance<br>returns null if key is null or if the Note cannot be found |
| public Note[ ] find (Note. Filter, Note. Sorter sorter | attempts to find and return an array of Note instances meeting the specified filter criteria and in the order of the specified sorter criteria<br>returns an empty array of notes if no notes meet the filter criteria<br>returns all notes in the tape if no filter is specified<br>returns notes in any order if no sorter is specified |
| public Note[ ] filter(Note[ ] notes, Note. Filter filter) | Attempts to find and return an array of Note instances from the array of input Note instances meeting the specified filter criteria<br>returns an empty array of notes if no notes meet the filter criteria<br>returns all notes if no filter is specified |
| public Note[ ] sort(Note[ ] notes, Note. Sorter sorter) | returns an array of Note instances from the array of input Note instances in the order of the specified sorter criteria<br>returns notes in any order if no sorter is specified |

TABLE I-continued

MUSIC CLIENT API
© 2002 iRise, Inc.

| Command | Description of Effect |
|---|---|
| public boolean stop( ) | stops continuous play if continuous play is in effect |
| public boolean play( ) | continuous play where the tape instance endlessly attempts to receive all updated transactions<br>does not block current thread |
| public boolean play(int timeout) | single play where the tape attempts to receive all updated transactions at the time of the call<br>blocks current thread |
| public boolean jump(int timeout, int index) | pauses the tape and resets state of the tape to given index |
| public void pause( ) | pauses continuous play |
| public void pause( ) | pauses continuous play |
| public void unpause( ) | unpauses continuous play |
| public boolean register(int timeout) throws java.io.IOException | registers the tape with its server and obtains a unique mask/key generator |
| public boolean unregister(int timeout) throws java.io.IOException | unregisters the tape with its server and returns its unique mask/key generator |
| public void openContext( ) | opens an internal context for batching transactions |
| public void closeContext( ) | closes the internal context if one exists (automatically queued for save) |
| public boolean save(int timeout) | saves all queued internal contexts |
| public void load(java.io.InputStream is) throws java.io.IOException | parse xml from UTF-8 char stream and execute all transactions from the given input stream<br>loaded transactions are not queued |
| public void save(java.io.Outputstream os) throws java.io.IOException | save all queued internal contexts to xml in UTF-8 char stream |
| public Note[ ] importNotes(java.io.InputStream is) throws java.io.IOException | parse xml from zip-encoded input stream and execute all transactions found |
| public void exportNotes(Note[ ] notes, java.io.OutputStream os) throws java.io.IOException | save all queued internal contexts to xml in zip-encoded output stream |
| public String[ ] list(int timeout) | list all tape namespaces directly beneath current tape namespace<br>namespaces beginning with '_' are hidden for system purposes |
| public boolean rename(int timeout, String name) | rename the current tape namespace fails if a tape instance already exists in the new namespace |
| public boolean compact(int timeout) | Perform compacting of the server xml transaction log (optimization) |

The third software program included in a preferred embodiment of the present invention is a computer program that provides the capability to allow multiple, simultaneous studio, ION and/or simulator instances to access IRM's and requirement data residing in a file on a server. This third program is referred to as the "Music Server." The Music Server, shown at 92 in FIG. 2, also coordinates transmission of updates made by the studio, ION and/or simulator programs to other studio, ION and/or simulator programs when they access the same IRM.

The music server and the music client programs communicate using Hypertext Transfer Protocol, an industry standard communications protocol, commonly referred to as HTTP. The music server and the music client can also communicate using Hypertext Transfer Protocol Secure, an industry standard encrypted communications protocol, commonly referred to as HTTPS.

Alternatively, the music server software program could be implemented using a different computer language, for example C++, C# or Visual Basic, each of which is well-known. Similarly, the communication between the music server and the music client programs could be implemented using another protocol for program to program communication across computer networks, such as, for example, Remote Method Invocation (RMI) or Distributed Component Object Model (DCOM), both of which are well-known to those skilled in this field.

Alternatively, the functionality provided by the combination of the music server and music client software programs of the present invention could be provided through use of a combination of various commercially available database programs and/or messaging programs. Examples of commercially available database programs suitable for use in the present invention include Oracle and SQL Server. Examples of commercially available messaging programs that are suitable for use in the present invention include MQ Series, Vittria and Java® Messaging Service (JMS).

In another alternative embodiment of the invention, IRM and requirements data files could be stored on one or more server computers, or could be distributed across multiple computers that were running studio, ION and/or simulator, and were utilizing file sharing provided by the computers' disk operating systems to share this data.

The third software component of the present invention, the interactive representation modeling language, referred to as IRML, is a language created for and used in the current invention to specify the behavior of interactive representations. The language is represented in terms of (1) primitives and (2) allowed connections between and among these primitives. The list of IRML primitives, along with their functions, allowed containment relationships, allowed outbound connections and allowed inbound connections are presented in Table II, Table III, Table IV and Table V, respectively, below.

TABLE II

IRML PRIMITIVES AND THEIR FUNCTIONS
© 2002 iRise.
Function of the primitives

| Class | Primitive | Function |
|---|---|---|
| | \multicolumn{2}{c}{User Interface Components - Tags} | |
| | Break | The Break Primitive causes the Simulator to present a HTML "<BR>" tag to force a visible line break. This primitive is not accessible as a selection in the iRise Studio client, it is automatically inserted on each new line. |
| | Button | The Button Primitive causes the Simulator to present a HTML "button" tag. The Simulator processes Form submission when a button within a Form is clicked during the execution of an Interactive Representation. Subsequently the Simulator presents the Page to which the Button is connected. An Image can be used on the button. |
| | Text | The Text Primitive will display two different behaviors during execution of an interactive representation, depending on whether the Text is connected with ControlFlow or not. If the text is connected with control flow, then the Simulator will present a HTML "a href" tag, making it a clickable URL in the Simulator. If the Text is not connected with ControlFlow, then the Simulator will present plain text. |
| | Image | The Image Primitive causes the Simulator to present a HTML "img" tag. The Simulator will display any attached graphical image (gif, jpg, jpeg) during the execution of an Interactive Representation. |
| | \multicolumn{2}{c}{User Interface Components - Input Tags} | |
| | RadioButton | The RadioButton Primitive causes the Simulator to present a HTML "radio" tag with the value provided either from user input during Interactive Representation or defined in the IRM. The Simulator processes DataFlow connected from a RadioButton on Form submission during the execution of an Interactive Representation with the selected value in the RadioButton being used. |
| | Select | The Select Primitive causes the Simulator to present a HTML "select" tag with the options provided either from user input during Interactive Representation or defined in the IRM. The Simulator processes DataFlow connected from a Select on Form submission during the execution of an Interactive Representation with the selected option in the Select being used. |
| | TextArea | The TextArea Primitive causes the Simulator to present a HTML "textarea" tag. The Simulator processes DataFlow connected to a TextArea on Form submission during the execution of an Interactive Representation. The TextArea can populate with text using inbound DataFlow values as defined by the user in the IRM. |
| | TextInput | The TextInput Primitive causes the Simulator to present a HTML input of "text" tag. The Simulator processes DataFlow connected to a TextInput on Form submission during the execution of an Interactive Representation. The TextInput can populate with text using inbound DataFlow values as defined by the user in the IRM. |
| | CheckBox | The CheckBox Primitive causes the Simulator to present a HTML "checkbox" tag. The Simulator processes DataFlow connected to a checkbox on Form submission during the execution of an Interactive Representation. The checkbox can populate with checked or not checked using inbound DataFlow values as defined by the user in the IRM. |
| | \multicolumn{2}{c}{User Interface Components - Container Tags} | |
| | ConditionalHTML | The ConditionalHTML primitive is a container that determines HTML contents to display on execution of an Interactive Representation, based on the defined inbound DataFlow value at runtime (dynamic) or from the IRM (constant/user defined action). The primitives are contained in a condition |

TABLE II-continued

IRML PRIMITIVES AND THEIR FUNCTIONS
© 2002 iRise.
Function of the primitives

| Class | Primitive | Function |
|---|---|---|
| | | that can be defined (T, F, 0, 1, 2 or user defined) that is evaluated on execution and outputs the resulting HTML in the Simulator. |
| | Dynamic Table | The Dynamic Table primitive causes the Simulator to present a HTML table with the number of table rows determined at execution time, based on the subject applications IRM and the number of rows of data matched if the criterion for the contents of the Dynamic Table is populating based off data in the Simulator. |
| | Form | The Form Primitive is used to group input primitives together. When a submission is executed that is contained in the Form, (example, button or text linked to control flow is clicked) the Forms input elements with defined DataFlow (in the IRM) is executed for the Interactive Representation. |
| | Page | The Page Primitive causes the Simulator to present a HTML page. The name of the page defined in the IRM causes the Simulator to create the "Title" tag with the name provided. |
| | Table | The Table Primitive is used to group and layout visual primitives as required. The Table Primitive causes the Simulator to present a HTML "table" tag. |
| | TableCell | The TableCell Primitive is used to group and layout visual primitives as required. The TableCell Primitive causes the Simulator to present a HTML "td" tag. |
| | TableRow | The TableRow Primitive is used to group and layout visual primitives as required. The TableRow Primitive causes the Simulator to present a HTML "tr" tag. |
| Comment | | |
| | Comment | The comment allows a text comment to be defined in the IRM for the purposes of creating a readable note in the model. If the comment is connected to a visual primitive (a instance of which is represented in HTML at execution), it causes the Simulator to present an image of a page in a book next to the connected primitive. This comment text will display when the mouse cursor is left over the image for a second. If connected to a non-visual primitive, the comment can be viewed and edited in the Studio, but will not show in the HTML output during Interactive Representation. |
| Flow Label | | |
| | Flow Label | The flow label primitive is a specialized primitive used to denote a name for the data that flows between two other primitives that are connected using Data Flow. |
| Decision | | |
| | Decision | The Decision primitive is used to specify different control flow based on some modeled criteria (in the IRM), such as user input during the execution of an Interactive Representation. The possible Decisions control flows are user defined in the IRM. |
| References | | |
| | ModelEntry | A single ModelEntry instance is allowed in an IRM to represent a single ControlFlow entry point into the subject application model from another calling Model. |
| | ModelExit | Model Exit represents a single ControlFlow connection leaving a ModelRef element in the subject application to be used by another model. |
| | ModelRef | ModelRef represents an invocation reference to another application IRM with the ability to pass and retrieve data values to the subject application, as well as the ability to enter and return from the referenced IRM through ControlFlow connections. Inbound data values are passed into the subject application IRM through ModelInput defined in the referenced IRM. Outbound values are returned from ModelOutput operations defined in the referenced IRM. Inbound ControlFlow enters through ModelEntry element and outbound DataFlow is |

TABLE II-continued

IRML PRIMITIVES AND THEIR FUNCTIONS
© 2002 iRise.
Function of the primitives

| Class | Primitive | Function |
|---|---|---|
| | | represented by ModelExit elements in the referenced IRM. |
| | Reference | The Reference Primitive allows the definition a Master element, that can then be referred to from multiple locations on multiple pages within the subject application IRM. References can refer to all visual (HTML replaced) Primitives except for Decisions. |
| Constant | | |
| | Constant | A Constant allows for non-changeable values to be defined in the IRM that can be used for statically populating primitives during execution of an Interactive Representation. Another use of Constants is to provide static input values for actions. |
| Action | | |
| | Data Create | The Data Create Action allows for single and composite DataFlow values to be persistently stored from an interactive representation of the subject application. Data Create is equivalent to a single set of Pack and Save actions. The label on the Dataflow connection is the name of the composite data it creates. |
| | Data Delete | The Data Delete Action is used to delete single or composite values from persistently stored data created during an interactive representation of the subject application. The label on the Dataflow connection is the name of the data element and the input DataFlow value is the actual data to be deleted. |
| | Data Find | The Data Find Action returns the results of searching the persistently stored data for a subject application. The inbound DataFlow defines the criteria, the outbound are the values for the data found matching the inbound criteria. If no inbound DataFlow (criteria) is supplied, all values go outbound. If multiple inbound connections, the find criteria is the intersection (AND) of these values. |
| | Data FindOR | The Data FindOR Action returns the results of searching the persistently stored data for a subject application. The inbound DataFlow defines the criteria, the outbound are the values for the data found matching the inbound criteria. If more than one DataFlow is connected inbound, then the Find criteria will find the union of the values, e.g. dataConnectInV1 OR dataConnectInV2. |
| | Data Pack | The Data Pack Action creates a composite DataFlow value from the supplied values on the inbound DataFlow connections. |
| | Data Save | The Data Save Action allows for single or composite Dataflow values to be persistently stored from an interactive representation of the subject application. The label on the inbound Dataflow connection is the name of the data it creates. |
| | Data Unpack | The Data Unpack Action disassembles the data elements in a composite to its single elements. The DataFlow inbound is the composite and the DataFlow outbound label specifies the element to be pulled from the composite. |
| | Data Update | The Data Update Action updates the persistent data stored for the subject application. The first inbound connection is the composite to be updated, the second (and any additional) DataFlow connections inbound are the values to update with. It must be a composite for the first value, single elements cannot be updated. |
| | Session | The Session Action is used for storing data to be used between pages that are not needed beyond the user's interaction. The Session Action stores DataFlow values for the duration of a user's interaction in one specific instance of a connection between the user's browser and the Simulator (uses cookies). Data in a Session Action is NOT put in persistent storage for the subject application. There is only one instance of a Session Action for each |

TABLE II-continued

IRML PRIMITIVES AND THEIR FUNCTIONS
© 2002 iRise.
Function of the primitives

| Class | Primitive | Function |
|---|---|---|
| | | user's connection, it can store unlimited amounts of composites or single data elements, but the names must be unique, otherwise it will be overwritten. |
| | HTML Href | The HTML Href action takes the DataFlow inputs to construct a URL that can be used to connect to text to display as a clickable href during execution of the interactive representation. The first inbound DataFlow connection is the text that the URL will display and the second inbound DataFlow connections make up the actual URL. More inbound DataFlow connections can be made, these will be appended as name value pairs. E.g. ?s1 = val1&s2 = val2 where s1 is the name of the connected DataFlow and val1 is the data value. The URL value should be complete, using http:// in at the start, otherwise it will prepend the Simulator URL. |
| | HTML Img | The HTML Img action takes the DataFlow inputs to construct a URI that can be used to connect to text to display an image during execution of the interactive representation. The first inbound DataFlow connection is the URI to an image that will display. |
| | HTML Link | The HTML Link action takes the DataFlow inputs to construct a URL that can be used to connect to text to display as a clickable href during execution of the interactive representation. The first inbound DataFlow connections make up the actual URL and the second inbound DataFlow connection is the text that the URL will display. The URL value should be complete, using http:// in at the start, otherwise it will prepend the Simulator URL. |
| | List Count | The List Count Action counts the number of data values connected on the inbound DataFlow. The count number is the outbound DataFlow value. An example use could be to count the number of found elements from a Find Action. |
| | List Range | The List Range Action returns the values in the range specified by the inbound DataFlow required connections. The first inbound DataFlow connection is the list of data values that the range will be extracted from, the second inbound DataFlow connection is the number of elements to be returned. The third optional inbound DataFlow connection can be used to specify an offset, or starting point from the supplied list of values. |
| | List Sequence | The List Sequence Action acts like a counter that will increment by one when supplied a value for name on the required first inbound DataFlow connection. The name gives each instance of a List Sequence Action a unique identifier. The second optional DataFlow inbound connection will set the sequence to the supplied value. The optional DataFlow outbound connection can be used to get the sequence number. |
| | List Sort | The List Sort will alphabetically sort the named data values specified on the inbound DataFlow connections. The first inbound DataFlow connection is the compound dataobject, the second inbound DataFlow is the name of the data element to be sorted. Note: For the second inbound DataFlow connection, it is the name of the element that is the sorting criteria, not the value. |
| | Cast | The Cast Action changes the name of single or composite data supplied on the inbound DataFlow connection to whatever is specified as the name of the outbound DataFlow connection. |
| | Email | The Email Action uses the following required DataFlow inputs to form an SMTP email message that will actually be sent if the Simulators server is configured to use an SMTP server. First input is To, second is From, third is Subject, and fourth is the Body. The labels used in the inbound connections must match those exactly (To, From, Subject, Body). |

TABLE II-continued

IRML PRIMITIVES AND THEIR FUNCTIONS
© 2002 iRise.
Function of the primitives

| Class | Primitive | Function |
|---|---|---|
| | Logic AND | The Logic AND Action evaluates any inbound DataFlow connections, if ALL of the optional inputs are 1 then True is the DataFlow outbound connection value, else it is <null>. When only an outbound DataFlow connection is made, then value will be True. |
| | Logic OR | The Logic OR Action evaluates any inbound DataFlow connections, if ANY of the optional inputs are 1 then True is the DataFlow outbound connection value, else it is <null>. When only an outbound DataFlow connection is made, then value will be <null>. |
| | Logic NOT | The Logic NOT Action evaluates any inbound DataFlow connections, if the first of the optional inputs are 0 then True is the DataFlow outbound connection value, else it is <null>. When only an outbound DataFlow connection is made, then value will be <null>. |
| | Logic FALSE | The Logic FALSE Action always returns <null> on the DataFlow connection outbound, not matter what DataFlow connections are made inbound. |
| | Logic TRUE | The Logic FALSE Action always returns True on the DataFlow connection outbound, not matter what DataFlow connections are made inbound. |
| | Math Plus | The Math Plus Action adds the optional DataFlow inbound connection values together. If no inputs are supplied, the outbound DataFlow connection value is 0.0. |
| | Math Minus | The Math Minus Action subtracts the optional DataFlow inbound connection values from each other. If no inputs are supplied, the outbound DataFlow connection value is 0.0. |
| | Math Div | The Math Div Action divides the optional DataFlow inbound connection values by each other. If no inputs are supplied, the outbound DataFlow connection value is 0.0. |
| | Math Mult | The Math Mult Action multiplies the optional DataFlow inbound connection values by each other, If no inputs are supplied, the outbound DataFlow connection value is 0.0. |
| | Math Min | The Math Min Action outputs the smallest value of all the optional values supplied on the inbound DataFlow connections. Negative numbers are considered smaller than zero and positive numbers, If no inputs are supplied, the outbound DataFlow connection value is 0.0. |
| | Math Max | The Math Max Action outputs the largest value of all the optional values supplied on the inbound DataFlow connections. Negative numbers are considered smaller than zero and positive numbers, If no inputs are supplied, the outbound DataFlow connection value is 0.0. |
| | Math Remainder | The Math Remainder Action divides the optional DataFlow inbound connection values by each other and outputs the remainder. If no inputs are supplied, the outbound DataFlow connection value is 0.0. |
| | Math Floor | The Math Floor Action rounds down the first (optional) DataFlow inbound connection value to the nearest integer number. If no inputs are supplied, the outbound DataFlow connection value is 0.0. |
| | Math Round | The Math Round rounds up or down to the closest of the first (optional) DataFlow inbound connection value to the nearest whole integer number. If no inputs are supplied, the outbound DataFlow connection value is 0.0 |
| | Math Abs | The Math Abs gives the absolute integer value of the first (optional) DataFlow inbound connection value, If no inputs are supplied, the outbound DataFlow connection value is 0.0 |
| | Math Ceiling | The Math Ceiling Action rounds up the first (optional) DataFlow inbound connection value to the nearest integer number. If no inputs are supplied, the outbound DataFlow connection value is 0.0. |

TABLE II-continued

IRML PRIMITIVES AND THEIR FUNCTIONS
© 2002 iRise.
Function of the primitives

| Class | Primitive | Function |
|---|---|---|
| | Math Random | The Math Random Action generates a random decimal number between zero and one. Any inbound DataFlow connections will be ignored. |
| | Math LT | The Math LT Action returns true if the first (optional) DataFlow inbound connection value is less than the second (optional) inbound connection value, otherwise returns <null>. |
| | Math GT | The Math GT Action returns true if the first (optional) DataFlow inbound connection value is greater than the second (optional) inbound connection value, otherwise returns <null>. |
| | Math LE | The Math LE Action returns true if the first (optional) DataFlow inbound connection value is less than or equal to the second (optional) inbound connection value, otherwise returns <null>. |
| | Math GE | The Math GE Action returns true if the first (optional) DataFlow inbound connection value is greater than or equal to the second (optional) inbound connection value, otherwise returns <null>. |
| | Math EQ | The Math EQ Action returns true if the first (optional) DataFlow inbound connection value is equal to the second (optional) inbound connection value, otherwise returns <null>. |
| | Math NE | The Math NE Action returns true if the first (optional) DataFlow inbound connection value is NOT equal to the second (optional) inbound connection value, otherwise returns <null>. |
| | ModelInput | The ModelInput Primitive represents a single inbound DataFlow value passed in from a calling IRM. |
| | ModelOutput | The ModelOutput Primitive represents a single outbound DataFlow value passed from the subject application IRM to another application IRM. |
| | Text Length | The Text Length Action counts the number of characters in the single data values connected on the inbound DataFlow. The count number is the outbound DataFlow value. |
| | Text Trim | The Text Trim Action removes any leading or ending space characters in the single data values connected on the inbound DataFlow. The resulting string is the outbound DataFlow value. |
| | Text Lowercase | The Text Lowercase Action converts any alphabetical characters in the single data values connected on the inbound DataFlow to lowercase. The resulting string is the outbound DataFlow value. |
| | Text Uppercase | The Text Uppercase Action converts any alphabetical characters in the single data values connected on the inbound DataFlow to lowercase. The resulting string is the outbound DataFlow value. |
| | Text Equals | The Text Equals Action returns True if the first (optional) DataFlow inbound connection value is equal to the second (optional) inbound connection value, otherwise returns <null>. |
| | Text Notequal | The Text Notequal Action returns True if the first (optional) DataFlow inbound connection value is not equal to the second (optional) inbound connection value, otherwise returns <null>. |
| | Text Add | The Text Add Action concatenates the optional DataFlow inbound single values that are connected to make one single String for the outbound DataFlow value. |
| | Text Substrng | The Text Substrng Action outputs the String value for the substring as specified by the starting and ending count. The first inbound DataFlow connection provides the single string, the second inbound DataFlow value is the starting index and the third inbound DataFlow is the ending index. If no inbound values are provided, <null> is returned. If no starting index is provided, then the string as it was inputted will be returned. The first character in the string is index 1. |

TABLE II-continued

IRML PRIMITIVES AND THEIR FUNCTIONS
© 2002 iRise.
Function of the primitives

| Class | Primitive | Function |
|---|---|---|
| | UserDefined | The UserDefined Action allows the user to define a constant value for any inbound or outbound DataFlow connections that are made to the instance of a UserDefined Action. |

TABLE III

IRML Prmitives and Allowed Containment Relationships
© 2002 iRise.

| Class | Primitive | Allowed Containment Relationships |
|---|---|---|
| User Interface Components - Tags | | |
| | Break | Must be contained in a Page, can be contained inside a TableCell, Form or a ConditionalHTML |
| | Button | Must be contained in a Form, can be contained inside a Table Cell, Dynamic Table or Conditional Html (inside a Form.) |
| | Text | Must be contained in a Page, can be contained inside a Form, TableCell, Dynamic Table or ConditionalHTML |
| | Image | Must be contained in a Page, can be contained inside a Form, TableCell, Dynamic Table or ConditionalHTML |
| User Interface Components - Input Tags | | |
| | RadioButton | Must be contained in a Form, can be contained inside a TableCell, Dynamic Table or Conditional Html (inside a Form.) |
| | Select | Must be contained in a Form, can be contained inside a TableCell, Dynamic Table or Conditional Html (inside a Form.) |
| | TextArea | Must be contained in a Form, can be contained inside a TableCell, Dynamic Table or Conditional Html (inside a Form.) |
| | TextInput | Must be contained in a Form, can be contained inside a TableCell, Dynamic Table or Conditional Html (inside a Form.) |
| | CheckBox | Must be contained in a Form, can be contained inside a TableCell, Dynamic Table or Conditional Html (inside a Form.) |
| User Interface Components - Container Tags | | |
| | ConditionalHTML | Must be contained in a Page, can be contained inside a Table, TableRow, TableCell, Form, Dynamic Table Note: ConditionalHTML can only contain TableCell if it is contained in a TableRow and can only contain TableRow if it is contained in a Table |
| | Dynamic Table | Must be contained in a Page, can be contained inside a TableCell or Form. Can also be contained in a ConditionalHTML inside a TableCell. |
| | Form | Must be contained in a Page, can be contained inside a Form, TableCell or ConditionalHTML |
| | Page | Page is not contained by any Primitive, it can contain all visual Primitives. |
| | Table | Must be contained in a Page, can be contained inside a TableCell, Form or a ConditionalHTML |

TABLE III-continued

IRML Prmitives and Allowed Containment Relationships
© 2002 iRise.

| Class | Primitive | Allowed Containment Relationships |
|---|---|---|
| | TableCell | Must be contained in a TableRow. |
| | TableRow | Must be contained in a Table. |
| Comment | | |
| | Comment | None |
| Flow Label | | |
| | Flow Label | None |
| Decision | | |
| | Decision | None |
| References | | |
| | ModelEntry | None |
| | ModelExit | None |
| | ModelRef | None |
| | Reference | Embedded references in Pages can occur in any location where the Referent Primitive would be allowed based on its containment rules. |
| Constant | | |
| | Constant | None |
| Action | | None |
| | Data Create | None |
| | Data Delete | None |
| | Data Find | None |
| | Data FindOR | None |
| | Data Pack | None |
| | Data Save | None |
| | Data Unpack | None |
| | Data Update | None |
| | Session | None |
| | HTML Href | None |
| | HTML Img | None |
| | HTML Link | None |
| | List Count | None |
| | List Range | None |
| | List Sequence | None |
| | List Sort | None |
| | Cast | None |
| | Email | None |
| | Logic AND | None |
| | Logic OR | None |
| | Logic NOT | None |
| | Logic FALSE | None |
| | Logic TRUE | None |
| | Math Plus | None |
| | Math Minus | None |
| | Math Div | None |
| | Math Mult | None |
| | Math Min | None |
| | Math Max | None |
| | Math Remainder | None |
| | Math Floor | None |
| | Math Round | None |
| | Math Abs | None |
| | Math Ceiling | None |
| | Math Random | None |
| | Math LT | None |
| | Math GT | None |
| | Math LE | None |
| | Math GE | None |
| | Math EQ | None |
| | Math NE | None |
| | ModelInput | None |
| | ModelOutput | None |
| | Text Length | None |
| | Text Trim | None |
| | Text Lowercase | None |
| | Text Uppercase | None |
| | Text Equals | None |
| | Text Notequal | None |
| | Text Add | None |
| | Text Substrng | None |
| | UserDefined | None |

TABLE IV

IRML Primitives and Allowed Outbound Connections
© 2002 iRise.
Allowed outbound connections from the primitives

| Class | Primitive | Allowed Connections Outbound |
|---|---|---|
| User Interface Components - Tags | | |
| | Break | None |
| | Button | A button can be connected to a Page, Decision, ModelExit, ModelRef and Reference with Control Flow. Maximum of one Control Flow connection can be made from a button at one point in time. |
| | Text | Text can be connected to a Page, Decision, ModelExit, ModelRef and Reference with Control Flow. Maximum of one Control Flow connection can be made from text at one point in time. |
| | Image | An image can be connected to a Page, Decision, ModelExit, ModelRef and Reference with Control Flow. Maximum of one Control Flow connection can be made from an Image at one point in time. |
| User Interface Components - Input Tags | | |
| | RadioButton | A RadioButton can be connected to Text, TextArea, TextInput, RadioButton, Checkbox, Select, Reference, Decision, Action and ModelRef with DataFlow. Although only one instance of a primitive in the list above can be connected directly to the checkbox at one point in time, an unlimited number of DataFlow connections can be made from a data branch that is connected from a RadioButton, to any instance of the primitives listed above. |
| | Select | A Select can be connected to Text, TextArea, TextInput, RadioButton, Checkbox, Select, Reference, Decision, Action and ModelRef with DataFlow. Although only one instance of a primitive in the list above can be connected directly to the checkbox at one point in time, an unlimited number of DataFlow connections can be made from a data branch that is connected from a select, to any instance of the primitives listed above. |
| | TextArea | A TextArea can be connected to Text, TextArea, TextInput, RadioButton, Checkbox, Select, Reference, Decision, Action and ModelRef with DataFlow. Although only one instance of a primitive in the list above can be connected directly to the TextArea at one point in time, an unlimited number of DataFlow connections can be made from a data branch that is connected from a TextArea, to any instance of the primitives listed above. |
| | TextInput | A TextInput can be connected to Text, TextArea, TextInput, RadioButton, Checkbox, Select, Reference, Decision, Action and ModelRef with DataFlow. Although only one instance of a primitive in the list above can be connected directly to the TextInput at one point in time, an unlimited number of DataFlow connections can be made from a data branch that is connected from a TextInput, to any instance of the primitives listed above. |
| | CheckBox | A checkbox can be connected to Text, TextArea, TextInput, RadioButton, Checkbox, Select, Reference, Decision, Action and ModelRef with DataFlow. Although only one instance of a primitive in the list above can be connected directly to the checkbox at one point in time, an unlimited number of DataFlow connections can be made from a data branch that is connected from a checkbox, to any instance of the primitives listed above. |
| User Interface Components - Container Tags | | |
| | ConditionalHTML | None |
| | Dynamic Table | None |
| | Form | None |
| | Page | None |
| | Table | None |
| | TableCell | None |
| | TableRow | None |
| Comment | | |
| | Comment | Can connect to any primitive, is not directional (inbound/outbound) |
| Flow Label | | |
| | Flow Label | Because a Flow Label simply appears as a label on data flow connections, its connection rules are embodied in the rules for the primitives that are to be connected; I.e., the rules expressed in this column of the appendix. |
| Decision | | |
| | Decision | A Decision can be connected to a Page, Decision, ModelExit, ModelRef and Reference with Control Flow. There is no maximum on the number of Control Flow connections that can be made from a Decision at one point in time. Each one of these outbound ControlFlow connections is labeled with a Condition identifier. The condition can be user defined. |
| References | | |
| | ModelEntry | A required single ControlFlow connection to Page, Decision or Reference to Page or to Decision. |
| | ModelExit | No outbound connections are allowed |
| | ModelRef | Multiple outbound DataFlow connections are allowed up to the same number of ModelOutputs defined in the referenced IRM. Multiple outbound ControlFlow connections are allowed up to the number of ModelExits defined in the referenced IRM. |
| | Reference | N/A |
| Constant | | |
| | Constant | A Constant can be connected to Text, TextArea, TextInput, RadioButton, Checkbox, Select, Reference, Decision, Action and ModelRef with DataFlow. An unlimited number of DataFlow |

TABLE IV-continued

IRML Primitives and Allowed Outbound Connections
© 2002 iRise.
Allowed outbound connections from the primitives

| Class | Primitive | Allowed Connections Outbound |
|---|---|---|
| Action | | connections can be made from a constant to any instance of the primitives listed above. The outbound connections for actions are specific to each one as described below. Any outbound connection can only be DataFlow. |
| | Data Create | Data Create requires an outbound DataFlow to be connected. Only one outbound DataFlow connection can be made at any point in time. |
| | Data Delete | Not required. There is no maximum on the number of outbound DataFlow connections that can be made to a Data Delete instance at any point in time. |
| | Data Find | Data Find requires an Outbound DataFlow connection. Only one outbound DataFlow connection can be made to a Data Find instance at any point in time. |
| | Data FindOR | Data FindOR requires an Outbound DataFlow connection. Only one outbound DataFlow connection can be made to a Data FindOR instance at any point in time. |
| | Data Pack | Data Pack requires an Outbound DataFlow connection. Only one outbound DataFlow connection can be made to a Data Pack instance at any point in time. |
| | Data Save | Not required. There is no maximum on the number of outbound DataFlow connections that can be made to a Data Save instance at any point in time. |
| | Data Unpack | Data Unpack requires an Outbound DataFlow connection. There is no maximum on the number of outbound DataFlow connections that can be made to a Data Unack instance at any point in time. |
| | Data Update | Not required. There is no maximum on the number of outbound DataFlow connections that can be made to a Data Update instance at any point in time. |
| | Session | Not required. There is no maximum on the number of outbound DataFlow connections that can be made to a Session instance at any point in time. |
| | HTML Href | HTML Href requires an Outbound DataFlow connection. Only one outbound DataFlow connection can be made to a HTML Href instance at any point in time. |
| | HTML Img | HTML Img requires an Outbound DataFlow connection. Only one outbound DataFlow connection can be made to a HTML Img instance at any point in time. |
| | HTML Link | HTML Link requires an Outbound DataFlow connection. Only one outbound DataFlow connection can be made to a HTML Link instance at any point in time. |
| | List Count | List Count requires an Outbound DataFlow connection. Only one outbound DataFlow connection can be made to a List Count instance at any point in time. |
| | List Range | List Range requires an Outbound DataFlow connection. Only one outbound DataFlow connection can be made to a List Range instance at any point in time. |
| | List Sequence | Not required. There is no maximum on the number of outbound DataFlow connections that can be made to a List Sequence instance at any point in time. |
| | List Sort | List Sort requires an Outbound DataFlow connection. Only one outbound DataFlow connection can be made to a List Sort instance at any point in time. |
| | Cast | Cast requires an Outbound DataFlow connection. Only one outbound DataFlow connection can be made to a Cast instance at any point in time. |
| | Email | Not required. There is no maximum on the number of outbound DataFlow connections that can be made to an Email instance at any point in time. |
| | Logic AND | Logic AND requires an Outbound DataFlow connection. Only one outbound DataFlow connection can be made to a Logic AND instance at any point in time. |
| | Logic OR | Logic OR requires an Outbound DataFlow connection. Only one outbound DataFlow connection can be made to a Logic OR instance at any point in time. |
| | Logic NOT | Logic NOT requires an Outbound DataFlow connection. Only one outbound DataFlow connection can be made to a Logic NOT instance at any point in time. |
| | Logic FALSE | Logic FALSE requires an Outbound DataFlow connection. Only one outbound DataFlow connection can be made to a Logic FALSE instance at any point in time. |
| | Logic TRUE | Logic TRUE requires an Outbound DataFlow connection. Only one outbound DataFlow connection can be made to a Logic TRUE instance at any point in time. |
| | Math Plus | Math Plus requires an Outbound DataFlow connection. Only one outbound DataFlow connection can be made to a Math Plus instance at any point in time. |
| | Math Minus | Math Minus requires an Outbound DataFlow connection. Only one outbound DataFlow connection can be made to a Math Minus instance at any point in time. |
| | Math Div | Math Div requires an outbound DataFlow connection. Only one outbound DataFlow connection can be made to a Math Div instance at any point in time. |
| | Math Mult | Math Mult requires an outbound DataFlow connection. Only one outbound DataFlow connection can be made to a Math Mult instance at any point in time. |
| | Math Min | Math Min requires an outbound DataFlow connection. Only one outbound DataFlow connection can be made to a Math Min instance at any point in time. |

TABLE IV-continued

IRML Primitives and Allowed Outbound Connections
© 2002 iRise.
Allowed outbound connections from the primitives

| Class | Primitive | Allowed Connections Outbound |
|---|---|---|
| | Math Max | Math Max requires an outbound DataFlow connection. Only one outbound DataFlow connection can be made to a Math Max instance at any point in time. |
| | Math Remainder | Math Div requires an outbound DataFlow connection. Only one outbound DataFlow connection can be made to a Math Div instance at any point in time. |
| | Math Floor | Math Floor requires an outbound DataFlow connection. Only one outbound DataFlow connection can be made to a Math Floor instance at any point in time. |
| | Math Round | Math Round requires an outbound DataFlow connection. Only one outbound DataFlow connection can be made to a Math Round instance at any point in time. |
| | Math Abs | Math Abs requires an outbound DataFlow connection. Only one outbound DataFlow connection can be made to a Math Abs instance at any point in time. |
| | Math Ceiling | Math Ceiling requires an outbound DataFlow connection. Only one outbound DataFlow connection can be made to a Math Ceiling instance at any point in time. |
| | Math Random | Math Random requires an outbound DataFlow connection. Only one outbound DataFlow connection can be made to a Math Random instance at any point in time. |
| | Math LT | Math LT requires an outbound DataFlow connection. Only one outbound DataFlow connection can be made to a Math LT instance at any point in time. |
| | Math GT | Math GT requires an outbound DataFlow connection. Only one outbound DataFlow connection can be made to a Math GT instance at any point in time. |
| | Math LE | Math LE requires an outbound DataFlow connection. Only one outbound DataFlow connection can be made to a Math LE instance at any point in time. |
| | Math GE | Math GE requires an outbound DataFlow connection. Only one outbound DataFlow connection can be made to a Math GE instance at any point in time. |
| | Math EQ | Math EQ requires an outbound DataFlow connection. Only one outbound DataFlow connection can be made to a Math EQ instance at any point in time. |
| | Math NE | Math NE requires an outbound DataFlow connection. Only one outbound DataFlow connection can be made to a Math NE instance at any point in time. |
| | ModelInput | A required single Outbound DataFlow connection is allowed |
| | ModelOutput | No Outbound DataFlow connections are allowed |
| | Text Length | Text Length requires an Outbound DataFlow connection. Only one outbound DataFlow connection can be made to a Text Length instance at any point in time. |
| | Text Trim | Text Trim requires an Outbound DataFlow connection. Only one outbound DataFlow connection can be made to a Text Trim instance at any point in time. |
| | Text Lowercase | Text Lowercase requires an Outbound DataFlow connection. Only one outbound DataFlow connection can be made to a Text Lowercase instance at any point in time. |
| | Text Uppercase | Text Uppercase requires an outbound DataFlow connection. Only one outbound DataFlow connection can be made to a Text Uppercase instance at any point in time. |
| | Text Equals | Text Equals requires an outbound DataFlow connection. Only one outbound DataFlow connection can be made to a Text Equals instance at any point in time. |
| | Text Notequal | Text Notequal requires an outbound DataFlow connection. Only one outbound DataFlow connection can be made to a Text Notequal instance at any point in time. |
| | Text Add | Text Add requires an outbound DataFlow connection. Only one outbound DataFlow connection can be made to a Text Add instance at any point in time. |
| | Text Substrng | Text Substrng requires an outbound DataFlow connection. Only one outbound DataFlow connection can be made to a Text Substrng instance at any point in time. |
| | UserDefined | Not Required. Any number of outbound DataFlow connections can be made to a UserDefined Action at any point in time. |

In Table V, the permitted inbound connections for the primitives are listed.

TABLE V

IRML Primitives and Allowed Inbound Connections
© 2002 iRise.

| Class | Primitive | Allowed Connections Inbound |
|---|---|---|
| User Interface Components - Tags | | |
| | Break | None |
| | Button | None |
| | Text | TextArea, TextInput, RadioButton, |

TABLE V-continued

IRML Primitives and Allowed Inbound Connections
© 2002 iRise.

| Class | Primitive | Allowed Connections Inbound |
|---|---|---|
| | | Checkbox, Select, Constant, Action and ModelRef can be connected to a Checkbox with DataFlow. Only one inbound connection can be made at any one point in time. |
| | Image | None |
| User Interface Components - Input Tags | | |
| | RadioButton | TextArea, TextInput, RadioButton, Checkbox, Select, Constant, Action and ModelRef can be connected to a RadioButton with DataFlow. Two inbound connections can be made at any one point in time. The first connection is the list of options, the second connection is the default value selected. The second connection is optional. |
| | Select | TextArea, TextInput, RadioButton, Checkbox, Select, Constant, Action and ModelRef can be connected to a Select with DataFlow. Two inbound connections can be made at any one point in time. The first connection is the list of options, the second connection is the default value selected. The second connection is optional. |
| | TextArea | TextArea, TextInput, RadioButton, Checkbox, Select, Constant, Action and ModelRef can be connected to a TextArea with DataFlow. Only one inbound connection can be made at any one point in time. |
| | TextInput | TextArea, TextInput, RadioButton, Checkbox, Select, Constant, Action and ModelRef can be connected to a TextInput with DataFlow. Only one inbound connection can be made at any one point in time. |
| | CheckBox | TextArea, TextInput, RadioButton, Checkbox, Select, Constant, Action and ModelRef can be connected to a Checkbox with DataFlow. Only one inbound connection can be made at any one point in time. |
| User Interface Components - Container Tags | | |
| | ConditionalHTML | TextArea, TextInput, RadioButton, Checkbox, Select, Constant, and Action can be connected to a Checkbox with DataFlow. Only one inbound connection can be made at any one point in time. |
| | Dynamic Table | TextArea, TextInput, RadioButton, Checkbox, Select, Constant, and Action can be connected to a Dynamic Table with DataFlow. Only one inbound connection can be made at any one point in time. |
| | Form | none |
| | Page | Button, Image, Text, Decision, ModelEntry, ModelRef using Control Flow. There is no maximum on the number of ControlFlow connections to a page. |
| | Table | none |
| | TableCell | none |
| | TableRow | none |
| Comment | | |
| | Comment | Can connect to any primitive, is not directional (inbound/outbound) |
| Flow Label | | |
| | Flow Label | Because a Flow Label simply appears as a label on data flow connections, its connection rules are embodied in the rules for the primitives that are to be connected; I.e., the rules expressed in this column of the appendix. |

TABLE V-continued

IRML Primitives and Allowed Inbound Connections
© 2002 iRise.

| Class | Primitive | Allowed Connections Inbound |
|---|---|---|
| Decision | | |
| | Decision | TextArea, TextInput, RadioButton, Checkbox, Select, Constant, and Action can be connected to a Decision with DataFlow. Only one inbound DataFlow connection can be made at any one point in time. ControlFlow can be used to connect Images, Buttons and Text into a Decision. |
| References | | |
| | ModelEntry | No inbound connections are allowed |
| | ModelExit | Inbound ControlFlow connections from Text, Button, Image, or Decision are required. |
| | ModelRef | Multiple inbound DataFlow connections are allowed up to the number of ModelInputs defined in the referenced IRM. Multiple outbound ControlFlow connections are allowed up to the number of ModelExits defined in the referenced IRM. |
| | Reference | N/A |
| Constant | | |
| | Constant | none |
| Action | | The inbound connections for actions are specific to each one as described below. Any inbound connection can only be DataFlow. |
| | Data Create | Data Create requires an inbound DataFlow to be connected. There is no maximum on the number of inbound DataFlow connections that can be made to a Data Create instance at any point in time. |
| | Data Delete | Data Delete requires an inbound DataFlow to be connected. Only one inbound DataFlow connection can be made to a Data Delete instance at any point in time. |
| | Data Find | Not required. There is no maximum on the number of inbound DataFlow connections that can be made to a Data Find instance at any point in time. |
| | Data FindOR | At least one inbound DataFlow connection is required. There is no maximum on the number of inbound DataFlow connections that can be made to a Data FindOR instance at any point in time. If multiple inbound connections are made, the FindOR will return the OR of the values connected. |
| | Data Pack | At least one inbound DataFlow connection is required. There is no maximum on the number of inbound DataFlow connections that can be made to a Data Pack instance at any point in time. |
| | Data Save | One inbound DataFlow connection is required. Only one inbound connection can be made to an instance of a Data Save at any point in time. |
| | Data Unpack | One inbound DataFlow connection is required. Only one inbound connection can be made to an instance of a Data Unpack at any point in time. |
| | Data Update | Two inbound DataFlow connections are required. There is no maximum on the number of inbound DataFlow connections that can be made to a Data Update instance at any point in time. |
| | Session | Not required. There is no maximum on the number of inbound DataFlow connections that can be made to a Session instance at any point in time. |

TABLE V-continued

IRML Primitives and Allowed Inbound Connections
© 2002 iRise.

| Class | Primitive | Allowed Connections Inbound |
|---|---|---|
| | HTML Href | HTML Href requires an inbound DataFlow to be connected. There is no maximum on the number of inbound DataFlow connections that can be made to a HTML Href instance at any point in time. |
| | HTML Img | HTML Img requires an inbound DataFlow connection. Only one inbound DataFlow connection can be made to a HTML Img instance at any point in time. |
| | HTML Link | HTML Link requires two inbound DataFlow connections. Maximum of two inbound DataFlow connections can be made to a HTML Link instance at any point in time. |
| | List Count | List Count requires an inbound DataFlow connection. Only one inbound DataFlow connection can be made to a List Count instance at any point in time. |
| | List Range | List Range requires two inbound DataFlow connections. There is no maximum on the number of inbound DataFlow connections that can be made to a List Range instance at any point in time. The third inbound connection will be used as the offset for the range, any more inbound connections will be ignored. |
| | List Sequence | List Sequence requires an inbound DataFlow connection. There is no maximum on the number of inbound DataFlow connections that can be made to a List Sequence instance at any point in time. The second (optional) inbound connection can be used to set the value of the sequence instance, any more inbound connections will be ignored. |
| | List Sort | List Range requires two inbound DataFlow connections. Only two inbound DataFlow connections can be made at any point in time. |
| | Cast | Cast requires an inbound DataFlow connection. Only one inbound DataFlow connection can be made to a Cast instance at any point in time. |
| | Email | Email requires four inbound DataFlow connections. Only four inbound DataFlow connections can be made at any point in time. |
| | Logic AND | Not required. There is no maximum on the number of inbound DataFlow connections that can be made to a Logic AND instance at any point in time. |
| | Logic OR | Not required. There is no maximum on the number of inbound DataFlow connections that can be made to a Logic OR instance at any point in time. |
| | Logic NOT | Not required. There is no maximum on the number of inbound DataFlow connections that can be made to a Logic NOT instance at any point in time. |
| | Logic FALSE | Not required. There is no maximum on the number of inbound DataFlow connections that can be made to a Logic FALSE instance at any point in time. |
| | Logic TRUE | Not required. There is no maximum on the number of inbound DataFlow connections that can be made to a Logic TRUE instance at any point in time. |
| | Math Plus | Not required. There is no maximum on the number of inbound DataFlow connections that can be made to a Math Plus instance at any point in time. |

TABLE V-continued

IRML Primitives and Allowed Inbound Connections
© 2002 iRise.

| Class | Primitive | Allowed Connections Inbound |
|---|---|---|
| | Math Minus | Not required. There is no maximum on the number of inbound DataFlow connections that can be made to a Math Minus instance at any point in time. |
| | Math Div | Not required. There is no maximum on the number of inbound DataFlow connections that can be made to a Math Div instance at any point in time. |
| | Math Mult | Not required. There is no maximum on the number of inbound DataFlow connections that can be made to a Math Mult instance at any point in time. |
| | Math Min | Not required. There is no maximum on the number of inbound DataFlow connections that can be made to a Math Min instance at any point in time. |
| | Math Max | Not required. There is no maximum on the number of inbound DataFlow connections that can be made to a Math Max instance at any point in time. |
| | Math Remainder | Not required. There is no maximum on the number of inbound DataFlow connections that can be made to a Math Div instance at any point in time. |
| | Math Floor | Not required. There is no maximum on the number of inbound DataFlow connections that can be made to a Math Floor instance at any point in time, but any connections other than the first one will be ignored. |
| | Math Round | Not required. There is no maximum on the number of inbound DataFlow connections that can be made to a Math Round instance at any point in time, but any connections other than the first one will be ignored. |
| | Math Abs | Not required. There is no maximum on the number of inbound DataFlow connections that can be made to a Math Abs instance at any point in time, but any connections other than the first one will be ignored. |
| | Math Ceiling | Not required. There is no maximum on the number of inbound DataFlow connections that can be made to a Math Ceiling instance at any point in time, but any connections other than the first one will be ignored. |
| | Math Random | Not required. There is no maximum on the number of inbound DataFlow connections that can be made to a Math Random instance at any point in time, but any connections will be ignored. |
| | Math LT | Not required. There is no maximum on the number of inbound DataFlow connections that can be made to a Math LT instance at any point in time, but any connections other than the first two will be ignored. |
| | Math GT | Not required. There is no maximum on the number of inbound DataFlow connections that can be made to a Math GT instance at any point in time, but any connections other than the first two will be ignored. |
| | Math LE | Not required. There is no maximum on the number of inbound DataFlow connections that can be made to a Math LE instance at any point in time, but any connections other than the first two will be ignored. |
| | Math GE | Not required. There is no maximum on the number of inbound DataFlow connections that can be made to a Math GE instance at any point in time, but any |

TABLE V-continued

IRML Primitives and Allowed Inbound Connections
© 2002 iRise.

| Class | Primitive | Allowed Connections Inbound |
|---|---|---|
| | | connections other than the first two will be ignored. |
| | Math EQ | Not required. There is no maximum on the number of inbound DataFlow connections that can be made to a Math EQ instance at any point in time, but any connections other than the first two will be ignored. |
| | Math NE | Not required. There is no maximum on the number of inbound DataFlow connections that can be made to a Math NE instance at any point in time, but any connections other than the first two will be ignored. |
| | ModelInput | No inbound DataFlow connections are allowed |
| | ModelOutput | A required single Inbound DataFlow connection is allowed |
| | Text Length | Not required. There is no maximum on the number of inbound DataFlow connections that can be made to a Text Length instance at any point in time, but any connections other than the first one will be ignored. |
| | Text Trim | Not required. There is no maximum on the number of inbound DataFlow connections that can be made to a Text Trim instance at any point in time, but any connections other than the first one will be ignored. |
| | Text Lowercase | Not required. There is no maximum on the number of inbound DataFlow connections that can be made to a Text Lowercase instance at any point in time, but any connections other than the first one will be ignored. |
| | Text Uppercase | Not required. There is no maximum on the number of inbound DataFlow connections that can be made to a Text Uppercase instance at any point in time, but any connections other than the first one will be ignored. |
| | Text Equals | Not required. There is no maximum on the number of inbound DataFlow connections that can be made to a Text Equals instance at any point in time, but any connections other than the first two will be ignored. |
| | Text Notequal | Not required. There is no maximum on the number of inbound DataFlow connections that can be made to a Text Notequal instance at any point in time, but any connections other than the first two will be ignored. |
| | Text Add | Not required. There is no maximum on the number of inbound DataFlow connections that can be made to a Text Add instance at any point in time. |
| | Text Substrng | Not required. There is no maximum on the number of inbound DataFlow connections that can be made to a Text Substrng instance at any point in time, but any more than two DataFlow input connections will be ignored. |
| | UserDefined | Not Required. Any number of inbound DataFlow connections can be made to a UserDefined Action at any point in time. |

There are nine classes of primitives in IRML in the preferred embodiment of the present invention: (1) user interface components referred to as "tags"; (2) user interface components referred to as "input tags"; (3) user interface components referred to as "container tags" or "containers"; (4) comments; (5) flow labels; (6) decisions; (7) references, (8) constants and (9) actions.

The first three classes of primitives, the user interface tags, input tags and container tags are similar. The variation in their functions is readily apparent from their descriptions in Tables I-V and from the detailed discussions of the control flow and data flow visitation algorithms below. These user interface components and the relationships among them define how the interactive representation will appear to the user, as will be described in regard to the simulator component. The relationships among the user interface components represents information that is important to how the interactive representation will appear to the user. The definition of a primitive itself is not sufficient to represent all of the information necessary to explain its function. The relationships between user interface components and other types of primitives is often required to fully describe the interactive representation.

The user interface components in the preferred embodiment represent a subset of conventional user interface components that are available to developers to program a proposed application that is represented by an interactive representation model. These include such components as "page," "form," "table," "button," "text," "text input" and "image." Specifically, in the preferred embodiment, the user interface components are derived from, and function in a manner similar to a subset of the user interface components defined in Hypertext Markup Language, a standard programming language commonly known as HTML. HTML is typically used by programmers to develop subject applications. Alternatively, the user interface components could be derived from and function in a manner similar to those defined by other languages, such as Microsoft Windows, Visual Basic or the Apple Macintosh OS.

The fourth class of primitives, "comments," provide the user with the ability to annotate the IRM. Comments are not processed by the simulator and do not impact the behavior of the interactive representation. They can be viewed in the Studio component.

The fifth class of primitives, "flow labels," allows users to label data flow relationships between other primitives. Their function is similar to that of variable names in other computer languages, as would be evident to a person skilled in the art. The detailed processing of flow labels is described in regard to the simulator component of the present invention.

The sixth class of primitives, "decisions," defines the conditional execution of other primitives. In the preferred embodiment, decisions function in a manner similar to that of "IF . . . THEN" and "CASE" statements found in conventional computer languages. Alternatively, decisions could be based on other conditional or branching structures found in conventional computer languages, or derived from common behaviors found in conventional computer applications.

The seventh class of primitives, "references," allow the reuse of portions of an IRM, or of other IRMs. The attributes of a reference include a unique identifier for one or more instances of other IRML primitives elsewhere in an IRM. Using a reference primitive is similar to copying one or more instances of primitives but is more efficient, from a maintainability perspective. For example, common behavior that occurs in several places within an IRM can be specified once and referenced from the places where it occurs. This reference feature of the present invention allows specification of a single, simultaneous change to the common behavior, rather than a serial or sequential change to the behavior wherever it occurs. In this sense a reference primitive functions to permit simultaneous, global changes to an IRM.

The eighth class of primitives, "constants," provide a method of storing data that is commonly used and is relatively static in an interactive representation. For example, days of the week, a company's product types, and valid zip-code/State combinations are constants.

Finally, the ninth class of primitives, "actions," define how data will be transformed, derived, stored, retrieved, sorted or otherwise manipulated by the interactive representation. In the preferred embodiment, actions include typical ways that computer systems manipulate data, and are not specific to any particular computer programming language. Alternatively, the actions could be closely based on one or more existing computer languages.

Unlike most known computer software programming languages, the preferred implementation of the IRML of the present invention does not explicitly designate the order in which actions are executed or user interface components are rendered. Instead, the order of execution is inferred by the simulator component of the present invention from the relationships among primitives, as will be described in detail below. This advantageous feature of the present invention relieves the user of the task of specifying order of execution and significantly simplifies the process of creating and maintaining an IRM. Alternatively, a language similar to IRML could be implemented in a form that did require explicit ordering of execution.

Also unlike most computer implemented software programs, programs using an IRML in accordance with the principles of the present invention preferably do not require the explicit definition of data records separately from how the data contained in those records is manipulated. For example, in a typical, conventional computer software program a user would need to define to the database subsystem or subroutine that an "invoice record contained an invoice number, a total amount, a vendor identification," and, typically, other data. Separately, the user would need to define in that computer application or program that an invoice record contained the same data in the code used to manipulate this data from the database. However, because the simulator software component of the present invention, working in combination with the music software component, is capable of storing and retrieving data without reliance on a static definition of the data contained in a data record, the preferred IRML of the present invention enables the user to specify only the manipulation of the data and enables inferring of data record definition from this specification. This advantageous feature of the present invention relieves the user of the task of explicitly describing the definition of data records and relieves the users of the task of ensuring that the same definition is required for each time the corresponding record in the application is manipulated. Alternatively, although not preferred, the IRML of the present invention could be implemented utilizing a separate static definition of data records.

Additionally, unlike most computer languages, the preferred IRML of the present invention does not require explicit designation of the type of data that is manipulated by the IRM. Instead, all data is considered to be of type "string" and the implementation of certain actions that manipulate this data include logic to behave in a predictable manner, regardless of the true type of the data contained within the "string." The term "string" is well-known to those skilled in this field. For example, an action named "math:add" will produce the sum of two numbers if it is supplied with two strings that contain numbers. If the math:add action receives either two alphanumeric strings or one alphanumeric string and a string that contains a number, it will produce the string "NaN" indicating that one of the inputs is "Not a Number." This feature relieves the user from specifying the type of data being manipulated by the system and eliminates the need for the user to ensure agreement between the type of data provided to actions and the type of data that actions expect and/or require when processing. Alternatively, and although not preferred, an IRML in accordance with the principles of the present invention could be implemented in a form that required explicit typing of data.

The fourth computer application included in the preferred embodiment of the present invention provides users with a browser-based program that maintains a record of the requirements for a subject application, that administers the implementation of the present invention, maintains a record of defect reports related to the subject application and its requirements and maintains a record of task performed, or to be performed, by users of the present invention. For convenience this fourth application is referred to as "ION." For purposes of the present invention, administration of the implementation consists of activities necessary for the efficient functioning of the overall invention but not including frequently performed activities such as creation of the IRM, presentation of interactive representations or recording and editing of requirements. For example, administration of the implementation includes establishing user names and passwords, creation of files to store IRM information, and definition of the range of valid values for attributes of requirements. A detailed discussion of the functions and features provided by ION is provided under Use of the Invention below.

ION is also, preferably, written in Java®™ using the J2EE (Java® 2 Enterprise Edition®) framework. Preferably, ION is constructed utilizing standard industry practices for the construction of web-based applications and, therefore, its detailed processing can be inferred from the description of its functions and features described under Use of Invention below, by an individual skilled in the art.

In operation, the ION program utilizes the music client to retrieve and update requirements that are stored at the music server. As alternative embodiments in accordance with the principles of the present invention, the fourth software application could be written in other languages, such as for example, C++, C# or Visual Basic. Also, as yet another alternative, the fourth application could be written with one of several proprietary web application development environments, for example the Broadvision™ or ATG Dynamo™ brands of environments. Also, as yet another alternative, ION could be replaced by a commercially available requirements management system, such as Rational Software's Requistie-Pro. However, drawbacks of this alternative embodiment include a lack of integration with other components of the invention and additional costs required to acquire, configure and administer a commercially available requirements management system.

The fifth software application used in the preferred embodiment of the present invention, referred to for convenience as "simulator," is a computer program that renders interactive representations of prospective computer applications by accepting requests from the user's browser, interpreting the IRM, composing an HTML response to the user's requests and communicating its response to the user's browser. This fifth application is also, preferably, written in Java® language. Alternate embodiments of this fifth computer software application within the principles of the present invention could be written in any of the C++, C# or Visual Basic languages.

The process embodied by the simulator 78 is depicted in further detail in FIG. 4, and described below. The simulator processes using a request/response cycle similar to that of other conventional computer applications that interact with standard browsers. During the simulation process, a user's browser generates several types of requests, including but not limited to requests to display pages, requests to display images and requests to process data entered by the user. These requests are referred to as a "form submit" requests. The simulator, in turn, composes a response in the form of an HTML page and sends this to the browser. This request/response cycle is repeated and results in the interactive representation.

The simulator process starts when the simulator receives a request, shown at 124 from the user's browser. Upon receipt of the request, the simulator determines if there is a valid session, shown at 126, for the specific user that made the request. If the user does not have a valid session, the request is redirected at 128 by the simulator component to the ION component 76 where the user is authenticated to the system, a session is initiated, and the simulator process ends. In the present invention, the term "session" refers to a set of variables stored in the server computer's memory and that contain information regarding a user and the user's interactions with the ION and/or simulator components of the present invention. This information is maintained for a period between the receipt of an initial request from the user's browser and the termination of the session when the user has chosen to log off the system, or when the session has been terminated due to exceeding the maximum time allowed for a session.

If the user has a valid session, the simulator process begins to determine the type of request that has been received from the user by determining if an image was requested, as shown at 130. If an image was not requested, the process continues to determine if a page or decision was requested, as shown at 132. Otherwise, the process continues to "process image request," as shown at 134. Process image request retrieves the appropriate image stored with the IRM and returns it to the browser, and enables the browser to present this image to the user. Typically, this variant of request is communicated to the simulator after the simulator has already serviced requests for one or more pages. This is because the simulator's response to a page request may include one or more references to images that the browser will automatically request from the simulator upon receipt of the page. After returning an image, the simulator process ends.

The simulator continues to ascertain the type of request by determining if a page or decision was requested, as shown at 132. If a page or decision was requested, the simulator process evaluates if a specific page was requested, as described in the next paragraph and shown at 134. Otherwise it continues to ascertain the type of request by determining if a "form" was submitted, as shown at 146.

If a page or decision was requested, the simulator evaluates the request to determine if a specific page was contained in the request, as shown at 134. If a specific page was not requested, the simulator interprets this as a request 136 for a list of the pages that exist in the current IRM, and proceeds to find all pages in the current IRM. It then returns a list of them to the user's browser and ends processing.

If the simulator had determined that a specific page or decision was requested at 134, the simulator continues by determining if the requested page can be found in the current IRM at 138. If the page cannot be found, the simulator returns a "page not found" message to the browser at 140 and ends processing. Otherwise the simulator proceeds to execute the control flow visitation algorithm, shown at 142, beginning at the specified page or decision. The control flow visitation algorithm, as will be described in detail below, proceeds to evaluate the IRM and accumulate HTML to be returned to the user's browser in the subsequent step, "return accumulated HTML to browser," as shown at 144. The control flow visitation algorithm recursively collects all of the user interface components that are contained within the page, and constructs HTML representing these components. If a decision is specified, then the control flow visitation algorithm at 142 first evaluates the decision to identify the correct page and then proceeds as described above.

After the control flow visitation algorithm has completed, the simulator proceeds to return accumulated HTML to the browser and ends.

If a page or decision was not requested at 134, the simulator continues to ascertain what type of request was submitted, by determining if a form was submitted, as shown at 146. If this is the case, the simulator process continues to process form submit, as shown at 148, and described in regard to FIG. 7. The simulator extracts all values submitted in form and packages them into data tokens at 145 and invokes the data flow visitation algorithm in push mode at 147. Upon completion of the data flow visitation algorithm, the simulator determines if a page or decision has been requested at 149 in connection with the form submit request and invokes the control flow visitation algorithm at 151 for the page or decision. Upon completion of processing of the form submit, the simulator returns accumulated HTML to browser, as shown at 150, and ends processing. If a form has not been submitted, the process continues to row selection from dynamic table requested at 152.

Process row selection, depicted at 152, from a dynamic table is a specialized process implemented by the simulator and that functions to support the IRML primitive named "dynamic table" that is an advantageous feature of the best mode of the present invention. A dynamic table is an IRML primitive that can be used to emulate common behavior of computer applications wherein a list of data separated into rows is presented to a user and the user is allowed to select one of the rows for further processing. After the dynamic table has been presented to the user on a previous iteration of the simulator request/response cycle, the user may choose a row presented in the table that is then handled by this process. For example, a proposed application may present a list of orders placed by a client or a list of reservations made by a frequent flyer. The proposed application user may then select one of these orders or reservations for further processing. The corresponding computer processing that would be necessary for the subject application to understand which order or reservation was selected by the proposed application user may be complicated and not intuitive. This feature of the simulator is advantageous because it handles this processing automatically, by removing the necessity that it be specified in the IRM. Once the simulator has completed processing of the dynamic table row request at 154, it returns accumulated HTML to the user's browser at 156, otherwise it ends processing at 158.

The simulator 78 repeats the process described above upon receiving additional requests from the browser, until the user makes no more requests.

Control Flow Visitation Algorithm

In general, the preferred embodiment of the control flow visitation algorithm is a computer program based on a pattern found in conventional software designs and commonly known as a "visitor pattern." It functions to construct the simulator's response to a request from a browser. This response appears in the browser in a manner similar to how it would appear in the completed proposed application. This response is composed of nested HTML tags, which the browser uses to present a page to the user. The control flow visitation algorithm is an automated process that constructs this nested set of HTML tags based on the IRM.

Understanding the function of the control flow visitation algorithm is facilitated by understanding that the IRM is a collection of primitives and the relationships between and among them. In the context of the control flow visitation algorithm, important relationships include those that designate the flow of data, i.e., "dataflow", those that designate containment of user interface components, i.e., "containment", those that designate references and those that designate the flow of the interactive representation, i.e., "control flow". Thus, an IRM can be characterized or depicted as a series of circles representing primitives and arrows representing relationships. Such a depiction is presented and described in detail in regard to FIG. 5.

The control flow visitation algorithm begins processing at the primitive representing the page requested by the user, shown at 160. The control flow visitation algorithm begins to accumulate HTML at this point by adding a tag that represents the beginning of a page into a temporary space used to accumulate HTML. The simulator process continues by examining the properties of the page primitive and appending additional HTML code to the temporary space based on these properties, including, for example, the name of the page. The simulator then follows the containment relationships represented by the arrows between the page primitive and the primitive contained by the page, in this case, the form primitive shown at 162, or similarly from page primitive 172 to text primitive 174. The simulator then appends a tag representing the beginning of the form into the temporary space. The simulator then examines the properties of the form primitive and adds additional HTML codes to the temporary space. Continuing in its recursive process, it then "visits" each of the contained primitives at 164, 166 and 168, in order from left to right, sequentially processing each primitive and adding more HTML codes to the temporary space. The primitives depicted at 164, 166 and 168 have no containment arrows leading from them, and therefore the simulator process recognizes these as "tags." When processing tags, the simulator performs several functions before appending HTML to the temporary area. For example, the simulator determines if there are any data flow arrows pointing into the primitive. If so the simulator begins another process, called the "data flow visitation algorithm," which will be described in detail below. In the case of a constant primitive, the data flow visitation algorithm follows the arrow backwards to the constant primitive depicted at 176, where it obtains the value of the constant, and ends processing. The control flow visitation algorithm can then complete adding the necessary HTML code to present this constant value in the text input field specified by the text input primitive, as shown at 164, and append this HTML code to the temporary area. This tag processing continues to process the primitives shown at 166 and 168.

After having processed all of the contained objects, in the form primitive, shown at 162, the control flow visitation algorithm then returns to the form primitive itself. Because it has encountered this form primitive before, the control flow visitation algorithm now appends closing HTML code to the temporary space, indicating the end of the form. Similarly, the control flow visitation algorithm returns to the page primitive at 160 and appends the closing HTML code for the page to the temporary area. This temporary area is then returned to the process that called the control flow visitation algorithm, and, in general, this accumulated HTML is returned to the user's browser.

Figure 6:
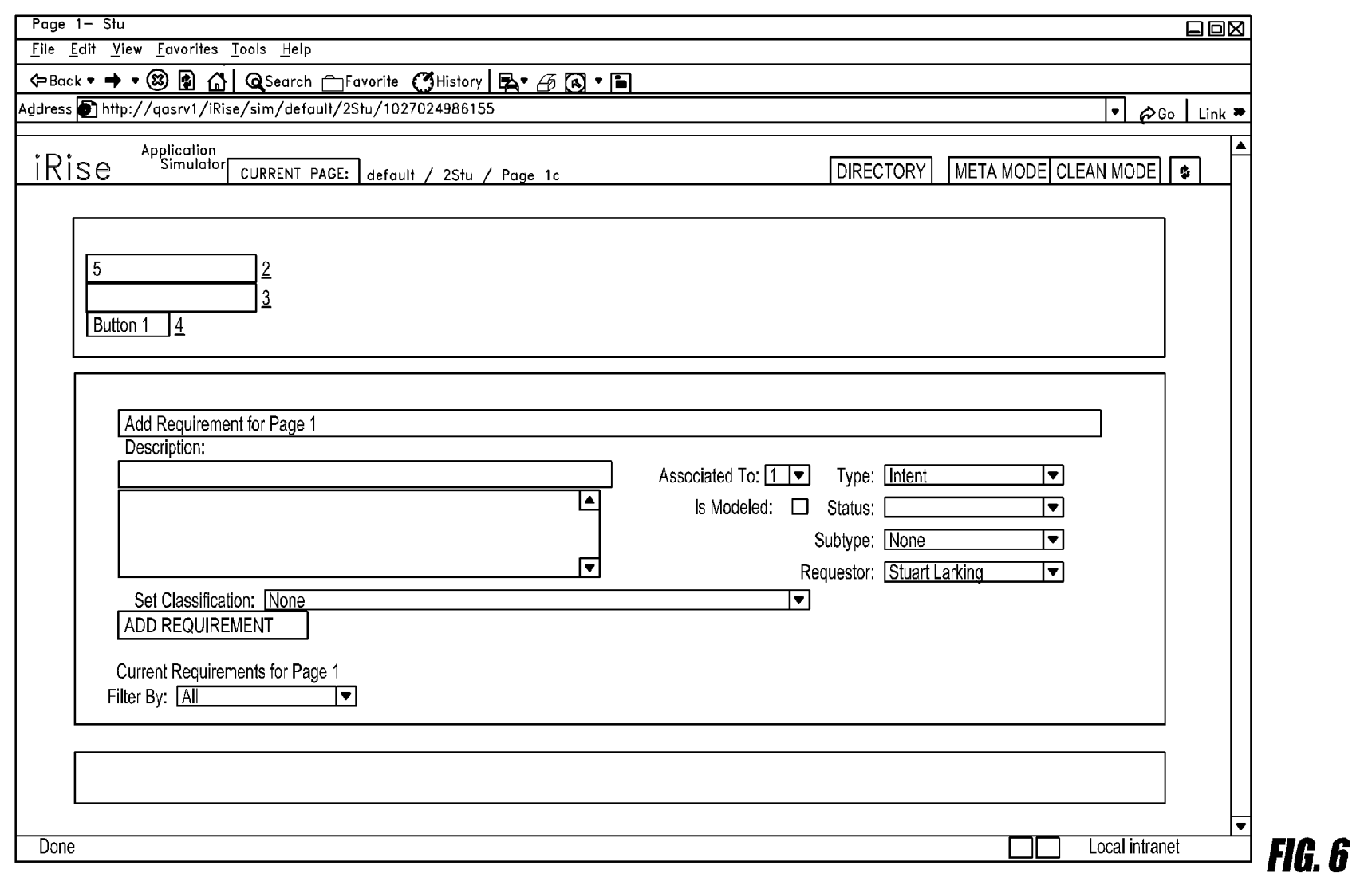

The interactive representation experienced and seen by the user for this example is depicted in FIG. 6. In this example, a page with two text input fields is shown.

While performing the process described above, the control flow visitation algorithm assigns a unique cross reference number to a subset of the user interface component primitives that it encounters (underlined labels "2" through "4" in the example of FIG. 6). When the simulator is operating in Meta Mode, the control flow visitation algorithm automatically inserts HTML code into the temporary area that causes these cross reference numbers, and their accompanying text to be displayed on the user's browser to the immediate right of each user interface component.

Data Flow Visitation Algorithm

In general, the preferred embodiment of the data flow visitation algorithm is a computer program based on the conventional "visitor pattern," much like the control flow visitor algorithm. It functions to provide a facility for the interactive representation to simulate the processing of data common in proposed applications.

The data flow visitation algorithm relies on a feature provided by the Music Client 84, another software component of the present invention that has been previously described, in which the IRM being executed by the simulator is kept in the memory of the computer on which the simulator and music client are running. The data flow visitation algorithm processes a subset of the primitives contained in the IRM, and which are held in the computer memory, and appends data records to this memory that represents the partial results of its computation. With respect to the preferred embodiment of the present invention, these data records are referred to as "tokens." Because they are intermediate results of the processing of a single request from the user's browser to the simulator, tokens are only stored in memory, and the music client is not used to store them in the music server. Tokens are stored in memory and associated to specific primitives. This relationship is referred to as "tokens stored at a primitive." In the context of the present invention, to "cache" a token means to store it temporarily in the computer memory at a particular primitive.

Figure 4:
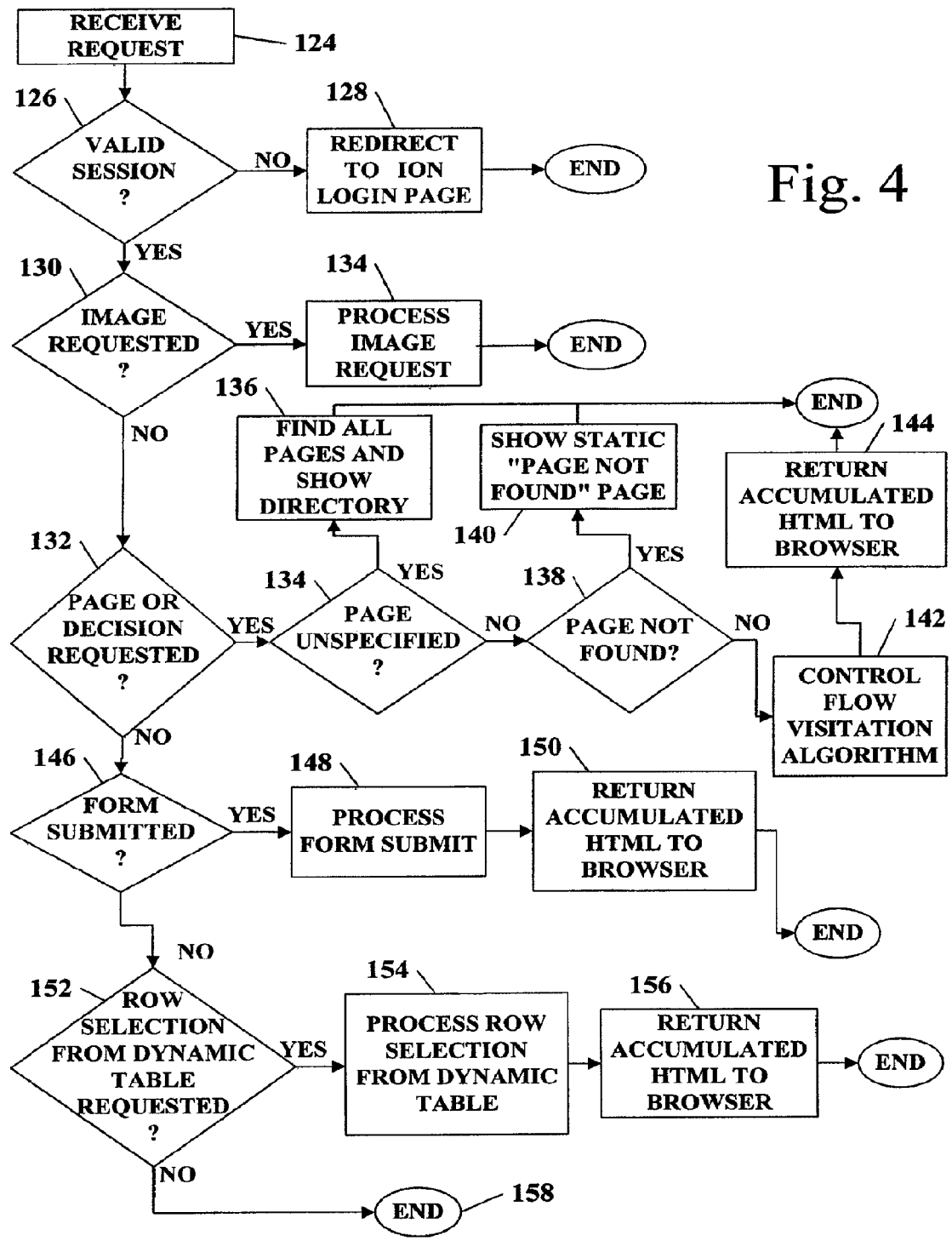
FIG. 4 depicts the processing of the software component of the FIG. 1 embodiment that enables interactive representations of prospective applications.

The data flow visitation algorithm begins processing when it is invoked by the simulator, either from the control flow visitation algorithm as previously described or from the process form submit process 148, shown in FIG. 4, or the process row selection from dynamic table process 152, also shown in FIG. 4. In the detailed description that follows, it will be shown that the data flow visitation algorithm, in several cases, may also be invoked by itself. This is a common computer programming technique referred to as "recursion" as would be understood by an individual skilled in the art. For the purpose of the present invention, "recursion" is defined as "an algorithmic technique where a function, in order to accomplish a task, calls itself with some part of the task." This is also the definition found at the National Institute of Standards and Technology web site at the Dictionary of Algorithms and Data Structures (DADS). The preferred embodiment of the simulator utilizes the advantageous recursion features inherent in the Java™ language.

At the time the data flow visitation algorithm is invoked it is directed to begin its processing at a specific primitive in the IRM and it is invoked in one of two modes, referred to as "push" and "pull," with their meanings implied as each is individually described in detail below. In general, the data flow visitation algorithm process moves data, in the form of tokens, entered by the user during simulation, of the IRM, as well as causing primitives of the class "action" to process the data. The data flow visitation algorithm moves the data along relationships between primitives called data flow relationships. Each data flow relationship can be thought of as an arrow connecting two primitives. When the data flow visitation algorithm is processing a primitive and needs to get data from a different primitive from which an arrow points, the pull mode of the data flow visitation algorithm is used. When the data flow visitation algorithm has completed processing a primitive and needs to send this data along the data flow relationship arrows emanating from the processed primitive, the push mode of the data flow visitation algorithm is used.

Figure 8A:
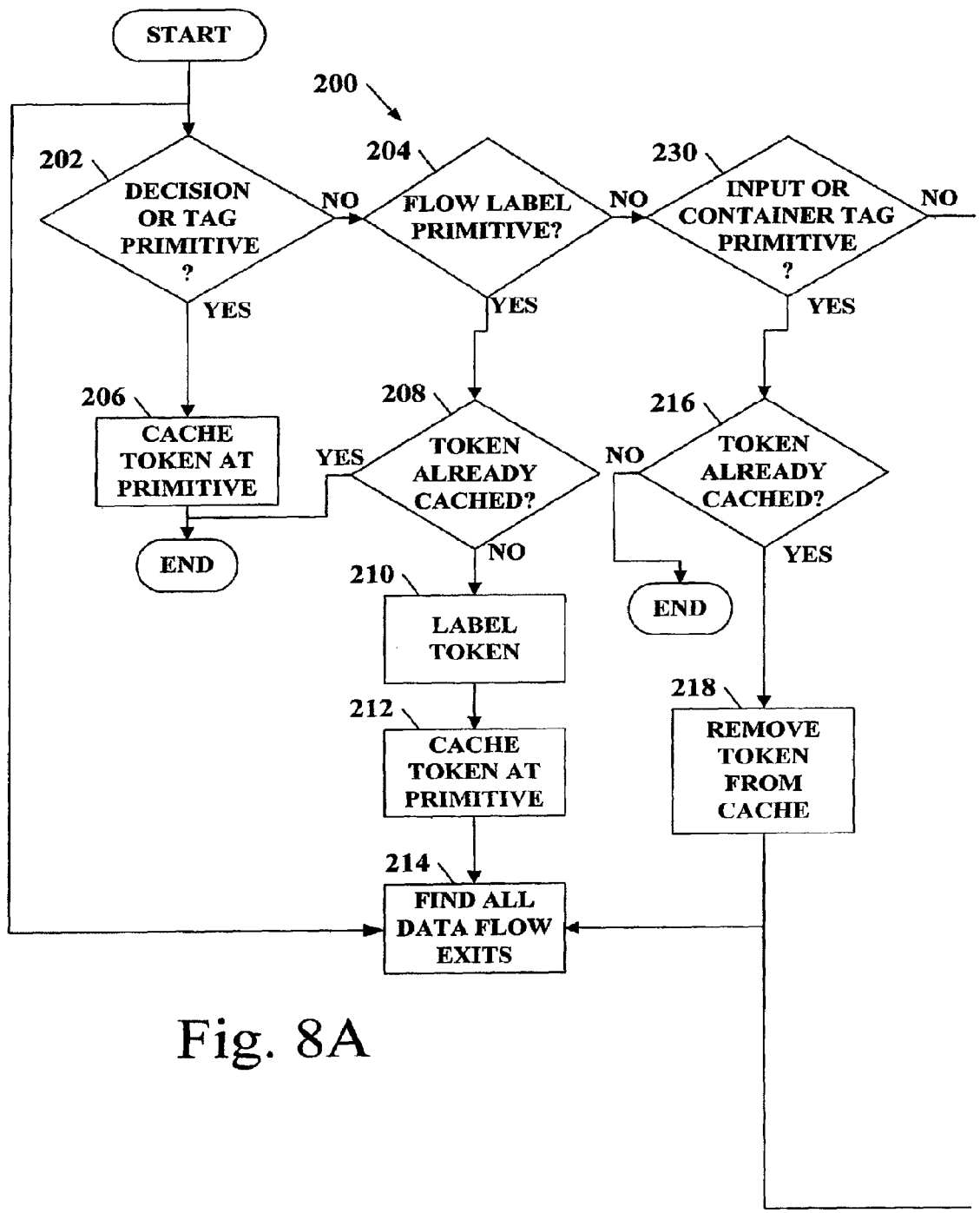
FIG. 8A-B is a flow diagram of the push mode of the data flow visitation algorithm.
Figure 8B:
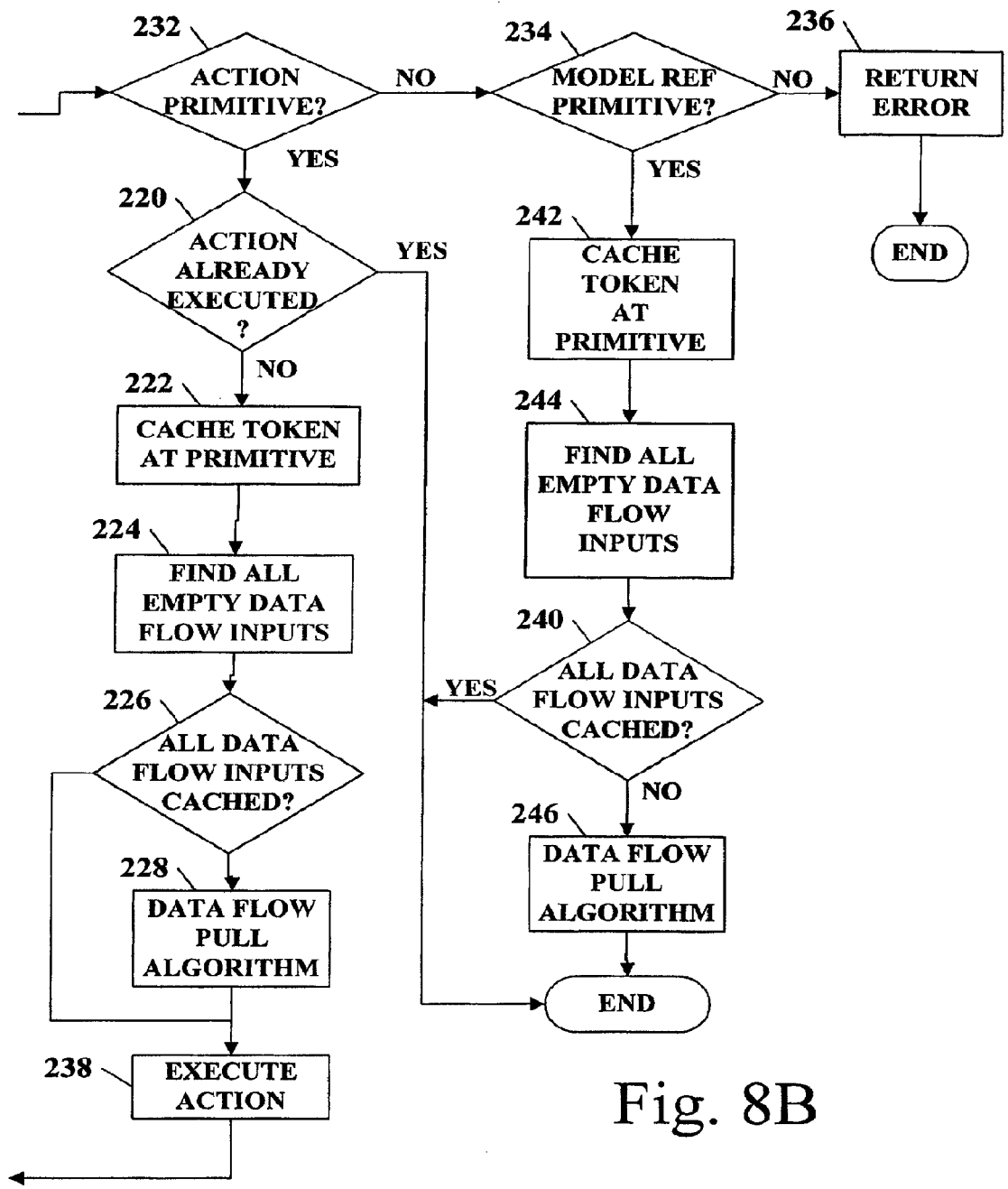

The push mode of processing of the data flow visitation algorithm is depicted at 200 in FIG. 8. Beginning the process, the data flow visitation algorithm evaluates what class of primitive it has been asked to process through a series of steps depicted at 202, 204, 230, 232 and 234. Primitive classes are described above. If it cannot identify the type of primitive it has been asked to process, the data flow visitation algorithm returns an error at 236 and ends processing.

If the data flow visitation algorithm has been asked to process a decision or tag primitive, it temporarily caches the token at the current primitive, shown at 206. In the context of the present invention, to "cache" a token means to store it temporarily in the computer memory that also contains the IRM. After caching the token, the process ends.

The data flow visitation algorithm may also be asked to process a flow label primitive at 204. To process a flow label primitive, the data flow visitation algorithm first determines if there is a token already cached at the flow label primitive, at step 208. Since the data flow visitation algorithm can be called multiple times in the processing of a single request from the user's browser to the simulator, it is possible that the current primitive may have already been visited by a previous execution of the data flow visitation algorithm. This initial check performed by the data flow visitation algorithm when processing flow label primitives prevents duplicate tokens from being cached. If a token is already present the process ends, otherwise the token is labeled with the name of the flow label primitive at 210 and the token is cached for further processing by another execution of the data flow visitation algorithm at 212. The process then continues as the simulator examines the IRM to determine all data flow exits at 214. "Data flow exits" in the context of the current invention are primitives that have data flow relationships directed to them from the current primitive in the IRM. For each of the data flow exits that exist, the data flow visitation algorithm process 200 is invoked again.

Figure 5:
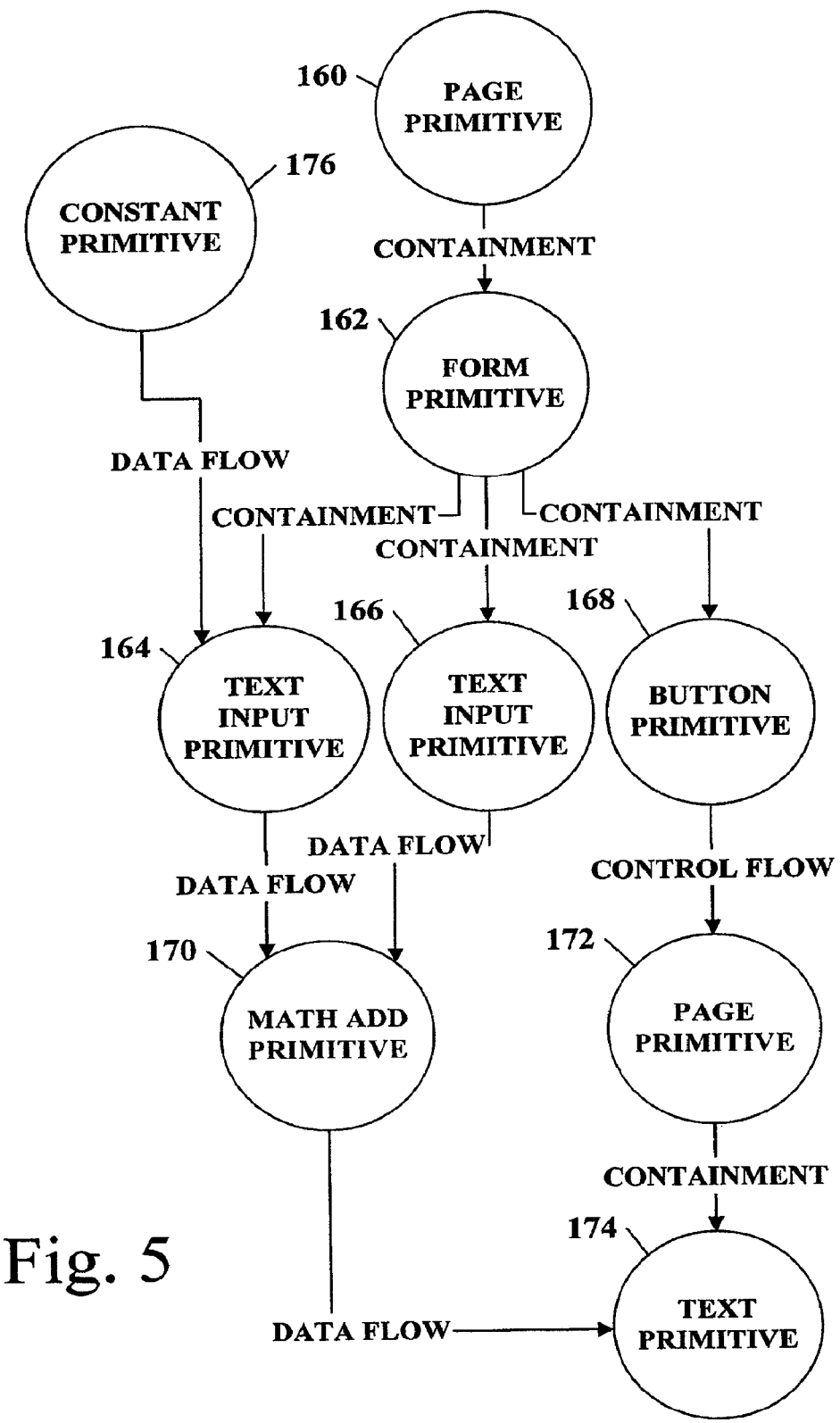
FIG. 5 is schematic diagram representing primitives in an interactive representation model of the FIG. 1 embodiment.

If the data flow visitation algorithm has been asked to process an input tag primitive, for example at 164 or 166 in FIG. 5, or a container tag primitive, the simulator checks to see if a token is currently cached at the primitive at 216. If not, the data flow visitation algorithm process ends. If so, at 218 the data flow visitation algorithm process removes the token from the cache and proceeds to find all data flow exits, at 214, as described in detail previously. For example, the primitives depicted at 164 and 166 both have a data flow exit to the primitive at 174 via math add primitive 170 in FIG. 5. Typically, this processing of input tag primitives and containers occurs during the execution of the data flow visitation algorithm process when it is called from the process from submit step 145. Because step 145 has already cached the data submitted by the user, this process simply has the effect of advancing the tokens to the data flow exits that are related in the IRM to the primitive being processed.

If the data flow visitation algorithm has been asked to process an action primitive at 232, the data flow visitation algorithm first determines if the action has already been executed at 220, and if it has the data flow visitation algorithm ends processing. If the action has not yet been executed, the data flow visitation algorithm caches the current token at the action primitive, at step 222 and proceeds to find all inputs to the action that have not yet had tokens stored at the primitive for them, at step 224. Actions cannot be executed by the data flow visitation algorithm or simulator unless all of the needed inputs to the action have been cached at the action primitive by the data flow visitation algorithm, therefore, the data flow visitation algorithm evaluates all data flow inputs at step 226 before continuing. In the context of the present invention, "data flow inputs" refer to primitives that have data flow relationships directed to the current action primitive in the IRM. If no token is cached for one or more of the data flow inputs, the process continues to step 228, where the data flow visitation algorithm is invoked in pull mode to obtain the needed tokens. This step 228 is bypassed if all necessary tokens are cached at the action primitive. The process continues by executing the action at step 238. Execution of the action is performed by placing all of the tokens that have been cached at the action primitive by the data flow visitation algorithm and invoking a java sub-routine that handles the actual processing of the action. The behavior of each action primitive, i.e., the behavior of its specific java sub-routine, is discussed in Table II. After the Java sub-routine has completed processing, the execute action step 228 continues by collecting the data token(s) that has(have) resulted from the execution. This(these) data token(s) are then passed along for additional processing by the find all data flow exits step 214, and subsequently by another invocation of the data flow visitation algorithm, as was previously described in the context of processing flow label primitives.

If the data flow visitation algorithm has been asked to process a model reference at 234, the data flow visitation algorithm first caches the current token at the model reference primitive 242. Similar to the processing for actions described in detail above, the data flow visitation algorithm evaluates if all data flow inputs for the model reference have cached tokens at 244 and 240. If so, the process ends. Otherwise, the data flow visitation algorithm 246 is invoked in pull mode for each of the primitives for which no token was cached. Note that the data flow visitation algorithm does not cause the primitive referenced by the model reference primitive to be executed; this invocation is left to the control flow visitor process described in detail above.

Figure 9A:
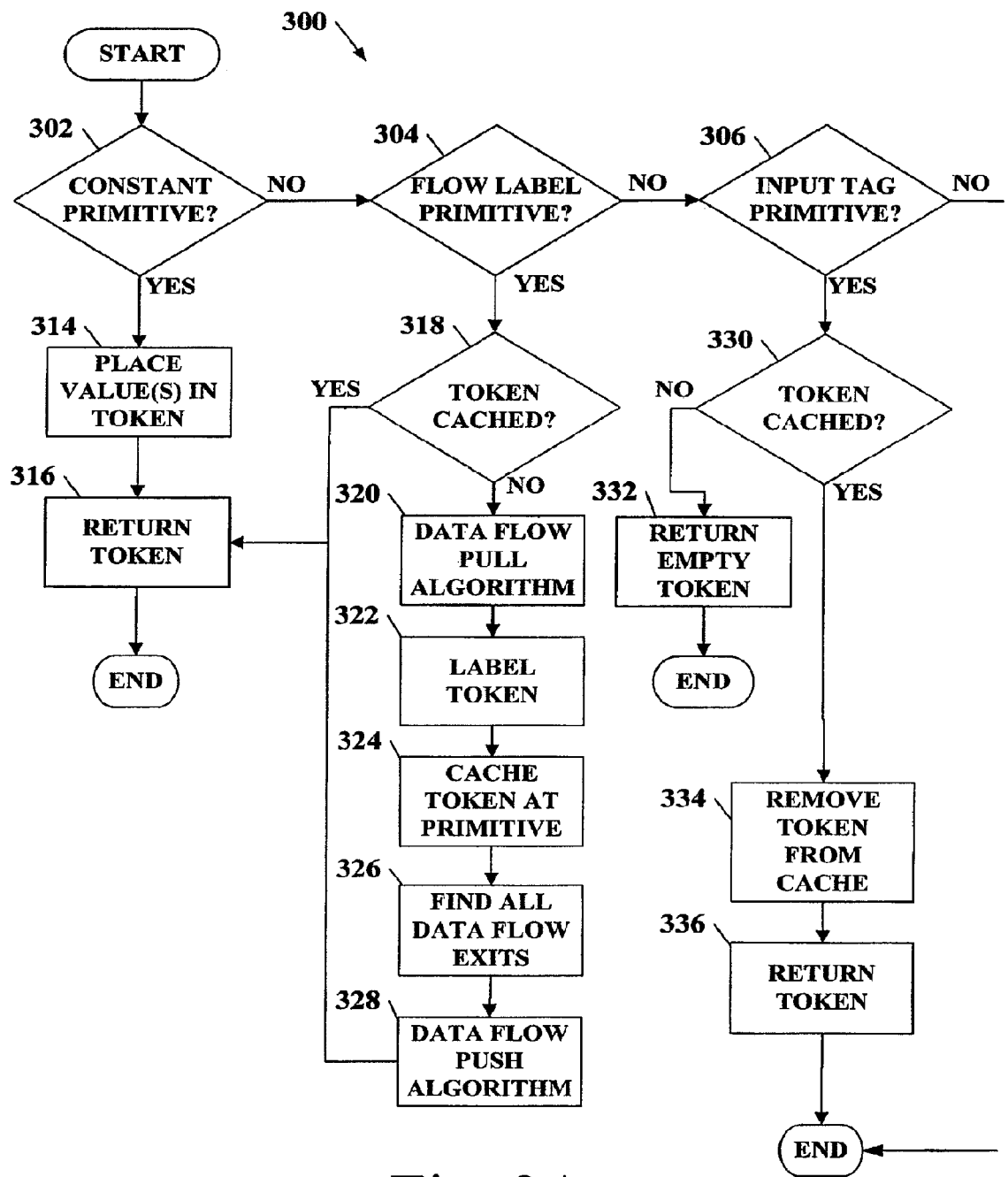
FIG. 9A-B is a flow diagram of the pull mode of the data flow visitation algorithm.
Figure 9B:
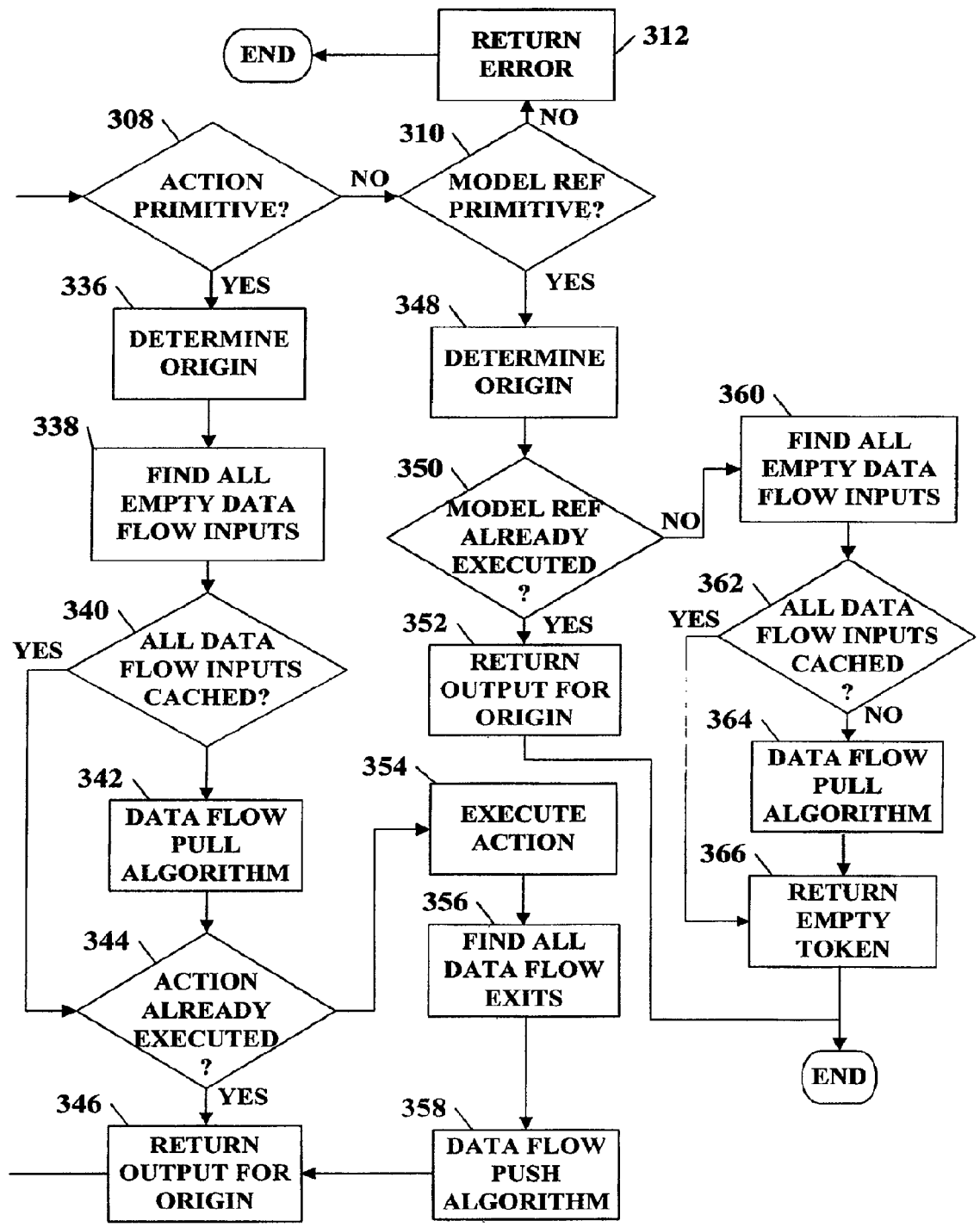

The other mode of processing embodied in the data flow visitation algorithm is the pull mode, which is depicted at 300 in FIG. 9. To begin the pull process, the data flow visitation algorithm evaluates what class of primitive it has been asked to process through a series of steps depicted at 302, 304, 306, 308 and 310. Primitive classes are shown in the first column of Tables II-V. If it cannot identify the type of primitive it has been asked to process, the data flow visitation algorithm returns an error at 312 and ends processing.

If the data flow visitation algorithm operating in pull mode has been asked to process a constant primitive at 302, the data flow visitation algorithm examines the constant primitive and extracts the value(s) stored with the constant primitive in the IRM, at step 314. These values are then placed in a token which is returned, at 316, to the process that invoked the data flow visitation algorithm in pull mode. The process then ends.

If the data flow visitation algorithm operating in pull mode has been asked to process a flow label primitive at 304, the data flow visitation algorithm first determines if there is a token already cached at the flow label primitive, at step 318. If there is a token cached, it is returned at 316, to the process that invoked the data flow visitation algorithm in pull mode. The process then ends. If there is not token cached, the process continues by invoking the data flow visitation algorithm in pull mode at 320 for the data flow input associated with the current flow label primitive. Note that IRML connection rules, as detailed in Tables IV and V, ensure that only one data flow input will be present. When the data flow visitation algorithm process invoked at 320 completes, the returned token is labeled with the name of the data flow label primitive at 322. The data flow visitation algorithm continues by caching the returned and named token at the data flow label primitive at 324 and finding all data flow exits, as was previously described, at 326. The data flow visitation algorithm is then invoked in push mode at 328. After the data flow visitation algorithm invoked at 328 completes, the token cached at 324 is returned to the process that called the data flow visitation algorithm in pull mode, and the data flow visitation algorithm process ends.

If the data flow visitation algorithm operating in pull mode has been asked to process an input tag primitive at 306, the data flow visitation algorithm first determines if a token is cached at the input tag primitive at 330. If no token is cached, an empty token, i.e., a token containing no data, is returned to the process that invoked the data flow visitation algorithm, depicted at 332. If a cached token is found at the input tag primitive, it is removed from the cache at the input tag in step 334, returned to the calling process at 336 and the data flow visitation algorithm process ends.

If the data flow visitation algorithm process operating in pull mode has been asked to process an action primitive at 308, the data flow visitation algorithm first determines last primitive "visited" by the process that invoked the data flow visitation algorithm in pull mode, as depicted at 336. The last visited primitive's identifier, referred to as the origin, is stored temporarily at step 336 to allow the correct token to be returned to the process that invoked the data flow visitation algorithm in the later step 346, which shall be described in detail below. The process continues by finding all data flow inputs to the action primitive being processed for which a token has not been cached, which is depicted at step 338. If the data flow visitation algorithm determines that all data flow inputs have not already been cached at 340, it invokes the data flow visitation algorithm in pull mode for each of the missing tokens, at 342. After the data flow visitation algorithm invoked at 342 has returned the necessary token(s), or if the data flow visitation algorithm had determined that all data flow inputs had already been cached at 340, the data flow visitation algorithm continues to step 344. In step 344, the data flow visitation algorithm determines if the action primitive it has been asked to process has already been executed. If the action has already been executed, the data flow visitation algorithm, using the identifier stored in step 336, returns the appropriate token for the origin at step 346 to the process that invoked the data flow visitation algorithm in pull mode. If the action has not been executed, the data flow visitation algorithm process continues to 354, "execute action." Execution of the action is performed by placing all of the tokens that have been cached at the action primitive by the data flow visitation algorithm and invoking a java sub-routine that handles the actual processing of the action. The behavior of each action primitive, i.e., the behavior of its specific java sub-routine is discussed in Table II. After the Java sub-routine has completed processing, the execute action step 354 continues by collecting the data token(s) that has(have) resulted from the execution. This (these) data token(s) are then passed along for additional processing by the find all data flow exits step 356, and subsequently by another invocation of the data flow visitation algorithm in push mode at 358. After the invocation of the data flow visitation algorithm at 358 has completed, the process proceeds to return the appropriate token to the process that invoked the data flow visitation algorithm at 346, as was previously described.

If the data flow visitation algorithm operating in pull mode has been asked to process a model reference primitive, as depicted at 310, the data flow visitation algorithm determines the origin for the request at 348 as previously described in the context of processing action primitives. After completing step 348, the data flow visitation algorithm determines if the current model reference primitive has already been executed, and, if so returns the appropriate token for the origin at step 352, which is identical to the previously described step 346. The data flow visitation algorithm process then ends. If the data flow visitation algorithm determines that the model reference primitive has not been executed at 350, it proceeds to collect the necessary inputs to the action at steps 360, 362 and 364. The processing performed by these steps is identical to that previously described for steps 338, 340 and 342 respectively. After step 364 has been completed, the data flow visitation algorithm returns an empty token to the process that had called it in pull mode and ends processing.

USE OF THE INVENTION

With reference to FIGS. 10-43 use of the present invention will be described, particularly in regard to the preferred embodiment as described above. In this regard it is the people who participate in the application definition process by managing requirements, building the IRM, or validating an IR of the application to whom the following description of the invention is directed. Also, this description of how to use the invention is presented in two sections, the first section directed to the interactive, network online interface, and the second directed to the interactive representation model creation and modification interface.

Figure 2:
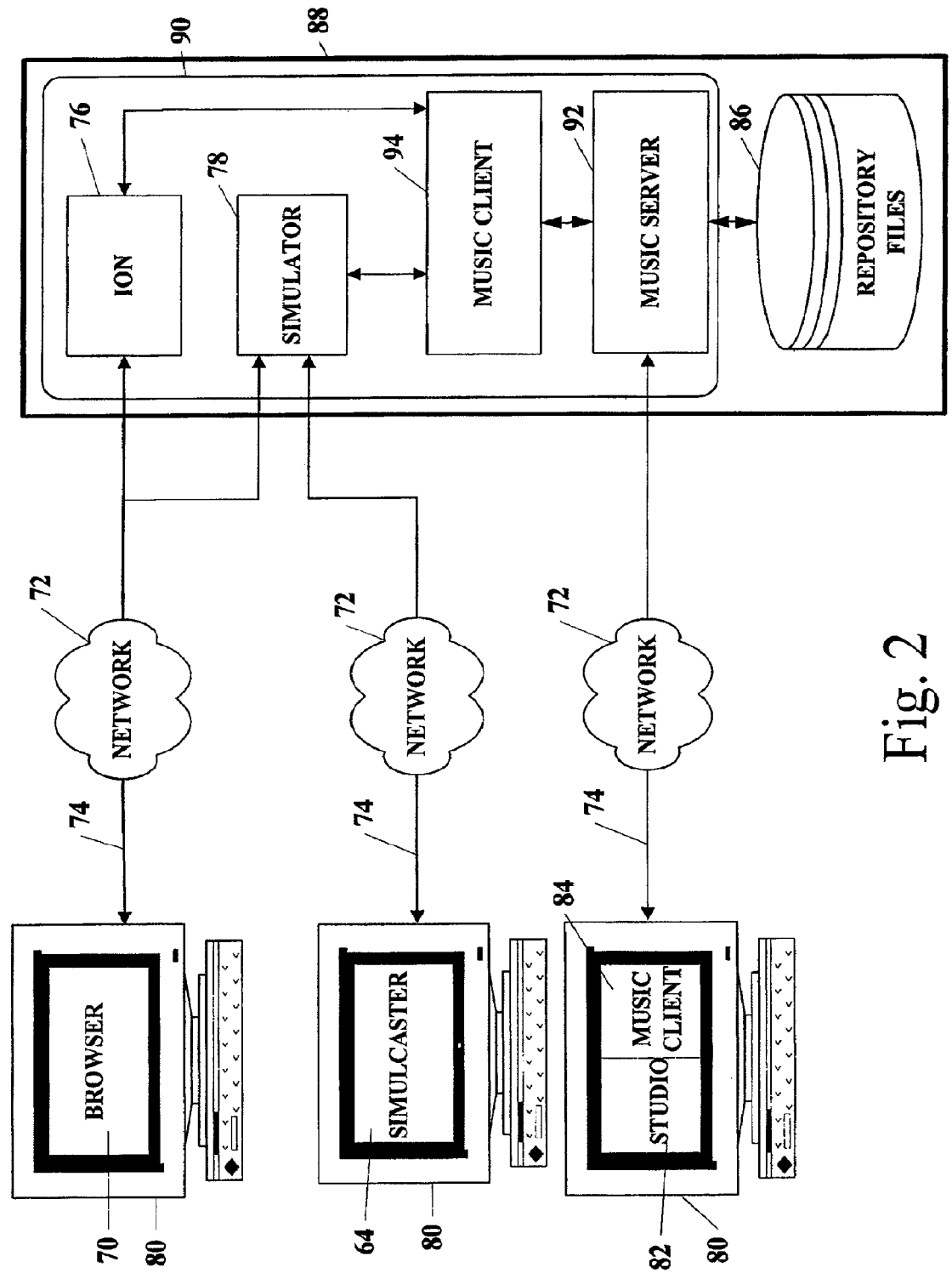
FIG. 2 depicts the overall software components of the FIG. 1 mode of the present invention, and their interaction.
Figure 3:
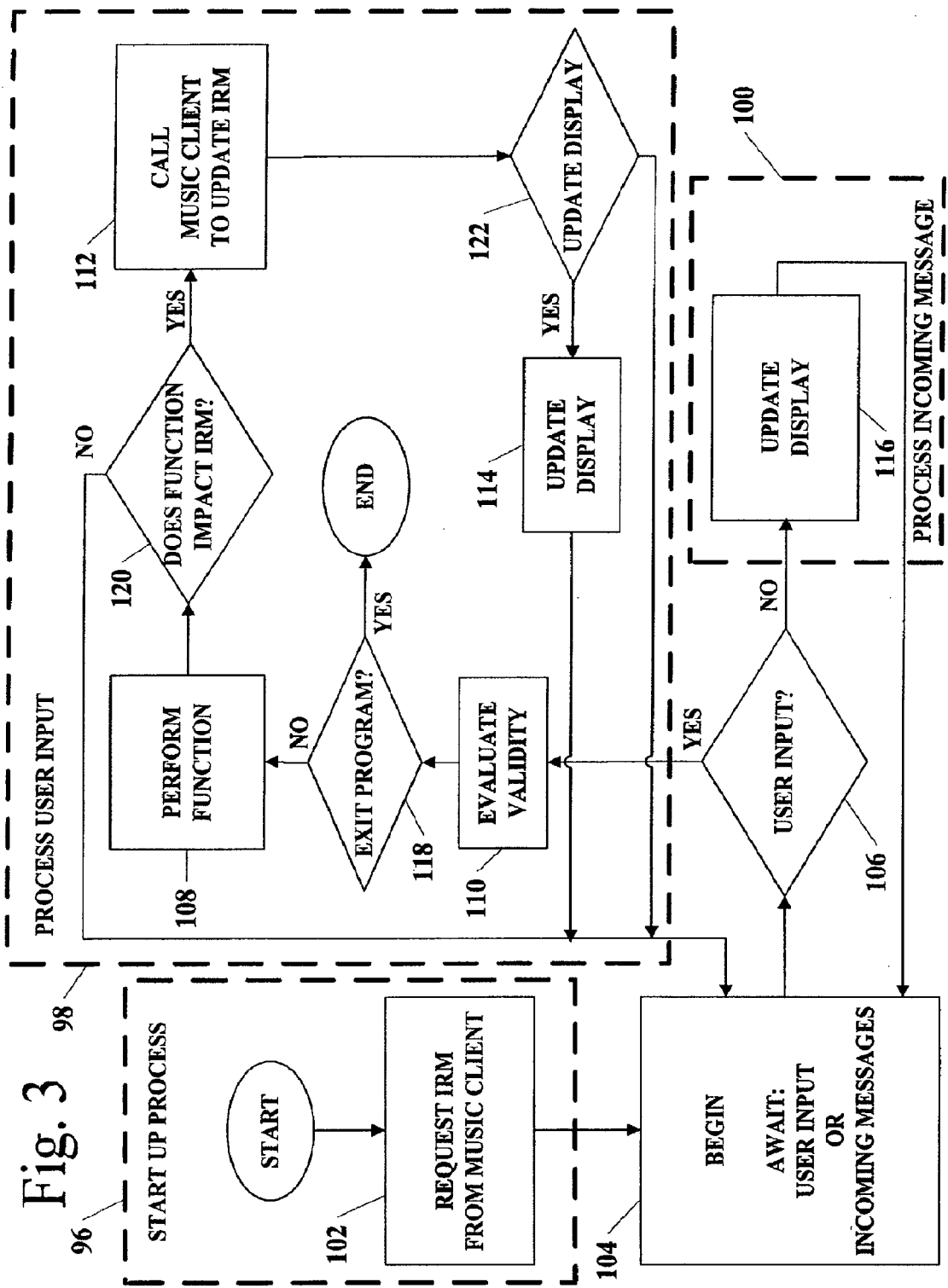
FIG. 3 depicts the operation of the software component of the FIG. 1 mode that enables the user to read, create and modify interactive representation models of the present invention.

Referring to FIG. 2, the web-based interface application 76 and simulator application 78 of the present invention is installed on server 90 and communicates with a browser 70. Each user accesses the interface and/or simulator applications to manage the requirements and access the interactive representation, sometimes referred to as the "simulation," for a prospective application. In accordance with terms accepted in the art, individual screens presented by the web-based interface are sometimes referred to as "pages."

Accessing the Online Interface

The web interface of the present invention is accessed in a conventional fashion through a convention web browser that has access to a server that is hosting the software of the present invention. After completing conventional log-on procedures, the user will be presented with a default screen 400, sometimes referred to as a dashboard, similar to that shown in FIG. 10. A typical screen will have a main menu, an application selector and a logout button.

Using the Dashboard Screen

Figure 10:
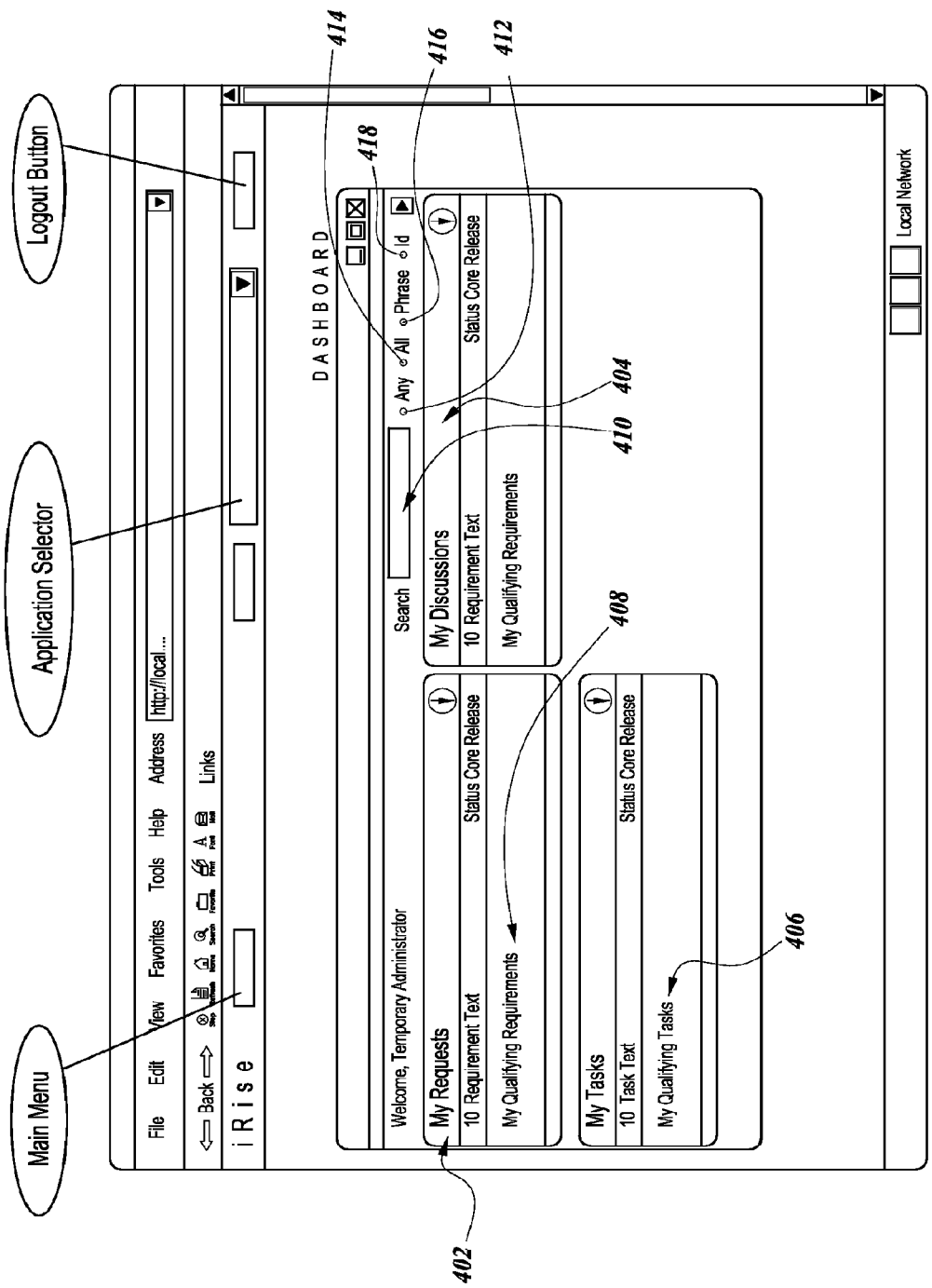
FIG. 10 is a default screen of a preferred embodiment of the present invention.

The dashboard 400 contains filtered requirement lists for example "My Requests" 402, "My Discussions" 404, and a filtered list of tasks, labeled "My Tasks" and shown at 406 as shown in FIG. 10. The dashboard also contains search functionality that allows the user to search the requirements repository for a word, phrase or requirement identifier. The requirements listed in each of the filter sections on the dashboard are ordered with the most recently updated requirement at the top. To view all the requirements in a list, the name of the list is clicked, for example "My Requests" 402. To collapse the requirements list, the down-arrow link is clicked, for example arrow 408 for the "My Requirements" list. A second click on the arrow is used to expand the requirements list.

The repository may be searched, through use of the search feature 410 located at the top of the dashboard. The word, phrase, or identifier for the requirement(s) for the desired search is typed, and one of the radio buttons 412 (any), 414 (all), 416, (phrase) or 418 (identifier) that corresponds to the type of search criteria desired is clicked. The server will then present a page (not shown) containing the results of the search.

Creating and Modifying Requirements

There are two ways to create requirements in the repository through the web-based interface. One way, described in Adding Requirements in Meta mode below, allows users to add requirements in context during simulation operating in Meta mode. Alternatively, users can add requirements to the repository by using the Requirements/Create Requirements main menu option, in conventional fashion, to create a new requirement. Similarly, users can modify existing requirements in the repository by using the Requirements/Modify Requirement main menu option, in conventional fashion. The screen or page used to create or modify a requirement is sometimes referred to as the "requirement edit page." In addition to the name and text description of the requirement, the attributes listed in Table VI below can be assigned to the requirement. The table also describes the meaning of the attribute and its allowable values.

TABLE VI

© 2002 iRise, Inc.
Requirement Attributes

| Attribute | Description | Allowable Values |
| --- | --- | --- |
| Subtype | The subtype assigned to the requirement. | Selected from a drop-down list containing the range of potential Subtype values established by the system administrator. |
| Scope | Indicates if the requirement is considered in scope. | Selected from a drop-down list containing the values 'Undecided', 'In Scope' and 'Out of Scope'. |
| Release | The Release of the prospective application that will meet the requirement. | Selected from a drop-down list containing the releases established by the administrator. A release can only be assigned if the Scope attribute is set to something other than 'Undecided'. |
| Requestor | The person who requested the requirement. | Selected from a drop-down list containing all the users that have access to the current application. |
| Assigned To | The person who is responsible for the next workflow step for the requirement. | Selected from a drop-down list containing all the users that have access to the current application. |
| Priority | The priority or importance of the requirement. | Selected from a drop-down list containing the values established by the administrator |

TABLE VI-continued

© 2002 iRise, Inc.
Requirement Attributes

| Attribute | Description | Allowable Values |
|---|---|---|
| Estimate | The estimated amount of effort required to implement the requirement. | Any alphanumeric text. |
| Modeled | Designates if the requirement is represented in the IRM. | True or False, as represented by a checkbox. |
| Locked | Designates if the requirement has been locked (i.e. marked read only) | True or False, as represented by a checkbox. |
| Testing Scenario | Describes a test scenario that will verify that a particular requirement has been met. | Any alphanumeric text. |
| Implementation Notes | Describes a recommended implementation approach. | Any alphanumeric text. |

Creating and Modifying Tasks

Users acting in a project or team management capacity can use tasks to manage and track the activities and responsibilities of individuals involved in the process of collecting and validating requirements for the prospective application. A task represents a unit of work that may have a start date, end date, assignee and a list of associated requirements. There are two ways to create a task, using the Tasks/Create Task main menu option, where by the user can create an isolated task that has no association to any requirement or defect report; and using the 'Create Task' button on the requirement edit or defect report edit pages, whereby the user can create a task that is automatically associated to the requirement or defect report being edited. In either case, the create task page is presented, which allows the user to record the name, description and other attributes for the task. Similarly, users can modify existing tasks in the repository by using the Tasks/Modify Task main menu option, in conventional fashion. The screen or page used to create or modify a requirement is sometimes referred to as the "task edit page." In addition to a task name and description, the following Table VII lists task attributes available in the preferred embodiment, describes attributes and the range of acceptable values for these attributes.

TABLE VII

© 2002 iRise, Inc.
Task Attributes

| Attribute | Description | Values |
|---|---|---|
| Action | The action that the assignee is responsible for completing. | Selected from a drop-down list containing: Implement, Model, Review, Release, Resolve, Revise, Schedule Implementation, Test or Other. |
| Status | The status of the task | Selected from a drop-down list containing 'Complete' and 'Incomplete'. |

TABLE VII-continued

© 2002 iRise, Inc.
Task Attributes

| Attribute | Description | Values |
|---|---|---|
| Build | The build that the task will affect. | Selected from a list of all builds created by the administrator. |
| Assigned By | The user that assigned the task. | Selected from a list of all users with access to the application. |
| Assigned To | The user that is responsible for completing the task. | selected from a list of all users with access to the application. |
| Planned Start, End | The planned start and end date for the task | Any date in MM/DD/YYYY format. |
| Actual Start, End | The actual start and end data for the task | Any date in MM/DD/YYYY format. |
| Associations | The associations that exist between the task and other Requirements in the repository | N/A |

Creating and Modifying Defect Reports

There are two ways to create a defect report, using the Defect/Create Defect main menu option, whereby the user can create an isolated defect that has no association to any other requirement; and using the 'Create DR' button on the requirement edit page, whereby the user can create a defect that is automatically associated to the requirement being edited. In either case, the create defect report page is presented, which allows the user to record the name, description and attributes for the defect report. Similarly, users can modify existing defect reports in the repository by using the Requirements/Modify Requirement main menu option, in conventional fashion. The screen or page used to create or modify a defect report is sometimes referred to as the "defect report edit page." The attributes that can be entered for a defect report are listed in Table VIII, below, along with the description of the attribute and the range of allowable values for the attributes.

TABLE 8

© 2002 iRise, Inc.
Defect Report Attributes

| Attribute | Description | Values |
|---|---|---|
| Subtype | The subtype for the defect. | Selected from a drop-down containing the Subtype values established by the administrator. Described in the Administrators Guide. |
| [Defect] Status | The defect status. Note: this is separate from the requirement status attribute. | Selected from a drop-down containing the Defect Status values established by the administrator. Described in the Administrators Guide. |
| Severity | The severity of the defect. | Selected from a drop down containing Critical, High, Medium and Low. |

TABLE 8-continued

© 2002 iRise, Inc.
Defect Report Attributes

| Attribute | Description | Values |
|---|---|---|
| Discovered in Build | The code build that produced the bug. | Selected from a drop-down containing a list of builds defined by the administrator. Described in the Administrators Guide. |
| Scope | Determines if the defect fix is in scope. | Selected from a drop-down containing 'In Scope' and 'Out of Scope' |
| Release | If 'In Scope', determines which release will contain the bug fix. | Selected from a drop-down containing a list of releases defined by the administrator. Described in the Administrators Guide. |
| Reported By | The user who reported the defect. | Selected from a drop-down containing a list of users with access to the current application. |
| Assigned To | The user who is currently responsible for the defect. | Selected from a drop-down containing a list of users with access to the current application. |
| Priority | The priority associated to the defect repair effort. | Selected from a drop-down containing a list of priorities defined by the administrator. Described in the Administration Guide. |
| Estimate | The effort or time required fixing the defect. | Text Input. |
| Modeled | Determines if the proper functionality has been modeled. | Checkbox. |

Classifications

Requirements and defect reports can be organized into appropriate hierarchical classifications for additional context and organization in conventional fashion. An advantageous feature of the current invention is that a requirement may be designated to more than one classification simultaneously. Classifications can be used organize lists of requirements on pages and printed reports, in conventional fashion.

Notifications

Notifications refers to a feature that allows users to receive email messages when a requirement, defect report, or task is changed. These email messages, which are automatically generated by the invention, include the information previously recorded for the requirement, the new information recorded and the user that made the change. A user may be added to the notification list when creating or editing a requirement, defect report or task, by selecting the user names that should be notified from a list of the users with access to the system that are not currently designated to receive notifications, and moving it to the list of users that are currently designated to receive notifications. Users names may also be moved from the list of users that are currently designated to receive notifications and moved to the list of users with access to the system that are not designated to receive notifications.

Relationships

Users may designate a list of requirements that are related to a particular requirement by selecting said requirements from a list of the requirements in the repository in conventional fashion. Similarly, relationships between and among requirements, defect reports and tasks can be established.

Change History

A complete change history is maintained automatically for every requirement, change request and defect report in the repository. To view the change history the user opens the requirement, change request, or defect report in edit mode, clicks on the "History" tab. A list of all changes, the modifying user, and the modification dates is then displayed. Optionally the 'Select View' drop down to filter may be used to filter the change history by a particular type of change, for example, to show only changes to the status attribute.

Discussions

The Discussion feature allows users to converse regarding a particular requirement, defect report or change request, in the form of an on-line threaded discussion, as would be understood by an individual skilled in the art. The record of such a conversation are stored in the repository so they can be referred to at any point for decisions, opinions and general information submitted by the discussion participants.

Attachments

Attachments allow you to add supporting documents to the repository. This can be useful, for example, when a diagram clarifies a requirement or a screen image supports a defect report. To add an attachment to a requirement, or defect report:
1) Click on the Attachments tab.
2) In the 'Create New Attachment' area, click on the Browse button.
3) Pick the attachment to upload from the local file system.
4) Click on the 'Attach File' button to upload the file.

Once the file has been uploaded, it is part of the attachment pool in the repository that contains all the files that have been uploaded for the current prospective application.

Alternatively, a requirement can be tied to any file that exists in the attachment pool instead of uploading the same file twice. This is useful if the user has a number of requirements that are supported by one document.

To attach a requirement to a file in the attachment pool:
1) Click on the View List button in the 'Create New Attachment' area. The Attachment page will refresh showing the attachment pool.
2) Click on the file name to attach a file in the pool to the current requirement. The page will refresh and the file name will be listed in the 'Current Attachments' list.

If a requirement has an attachment, then an attachment icon will be displayed on the Attachment tab. Typically, the icon will appear to be a sheet of paper with a corner folded over and a paperclip on the top of the paper.

To delete an attachment from a requirement:
1) In the 'Current Requirements' list, select the Delete checkbox for the attachments to delete.
2) Click on the Delete button and the checked attachments will be removed from the current requirement. Note: if no other requirement is attached to the deleted file, then it will also be remove from the attachment pool.

Viewing Requirements, Defect Reports and Tasks

Existing requirements and defect reports can be viewed in a variety of conventional manners using the Requirement/

View Requirements main menu option Tasks can be viewed in a similar conventional fashion using the Task/View Tasks main menu option. The View Requirements page is organized into two major areas: the filter area and the list area. The filter area contains a set of conventional filters that allow the user to view a subset of all the requirements and defect reports in the repository. The list area contains the subset of the requirements or defect reports. Once any filter, or variety thereof is selected, pressing the "Go" button will apply the filters and refresh the list. The format of the requirement list can be presented in a variety of fashions by selecting a format from the drop-down list named "Format". The preferred options are described in Table IX below.

TABLE IX

List Format Options

| Format | Description |
| --- | --- |
| List | Organizes the requirement list by classification in a non-hierarchical manner, i.e. all classifications are presented in a flat list. Expanding the classification reveals a list of requirements, change requests, and defect reports, displaying the identifier, Status, and Name attributes |
| Detail | Organizes the requirements list by classification in a non-hierarchical manner, i.e. all classifications are presented in a flat list. Expanding the classification reveals a list of requirements, change requests, and defect reports, displaying the identifier, Type, Subtype, Status, Scope, Release, Requestor, Modification Date, Modifier, Name and Requirement Text attributes |
| Hierarchy | Organizes the requirement list according to the classification hierarchy. Expanding a particular classification reveals all the children classifications, requirements, change requests, and defect reports. |
| Grid | Organizes the requirement list by classification in a non-hierarchical manner, i.e. all classifications are presented in a flat list. Expanding a classification reveals a list of requirements, change requests, and defect reports, and allows you to edit the following attributes: Locked Assigned To Priority Status Estimate Subtype Severity Scope Release |

Custom and Quick Filters

Custom Filters define a predefined, customizable set of conditions that can quickly filter the list as desired. They can be used to apply, delete or edit an existing custom filter, as well as create a new custom filter. These actions are accomplished in a conventional fashion and the selection of particular filter criteria is considered to be within the ordinary skill of the art.

Quick filters allow the user to apply and combine attribute-based filters to the requirement list. When multiple quick filters are selected, the result set includes all requirements that meet ALL of the specified filter criteria. For example, if the Requested By quick filter is set to 'used' and the Status quick filter is set to 'approved', then all the results shown in the requirements will be requested by user 1 and 'approved' in status.

Classification Filter

The classification filter allows the user to filter out requirements that are not contained by the classification selected in the classification filter drop-down. To filter by classification the user selects the classification that contains the requirements desired, and their requirements will be recursively included in the list.

Search Filter

The search filter allows the user to search the entire repository or the filtered requirements currently presented on the list for a word, phrase, or requirement identifier. To search for a requirement, the word, phrase or identifier of the requirement desired is typed in the search criteria prompt. Then the radio button that represents type of search criteria being used is clicked and the 'Go' button is clicked to execute the search. When the page is refreshed, only requirements that contain the specified search criteria are included in the list.

The List Area

The list area displays a set of requirements that meet the filter criteria specified in the Filter Area of the View Requirements page. The requirements are organized by classification, and formatted according to the Format drop-down in the filter area.

Expanding and Collapsing Classifications

The default view for the lists area shows a list of the classifications that contain requirements that meet the filter criteria. Each classification is collapsed by default. To expand a classification and examine its contents, the user clicks on the (+) symbol to the left of the classification name. Alternatively, the user may click the 'Expand All' button to expand all collapsed classifications. Similarly, to collapse a classification, the (−) symbol is clicked or the 'Collapse All' button is used.

Deleting Requirements or Defect Reports

To remove a requirement or defect report from the repository:
1) Use the Requirements/View Requirements main menu option to display a list of requirements and defect reports.
2) Find the requirement to delete in the requirement list (using the filters if necessary).
3) Click on the requirement text or title to edit the requirement.
4) Use the classification drop-down to select the "Trash" classification.

Requirements designated to the Trash classification are automatically filtered out of all requirements lists, so they are essentially stored in a deleted state. To remove a requirement out of the trash, open the Trash classification in the View requirements list, find the requirement to revive, and use the classification drop down to put the requirement into a classification other than Trash.

Using Reports

The reporting feature of the preferred embodiment includes two pre-built reporting templates that the user can use to produce electronic reports of data contained in the repository that can be subsequently printed; the Functional Specification Report, sometimes referred to as the "FSR" and the Requirements Inventory Report, sometimes referred to as the "RIR." These reports are described in detail below.

By default, both reports draw on the data that exists in the repository at the time report is generated. However, the user can produce historical reports using by specifying a previously created version tag, as described below.

Functional Specification Report

Figure 11:
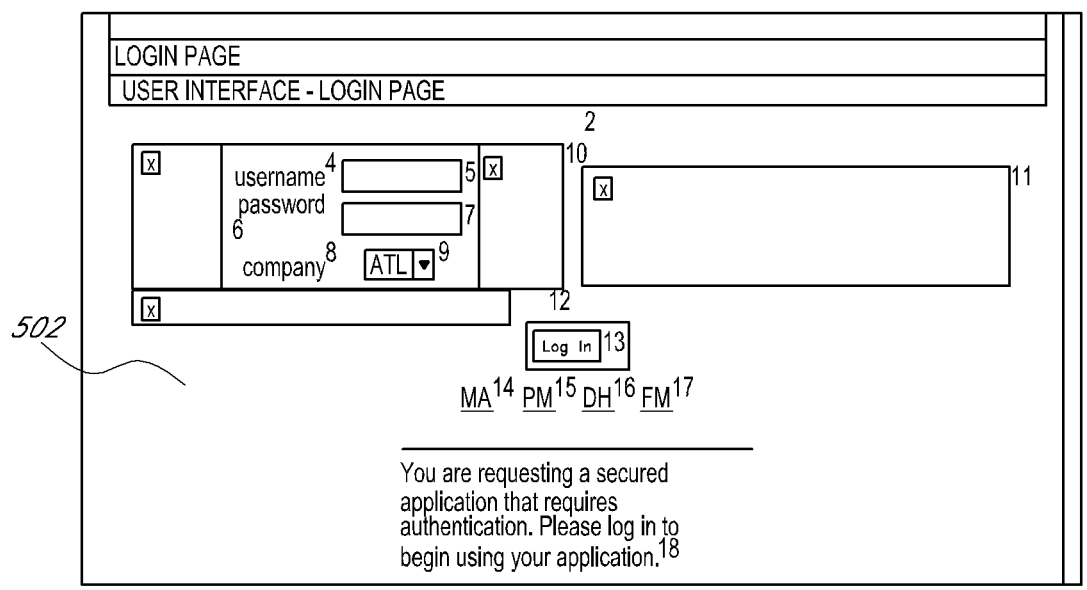
FIG. 11 is an example of the interactive representation page section of the functional specification report of the preferred embodiment of the present invention.

With reference to FIGS. 11-14, the Functional Specification Report contains at least one image of a page from the interactive representation rendered by the simulator depicted in FIG. 11 at 502, which includes reference numbers 2 and 4-18 associated with respective user interface elements. The image is identical to what a user would see when executing the interactive representation using the simulator component, as previously described, in Meta mode, also as previously described. In addition the functional specification report 504 contains, with reference to FIG. 12, a list of the requirements associated with the page presented at 502 and/or the user interface components contained therein. Only requirements that are associated to the pages included in the report will be printed in the FSR. Additionally and with reference to FIG. 13, the FSR may optionally contain a summarization of the control flow connections that originate from the primitives contained on the page(s) included in the report at 506, 508. This section includes the name and an icon indicating the type of the primitive from which the control flow connection originates and the name and an icon indicating type of the primitive at which the control flow terminates. If the control flow terminates at a decision, this section of the report shows the name of the decision, the labels on its branches (e.g., T, F, 0, 1, 2, 3), and the name and an icon representing the type of the primitive at which the control flow from these branches terminate. Additionally, the FSR shows the name of all decision primitives and pages that have contained primitives with control flow connections terminating at the page that is the subject of the report, along with an icon indicating their type.

Furthermore, with reference to FIG. 14, the FSR optionally includes a list of all primitives contained on the page that have data flow connections terminating at them at 510, along with primitives name, an icon indicating the type of primitive, the data flow label for the connection, an icon representing the type of the primitive that is the source of the data flow connection and the name of the primitive that is the source of the data flow connection.

Furthermore, with reference to FIG. 14, the FSR optionally includes a list of primitives contained on the page that have data flow connections originating from them at 512, along with an icon indication the type of the primitive. In addition the name of the connecting data flow's label, and the name and an icon representing the type of the primitive at which the data flow terminates. If the data flow terminates at a primitive, and that primitive has data flow connections originating from it, the reports continues listing connection information, with new primitives starting a new line, until all primitives that are connected by data flow are encountered and listed on the report. In the preferred embodiment, the studio component includes a feature that would prevent users from creating an IRM that would cause the FSR's process to experience an endless loop. Furthermore, in practice, most regions of interconnected dataflow are not more than 5 levels deep.

These report sections are advantageous features of the present invention, because they communicate the requirements in the context of static images extracted from the interactive representation, as well as control and data flow connection information that is useful to the individuals that will be designing and programming the prospective application.

In the preferred embodiment, the FSR is delivered as an HTML document that can be displayed and printed by a browser. To generate the FSR:
1) Click on Reports/Generate Reports in the main menu.
2) Optionally pick a version tag to produce a historical report.
3) Select the Functional Specification Report radio button.
4) Click on the 'Customize Report' button. The server will present the FSR parameter screen.
5) Type a Title and a Header for the report.
6) Select the pages to include in the report by clicking on the page name in the 'Available' list and clicking on the (>) button to move the selected pages to the 'Selected Pages' list. Use Ctrl and Shift to select multiple pages.
7) Set the Modeled filter to include Modeled, Not Modeled, or all requirements associated to the selected pages.
8) Optionally pick the 'Number Elements on Page Images'. This will produce the screen shots in Meta mode so the requirements can be easily tied to their associated widget.
9) Optionally pick 'Show all Requirement Attributes' to include attributes for each requirement included in the report.
10) Optionally pick 'Dataflow On' to include a data flow section for each page in the report.
11) Optionally pick 'Navigation On' to include the navigation flow section for each page in the report.
12) Select the desired print orientation option.
13) Click on the 'Create Report' button.

Requirement Inventory Report

The Requirement Inventory Report (RIR) contains the set of requirements that meet filters applied on the report parameter page. The report is produced in PDF format, making it easy to distribute. To generate the Requirement Inventory Report:
1) Click on Reports/Generate Reports in the main menu.
2) Optionally pick a version to produce a historical report.
3) Select the Requirement Inventory Report radio button.
4) Click on the 'Customize Report' button. The server will present the RIR parameter screen.
5) Use the filter area at the top of the RIR parameter page to determine what requirements should be included in the report.
6) Type a Title, Header, and Footer for the report.
7) Optionally elect to 'Include Table of Contents.'
8) Select the print orientation.
9) Select the preferred sorting options.
10) Optionally elect to also print associated requirements, change requests, or defect reports.
11) Click on the 'Create Report' button.

Figures 16, 17:
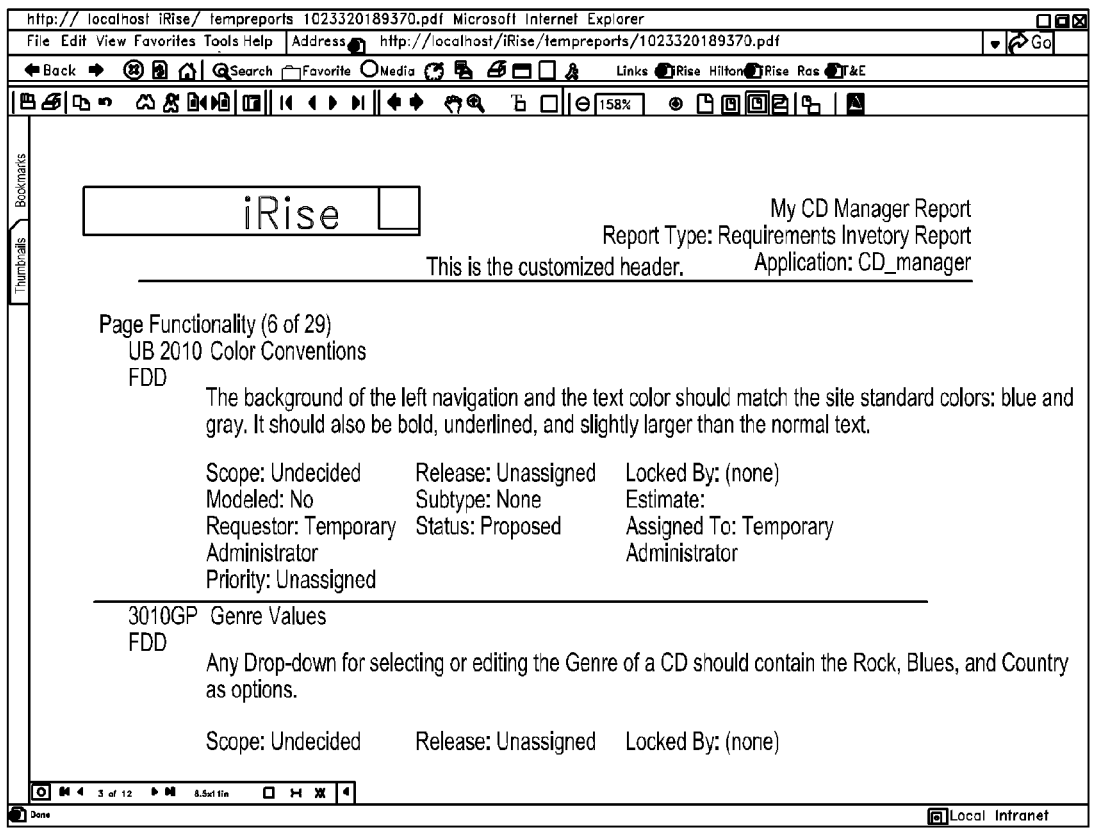
FIG. 16 is another example of the requirements section of the functional specification report of the preferred embodiment of the present invention.
FIG. 17 displays an example of a requirement inventory report of a preferred embodiment of the present invention.
Figure 19:
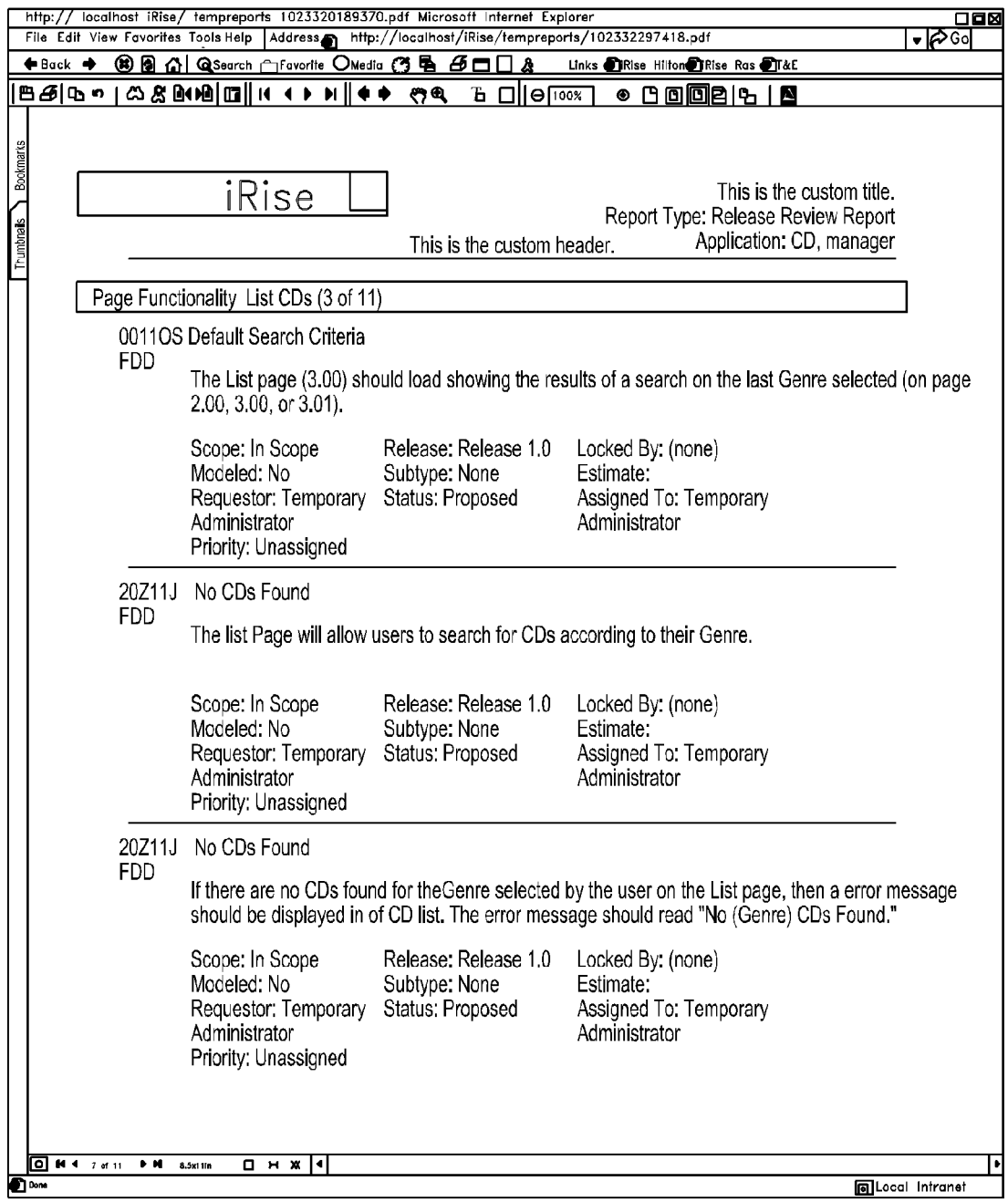

The server will present the RIR report in PDF format in a new browser window. FIG. 17 shows a sample of the RIR content.

Creating Version Tags

Version tags are bookmarks in the history of an application simulator application. The reporting feature can use version tags to generate historical reports. To generate a version tag:
1) Select Reports⇒ Version Tags from the main menu.
2) Click on the 'Create a New Version' button.
3) Type in a Version Number, Name and Description.

4) Click on the 'Create Button'. The server will attach the current date and time to the version tag.

Reports can now be optionally run against the version tag to produce historical views of the database.

Simulating the Proposed Application

As the project team iteratively builds the IRM in concert with the requirement data for a proposed application, all users with access to the application may view and validate the simulation for that proposed application through the online interface. To simulate the proposed application the menu option Simulate/Simulate from the main menu is selected. The system will display a browser window containing a list of pages in the IRM. Clicking on the name of a page initiates a simulation session. The interactive representation of proposed application can be viewed in one of two modes: Clean or Meta. The buttons at the top of the simulation page can be used to toggle between Clean and Meta mode.

Meta Mode

With reference to FIG. 20, The Meta mode shows the simulated page with superscript enumerations uniquely identifying all the visible user interface components in the simulation area 437. The Meta mode also includes an add requirement area 435 that allows users to add and view requirements that describe the simulated page, without needing to return to the create requirements page, and a list of the requirements associated with the visible user interface components at 439, enumerated with corresponding numbers.

Adding Requirements in Meta Mode

Users can add requirements to the repository using the 'Add Requirement' section of the Meta mode page. To add a requirement:
1) Click on the superscript number of the widget that you want to create a requirement for.
2) Type the name and requirement text for the new requirement.
3) Optionally fill out the other requirement attributes.
4) Optionally select the classification that will contain the requirement.
5) Click on the 'Add Requirement' button.

Viewing Associated Requirements in Meta Mode

Figure 20A:
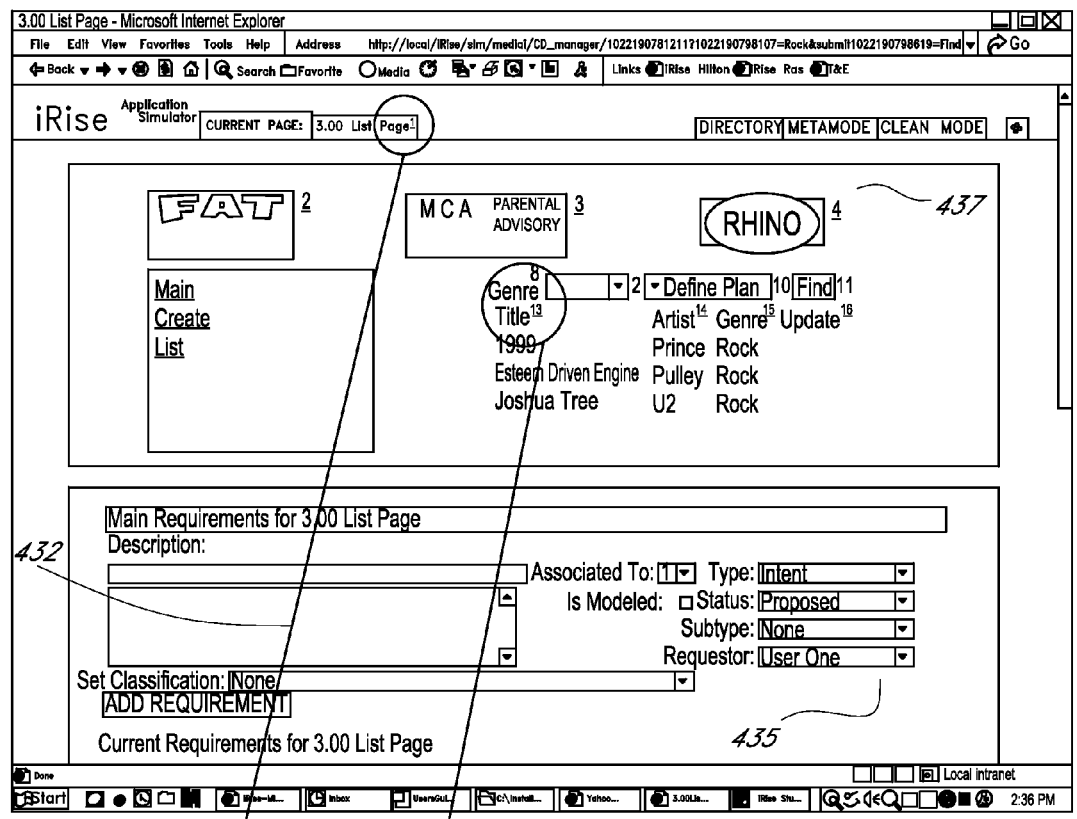
FIG. 20A-B displays a page of the interactive representation of the preferred embodiment of the present invention in Meta mode.
Figure 20B:
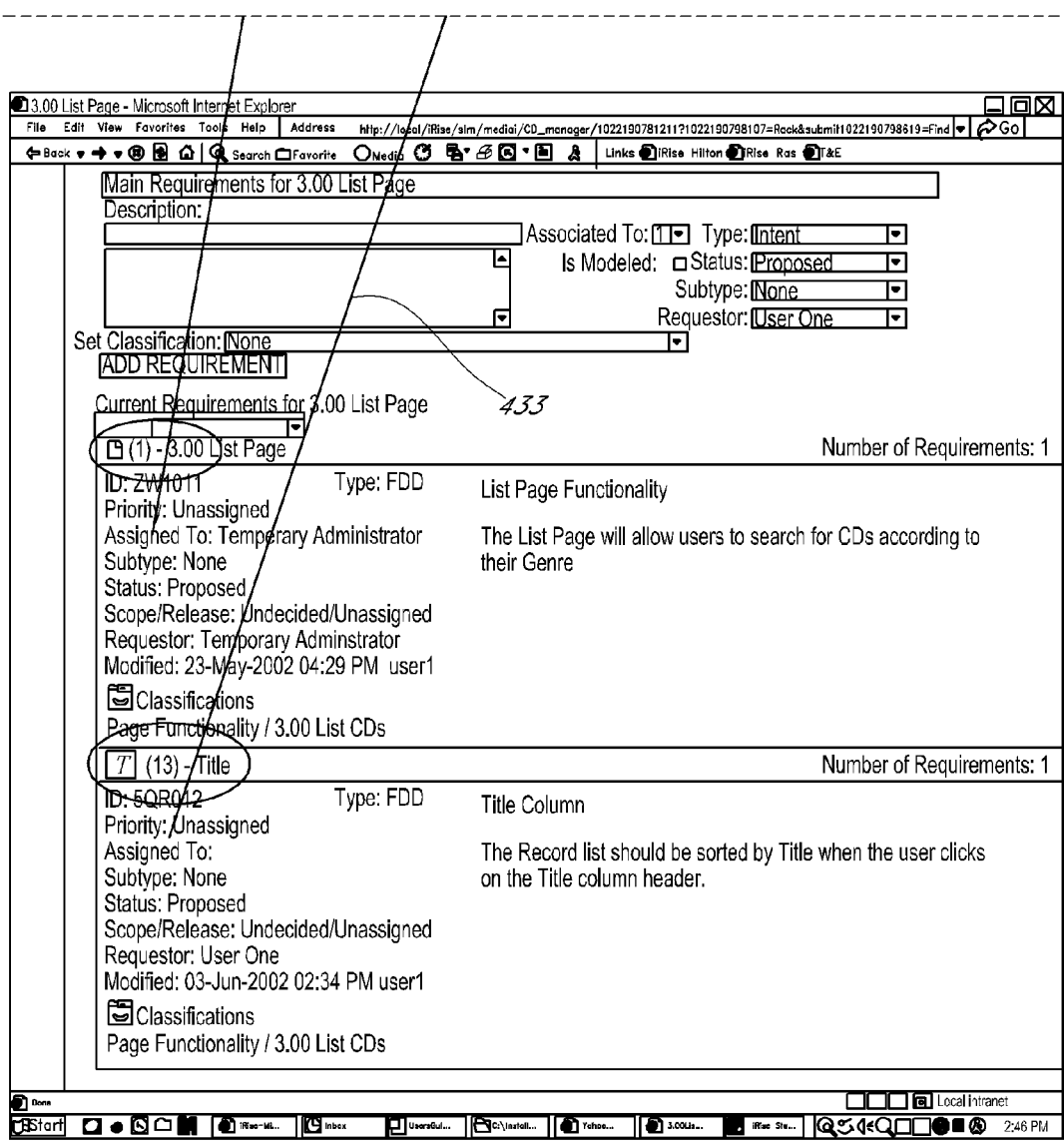

All requirements that are currently associated to the simulated page or elements on the simulated page are shown in a list below the simulated page 439. The requirements are organized into groups labeled according to the element to which they are associated. FIG. 20 (split into FIGS. 20A and 20B for clearer publication) shows the simulation in Meta mode and highlights the relationship between the requirements and their associated user interface components. For example line 432 highlights the relationship between the list page (with superscript 1) and the requirement numbered 1. Similarly, for example, line 433 highlights the association between the user interface element superscripted 13 with the requirement number 13. Other user interface elements in FIG. 20A are similarly labeled with superscripts that indicate requirements related to the respective user interface elements.

Clean Mode

Figure 21:
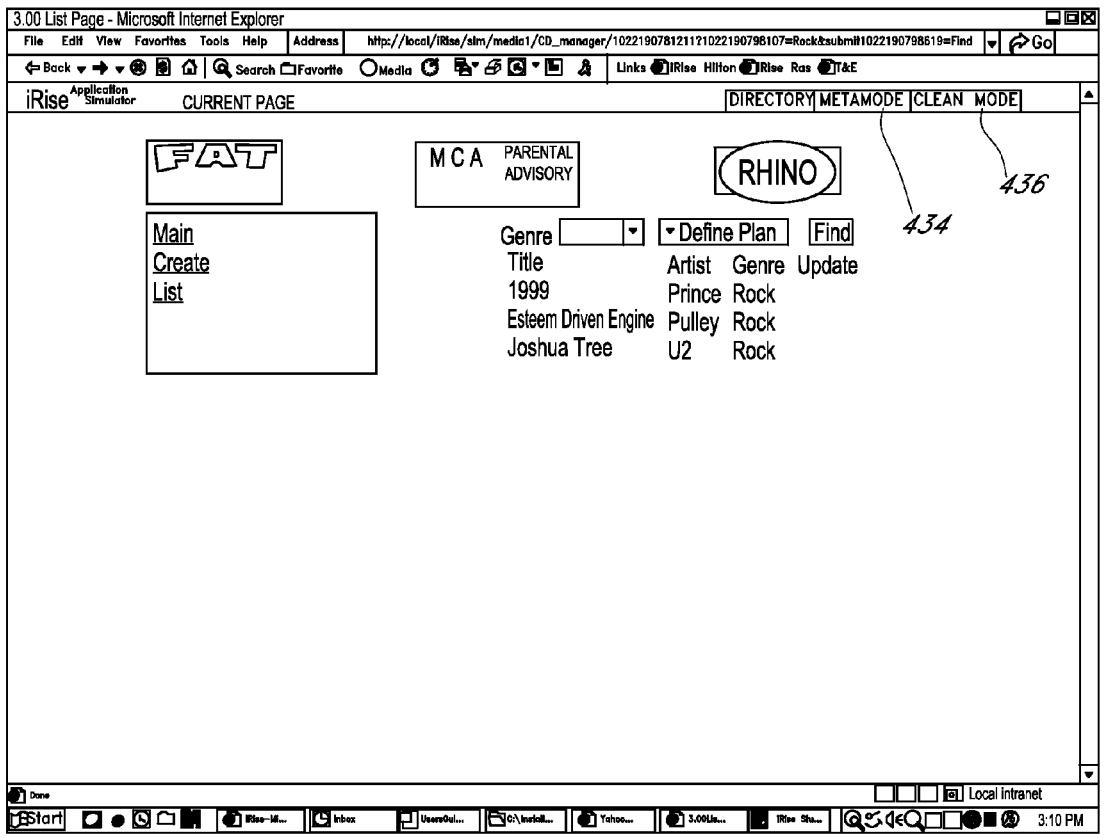
FIG. 21 displays a page of the interactive representation of the preferred embodiment of the present invention in Clean mode.

The Clean mode allows users to view the simulated application in its purest form, and an example screen is shown in FIG. 21. The buttons 434 and 436 in the upper-right area of the simulation window allow the user to toggle between clean mode 436 and Meta mode 434. Clean mode displays the pure prototype HTML without any superscripts or requirement data. This allows users to get a more realistic feel for the application being defined.

Simulcasting a Simulation Session

The simulcastor component allows multiple users to follow a leading user who is exiting an interactive representation model. Any user may lead or follow a simulcast session. To start and lead a simulcast session:
1) Click on Simulate/Simulcast in the main menu. The server will present the Simulcastor page in a new browser window.
2) Pick the subject application to use in the simulcast session.
3) Click on the 'Lead Simulation' button. The server will present a page confirming that that user is leading the simulcast. Any users following the simulcast will be listed in the 'Participants' list.
4) Click on the 'Simulation Home Page' to go to the page directory for the application that is simulcasting. As the lead user clicks through the application, the users following the simulcast session will see the same pages.
5) When finished, click on the 'Stop Leading' button.

To follow a simulation session:
1) Click on Simulate/Simulcast in the main menu. The server will present the Simulcastor page in a new browser window.
2) Pick the application that will be simulcast.
3) Click on the 'Follow Simulation' button. The prototype pages presented to the leader as the leader of the simulcast session uses the simulation will also be presented to each follower.
4) During the simulcast session, the simulation seen as a follower is 'live', meaning that the user may use the pages as desired, until the session leader changes pages. At that point the server will present the leader's new page to all the simulcast followers.

The Studio™ Interface Software Application

The Studio™ interface allows the user to build the proposed application's interactive representation that is iteratively validated through simulation. The Studio client is started by double-clicking on the Studio icon on the client computer. When the login window appears, the user may or must provide the data listed in Table X below, before beginning a Studio session.

TABLE VIII

Studio Login Window Data

| Data | Description |
| --- | --- |
| Username | The user's username, must be provided. |
| Password | The user's password, must be provided |
| Server | The hostname or IP address, must be provided. |
| Port | The port on which the music server is running, must be provided. |
| SSL | A checkbox signifying whether the music server should be communicated with using the HTTP or the HTTPS protocols. |
| Proxy | A checkbox signifying whether the music server should be contacted through a proxy. |
| Address | The hostname or IP address of the proxy server |
| Port | The port on which the proxy server is running |

Building the Interactive Representation Model
Adding Primitives

Primitives are the building blocks that allow the user to rapidly build the IRM. In general, primitives can be added to the IRM in three different ways, depending on user preference:
1) Using the toolbar
2) Using the right-click menu options
3) Using the Insert main menu options

Adding a Primitive from the Toolbar

To add primitives from the toolbar, two options are available. The drag-and-drop approach allows the user to drag an element from the toolbar area and drop it at the desired location in the IRM. The insertion point approach allows the user to place the insertion point where the user wants the element to be located on the whiteboard The raised buttons on the toolbar that represent the element wanted are simply clicked to add.

Adding a Primitive from the Right Click Menu Options

To add a primitive from the right click menu:
1) Right click on the location where the new primitive is wanted.
2) Follow the New submenu to find the primitives that is to be added.
3) Click on the desired primitive. The elements that cannot be inserted at the selected location will be disabled in the menu.

Adding a Primitive from the Insert Main Menu Options

To add a primitive from the Insert main menu option:
1) Place the insertion point where the user wants to insert the new primitive.
2) Click on the Insert main menu option.
3) Follow the submenu to find the primitives to add.
4) Click on the desired primitive. The elements that cannot be inserted at the selected location will be disabled in the menu.

Adding Pages

Pages are special primitives. They are used throughout the application as references and organizational structures. Pages are 'top level' primitives: They can only be inserted directly on the gray area of the whiteboard. The Page icon is typically an illustration of a sheet of paper, not shown, in vertical orientation and with a corner folded over.

Adding Primitives to Pages

User interface primitives are pages and any other primitives as identified in Table II above are primitives that can be contained in a page. User interface primitives are shown as Toolbar Icons. In general, a user can add a primitive to a page by following the process described in the adding primitives section. However, some user interface—tag primitives, e.g. the select primitive, text input primitive, etc., must be contained by the form primitive.

Using the Radio Button Primitive

The radio button primitive allows the simulation user to pick one value from a set of options. The options are defined by the first data flow connected to the radio button primitive. Additionally, the second data flow connected to the radio button primitive can be used to define the radio button option that is selected by default when the simulator presents the page. To create a radio button set:
1) Add a radio button primitive into a form.
2) Define the name of the radio button primitive.
3) Select the layout of the radio button set (vertical or horizontal).
4) Click OK.
5) Add the first data flow line leading to the radio button primitive to define the domain values (i.e. options) available in the radio button set. This can be accomplished using a Constant or data flow from another action (e.g. unpack, session or find). During simulation, one option will appear in the radio button set for each data object or element that is available through the data flow.

If there is only one data flow input for the radio button primitive, then by default no option will be selected when the page is displayed in simulation. However, the user can use a second data flow input to define the default value. If the value of the second data flow matches one of the values in the first data flow input, then that value will be selected be default. If the value of the second data flow does NOT match one of the values in the first data flow input, then the second data flow value will be added to the radio button set and set as the default.

Using the Select Primitive

The select primitive allows the user to add drop-down lists, also known as 'selects' to the IRM Like a radio button primitive, the select primitive allows the simulation user to pick one value from a set of options. The list of options available to the simulation user is defined by the first data flow input connected to the primitive. The second (optional) data flow input connected to the primitive can be used to set a default value that appears when the page containing the select primitive is simulated. To add a select primitive:
1) Drop a select primitive into a form.
2) Define the name of the select primitive.
3) Optionally define the size of the select primitive. The size attribute determines how many options are visible simultaneously in the simulation.
4) Click OK.
5) Add the first data flow input to the select primitive to define the domain values (i.e. options) available in the simulated drop-down set. This can be accomplished using a Constant or data flow from another action (e.g. unpack, session or find). During simulation, one option will appear in the drop-down set for each data object or element that is available through the first data flow.

If there is only one data flow input line connected to the select primitive, then by default the first value in the data flow input (e.g. the first value listed in the Constant) will be the default value when the drop-down is displayed in simulation. However, the user can use a second data flow input to define a different default value. If the value of the second data flow matches one of the values in the first data flow input, then that value will be selected be default. If the value of the second data flow does NOT match one of the values in the first data flow input, then the second data flow value will be added to the select options and set as the default.

Using Button Primitives

Button primitives allow the user to represent HTML button inputs. They primarily exist to submit form data and allow page navigation. To create a button:

1) Drop a button primitive into a form.
2) Define the name and the value of the button. The name will be shown in the Studio application whiteboard and the Value will be shown on the face of the button in the simulation. Click OK.
3) Alternatively create navigation flow from the button to the appropriate page or navigation decision. If the button does not have outgoing navigation flow, then when the user presses it in simulation, the parent form will be submitted but the same page will be represented.

To use an image as the face of a button:
1) Access the properties of the button to change.
2) Change the Type property to Image.
3) Click on the Set button to set the image source.
4) Pick an image from the local drive and click open.
5) Click OK in the property editor.

Using Conditional Html Primitives

Conditional HTML (CHTML) primitives allow the user to add dynamic presentation logic to the interactive representation. Depending on the single data flow input, the CHTML displays one of its numerous branches. Similar to navigation decisions, CHTML primitives can exist in Boolean or integer mode. In Boolean mode, the CHTML logic is based on the existence of incoming data flow. In integer mode, the CHTML logic is based on the value of the incoming data flow. A CHTML primitive is in Boolean mode until a third branch has been added, at which time the primitive is transformed automatically to integer mode. To create display logic:
1) Drop a conditional HTML primitive into a page on the whiteboard.
2) Define a name for the CHTML primitive.
3) Click OK.
4) Add the first branch to the CHTML primitive by dropping a primitive into the CHTML primitive. A 'F' will appear in the upper right corner signifying creation of the 'False' branch of the CHTML.
5) Drop another primitive into the CHTML primitive, but outside the boundary of the primitive contained in the 'F' branch A 'T' will appear in the upper right corner representing the new 'True' branch.
6) Add a data flow input line to the CHTML that will determine what branch the CHTML will display during simulation.

The interactive representation IRM now includes conditional HTML logic that displays the 'T' branch if the data flow input contains any value other than 0 (zero). Otherwise, the 'F' branch is displayed.

The user can turn a CHTML primitive into integer mode to IRM more than two display alternatives. To create an integer-mode CHTML primitive:
1) Drop a conditional HTML primitive into a page on the whiteboard.
2) Define a name for the CHTML primitive.
3) Click OK.
4) Add the first branch to the CHTML primitive by dropping a primitive into the CHTML primitive. A 'F' will appear in the upper right corner signifying creation of the 'False' branch of the CHTML.
5) Drop another primitive into the CHTML primitive, but outside the boundary of the primitive contained in the 'F' branch. A 'T' will appear in the upper right corner representing the new 'True' branch.
6) Add a third branch by dropping another primitive into the CHTML primitive but outside the existing branch. When this is completed, the branch labels (in the upper right corner) will change from [T, F] to [0,1,2], signifying that the CHTML is now in integer mode.
7) Repeat step 6 as necessary until CHTML branches represent all logical display options.
8) Add a data flow input line to the CHTML that will determine what branch the CHTML will display during simulation.

The interactive representation model IRM now includes display logic that shows one of numerous branches depending on the VALUE of the incoming data flow. If the value of the data flow is an integer value corresponding to one of the CHTML branches, then that branch will be displayed in simulation. If the value is null, 0 (zero) or anything else not represented by the CHTML branches, then the 0 (zero) branch will be displayed by default.

Using Dynamic Table Primitives

Dynamic Table primitives allow the user to create interactive representations of lists of data, typically database-driven lists. In simulation, a dynamic table primitive appears as a table that contains one row for each data token, or row, passed to it during the processing of the simulator. The column names shown in the interactive representation and the data to be displayed from each of the tokens of the dynamic table are defined by the primitives placed in the dynamic table.

Displaying Data in a Dynamic Table

The data tokens that are displayed in a dynamic table typically come from a several actions related to each other using data flow. Typically these actions are a find and unpack action chain. The data flow outputs from the unpack action usually flow into the primitives contained in the dynamic table. To create a dynamic table:

Add a dynamic table to a page in the IRM.

Put one primitive into the dynamic table to represent each column that should appear in the interactive representation.

Connect data flow from an unpack action to one or more of the primitives contained in the dynamic table.

Linking from a Dynamic Table

Figure 22:
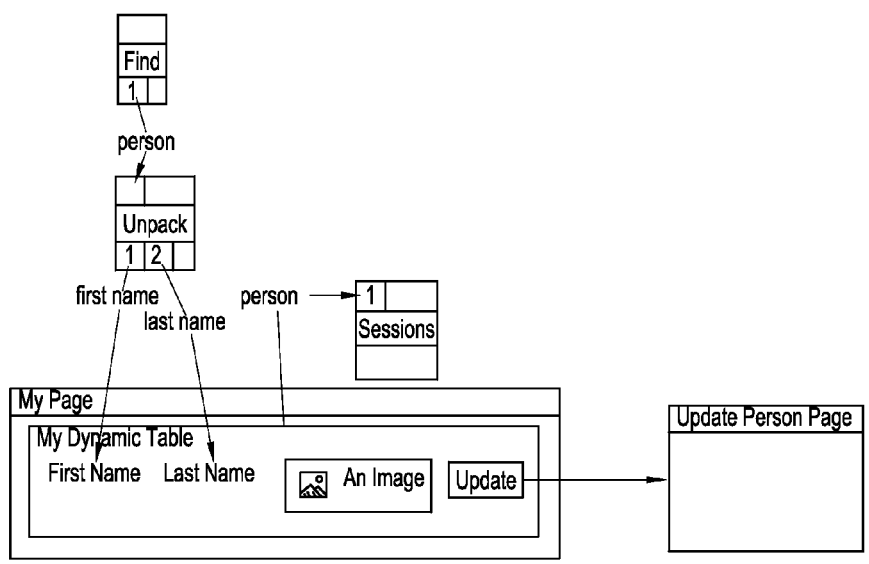
FIGS. 22 and 23 display an examples of usage of a dynamic table of a preferred embodiment of the present invention.

Dynamic table columns may be designated as sources of control flow, allowing simulation users to click on a link in a row of data to navigate to another page, as shown in FIG. 22. When navigation flow is established from a primitive in a dynamic table, that link will be present on every row in the simulated table. Dynamic tables also have a specialized feature that allows the user to IRM simulate the behavior of a subject application wherein a data token is selected from a dynamic table. When a user clicks on a link in a dynamic table, the data token represented by the row containing the link is passed out of the dynamic table as output data flow, and used in subsequent processing.

Using Dynamic Tables for Batched Updates

Figure 23:
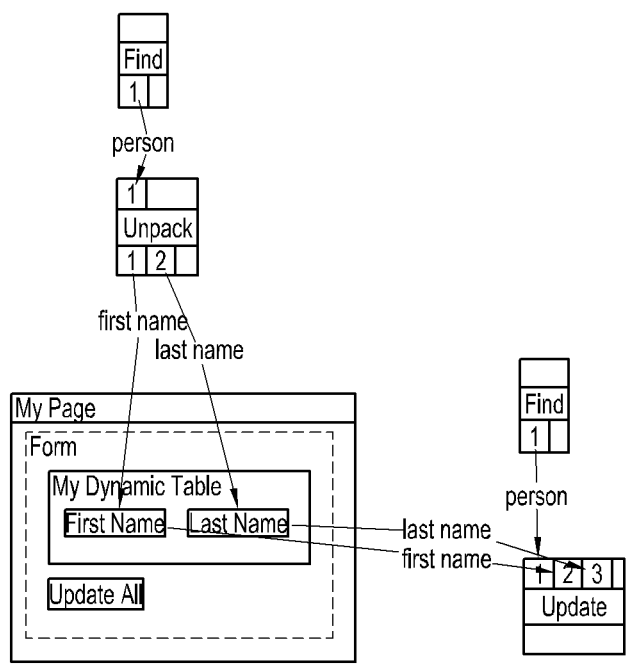

Furthermore, dynamic tables can be used for batched updates. This feature allows the user to simulate a common function of subject applications wherein a editable list of data tokens is presented. To add this functionality to the IRM, the dynamic table must be contained in a form primitive and the dynamic table receive data flow input from an unpack action. Furthermore, the primitives contained within the dynamic table must be of the class user interface components—input tags. During simulation, when a button primitive that is contained in the same form as the dynamic table is clicked, all data tokens containing the values entered by the simulation user are submitted to the simulator for processing. Typically, in the context of using dynamic table for batched updates, the contained primitives in the dynamic table are each related to an update action primitive, while the origin of the set of data tokens is related to the first input of the update action primitive. The specialized dynamic table processing in the simulator ensures that the appropriate data token(s) is(are) updated by the update action primitive. A typical usage of a dynamic table in this respect is shown in FIG. 23

Using an Image Primitive

The image primitive allows the user to add images to the interactive representation. The user can specify the source file for the image and connect the image to other primitives with control flow. To add an image to the IRM:
1) Drop an image primitive into a page.
2) Name the image appropriately and set any other desirable attributes.
3) Click on the 'Set' image button.
4) In the file selection dialog, pick the image file you want to use in the IRM and press Open.
5) Click OK.

Using Actions

Figure 24:
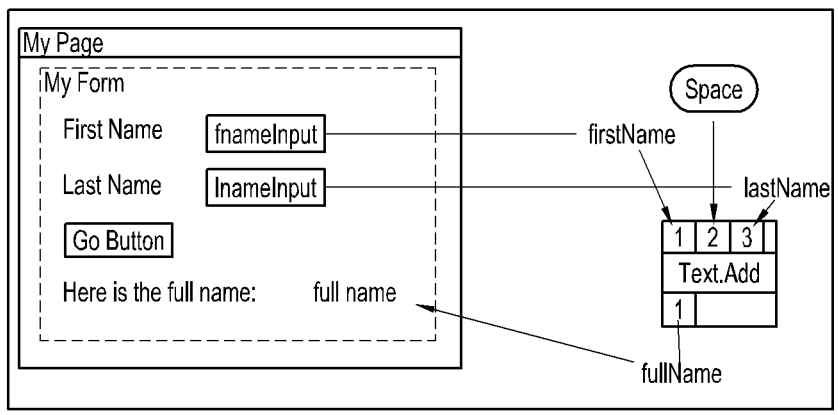
FIG. 24 displays an example of use of an action primitive of a preferred embodiment of the present invention.

As previously described, action primitives define how data will be transformed, derived, stored, retrieved, sorted or otherwise manipulated by the interactive representation. In the preferred embodiment, actions include typical ways that computer systems manipulate data, and are not specific to any particular computer programming language. The example illustrated in FIG. 24 shows the use of a "text.add" action. The "text.add" action appends each of its inputs to each other, resulting in a single string containing the characters found in its inputs. Its function is similar to that of a concatenation operator found in conventional programming languages. In this case the text.add action is being used to concatenate the first name provided by the simulation user with a space and the last name, also supplied by the user during simulation. The inputs to the action in this example are the data flow connections labeled firstName and lastName originating from text input primitives labeled fnameInput and InameInput respectively. When the user simulates the page labeled "My Page, the page containing the text input primitives labeled fnameInput and InameInput is presented to the user, whereupon they may enter values into each of these fields and click the button primitive labeled "Go Button." After the simulator completes processing the form submit that was triggered when the user clicked the button, the values that were entered by the user are passed in the form of data tokens to the text.add action as described above. The text.add primitive executes its internal concatenation routine and returns a data token labeled fullName. Then the page labeled "My Page" is redisplayed with the computed full name displayed at the text field labeled "full name."

Adding Decisions

Decisions define the conditional execution of other primitives. In the preferred embodiment, decisions function in a manner similar to that of "IF . . . THEN" and "CASE" statements found in conventional computer languages. Alternatively, decisions could be based on other conditional or branching structures found in conventional computer languages, or derived from common behaviors found in conventional computer applications.

For example, the following behavior could be represented by through the use of a decision in an IRM:
If the subject application user has a savings account record, clicking on, the 'my account' link should cause the page named My Account Home Page to be displayed by the subject application, otherwise, the page named Account Registration should be displayed.

Using a Decision Connected in Boolean Mode

Figure 25:
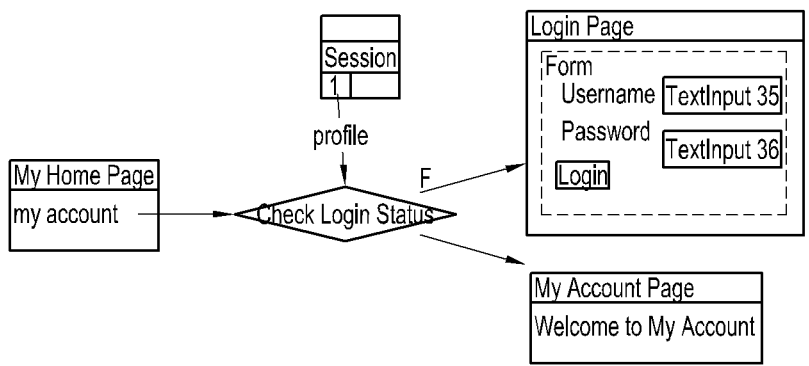
FIG. 25 displays an example of the use of a decision primitive in boolean mode of a preferred embodiment of the present invention.

Decisions process in either Boolean or integer modes, depending on the number of control flow outputs that are connected to them int the IRM. A decision with less than three control flow outputs evaluates in Boolean mode. When connecting the control flow outputs, the first control flow connection made by the user designates the path of processing if the boolean data token it receives from its input data flow has the value of "False", whereas the second connection made by the user designates the path of processing if the data token it receives from its input data flow has the value of "True." The example illustrated in FIG. 25 shows a decision named "Check Login Status" that evaluates based on whether or not a profile data token is available in the session as follows:
If there is any profile data object in session, then the decision evaluates to true and the simulator's processing follows the 'T' branch, and hence, the My Account Page constructed by the simulator and returned to the user for display. If there is no profile data token in session, then the decision evaluates to false and the simulator's processing follows the 'F' branch, and, hence, the Login Page is displayed.

Using Decision Connected in Integer Mode

Figure 26:
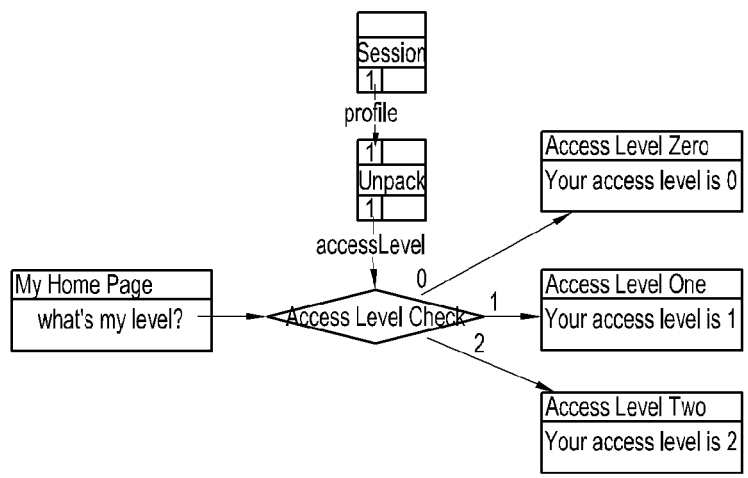
FIG. 26 displays an example of use of a decision primitive in integer mode of a preferred embodiment of the present invention.
Figure 27:
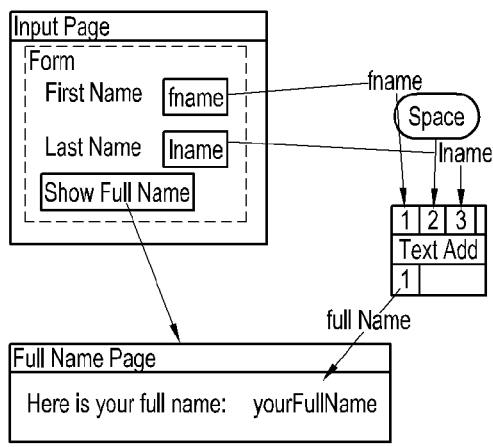
FIG. 27 displays an example of use of a constant as an input to an action of a preferred embodiment of the present invention.
Figure 28:
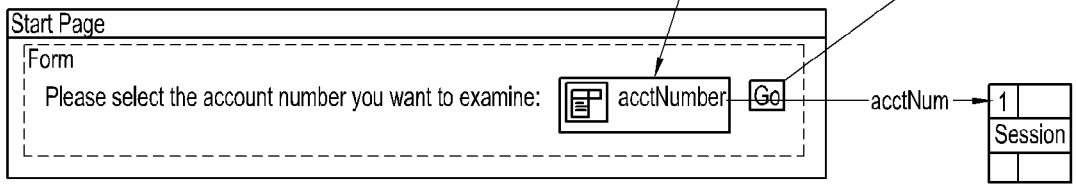
FIG. 28 displays an example of a use of a comment of a preferred embodiment of the present invention.

A decision with three or more control flow outputs evaluates in integer mode. An integer navigation decision evaluates on the integer value of the data flow input. If the value of the data flow input is null or anything other than the integers specified by navigation flow output labels then the navigation flow defaults to follow the '0' branch. The example illustrated in FIG. 26 shows a decision named "access level check" that evaluates based on the access Level data token of the profile data token stored in session, as follows:
If the access level data token contains a to 0, 1, or 2, then the simulator will present the pages labeled "Access Level Zero", "Access Level One" or the "Access Level Two," respectively.

Using Flow Filters

Interactive representation Flow filters help control the whiteboard area by allowing the user to show and hide various interactive representation primitives and flow lines. Model filters can be applied to the entire whiteboard using the options available in the view main menu option. The user can also apply filters to selected primitives using filter buttons in the toolbar area, with six such buttons included in the preferred embodiment having the names and functions listed in Table XI, below. This allows the user to show and hide flow lines and primitives that directly related to the selected primitives. To apply the filters available in the toolbar:
1) Select the primitive(s) to apply the filter to. The filters act recursively on containers and apply to all of the contents of the selected container as well.
2) Select the filter button to apply from the six buttons shown below in Table XI:

TABLE XI

I. MODEL FILTERS

| Button | Description |
| --- | --- |
| Show all inbound primitives | This model filter button exposes all primitives that are sources for data flow or navigation flow that lead to the selected primitives. |
| Show all outbound primitives | This model filter button exposes all primitives that are destinations for data flow or navigation flow that lead from the selected primitives. |
| Show all inbound flows and primitives | This model filter button exposes all the flow lines that lead to the selected primitives as well as all the primitives that are the sources for these flow lines. |
| Hide all inbound flows | This model filter button hides all the flow lines that lead to the selected primitives. |
| Show all outbound flows and primitives | This model filter button exposes all the flow lines that lead from the selected primitives as well as all the primitives that are the destinations for these flow lines. |
| Hide all outbound flows and primitives | This model filter button hides all the flow lines that lead from the selected primitives. |

Collapsing and Expanding Containers

As an interactive representation model grows, the value of whiteboard real estate increases. Collapsing and expanding containers allows the user to minimize the amount of whiteboard space occupied by the user's pages. To collapse a container:

Double click on a container name. This collapses an expanded container. Collapsed containers only display their italicized primitive name. The contents of the container and the flow lines leading in and out of the container are hidden from the whiteboard view.

Double-clicking on the italicized name of a collapsed container will expand the container to its previous state, showing all of its contents.

Hiding Interactive Representation Primitives

Similar to collapsing and expanding containers, any interactive representation primitives can be suppressed from the whiteboard view using the show and hide options available in the right-click menu. To hide a primitive, right click on the element to hide and select Hide from the menu options. Whenever a container directly contains a hidden primitives, the container name becomes italicized. Double-clicking on an italicized primitives name exposes its hidden relationships. Additionally, the user can select 'Show All' from the View main menu option to show all hidden primitives across the entire whiteboard.

Finding Primitives in the Whiteboard

The user can search the whiteboard area to find primitives based on name. To find an element in the whiteboard:
1) Press Ctrl-F or select Find from the edit menu.
2) In the find dialog, enter the text to search for.
3) Click OK to search for a primitive name that contains the given text.
4) Optionally click F3 to 'find next.'

Locking Primitives

When a primitive is locked, the user can view the primitives and its properties, but can't modify it. The user who locked the primitives is allowed to unlock it. However, if another user locked the primitives, then only that may unlock it. Locking and unlocking are applied recursively to containers. Therefore, if a user locks a container primitive, for example, a table, form, or page, all the contents of that container are also locked. The same rule applies to the unlock operation except that primitives that were locked by another user will remain locked. To lock a primitive:
1) Right click on the primitive to lock.
2) Select 'Lock' from the context menu.
3) To unlock a primitive:
4) Right click on the primitives to unlock.
5) Select 'unlock' form the context menu. If unlock is not available, then the primitives was probably locked by another user.

Selecting Multiple Primitives

Selecting multiple primitives allows the user to apply most whiteboard operations, for example, copy, move and hide, or to edit primitives properties simultaneously. To select multiple primitives on the whiteboard, the user can use the lasso or Ctrl-left-click. Use the lasso to select multiple primitives by left clicking on the gray area of the whiteboard and dragging the mouse to create a rectangle that contains the desired primitives. Alternatively, hold down the Ctrl key while clicking on the primitives to be selected.

Centering on Pages

The user may quickly scroll the whiteboard coordinates to focus on a particular page by using the 'center on' feature. To center on a page:
1) Right click on the page name in the project browser page list.
2) Select 'center on' from the context menu.

Simulating Pages from the Studio Client Application

The user can use the 'Simulate' toolbar button or the right click menu to simulate a particular page from the Studio application. To use the toolbar:
1) Select the page to be simulated by clicking on the bar, colored blue in the preferred embodiment, at the top of the page in the whiteboard.
2) Click on the 'Simulate' button in the toolbar area. The selected page will be simulated on the user's browser.

Using the Property Editor

Figure 37:
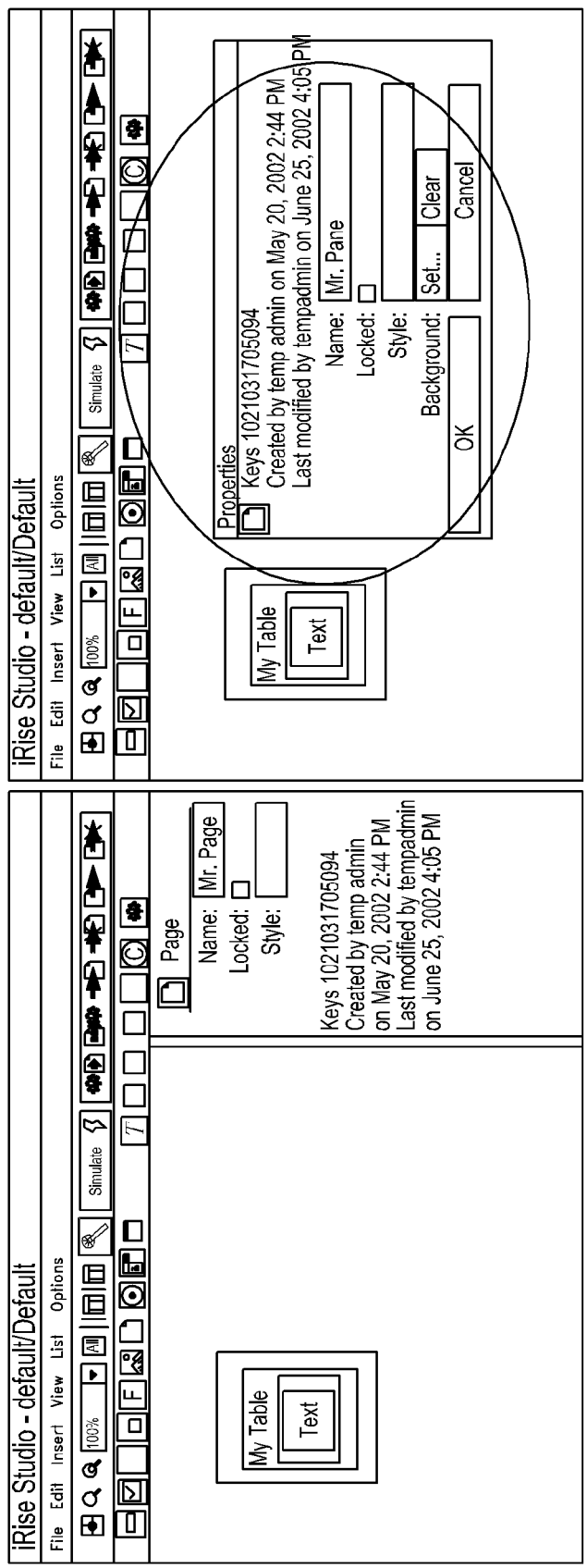
FIG. 37 displays an example of use of the property editor feature of a preferred embodiment of the present invention.

Properties allow the user to control the details of any primitives. The property editor allows the user to adjust these properties, making the interactive representation model more realistic. The property editor pane is displayed on the right side of the Studio application window. The user can drag the left border to adjust the width. When a primitive in the whiteboard is selected, the properties for that element will be displayed in the property editor pane. If the user would rather use the property editor pop-up, F7 is pressed to toggle between pane and pop-up modes. In pop-up mode, the user can access the properties for a primitive by selecting the Properties option from the right click menu or by shift-right-clicking on a primitive, as shown in FIG. 37.

Using the Project Browser

Figure 38:
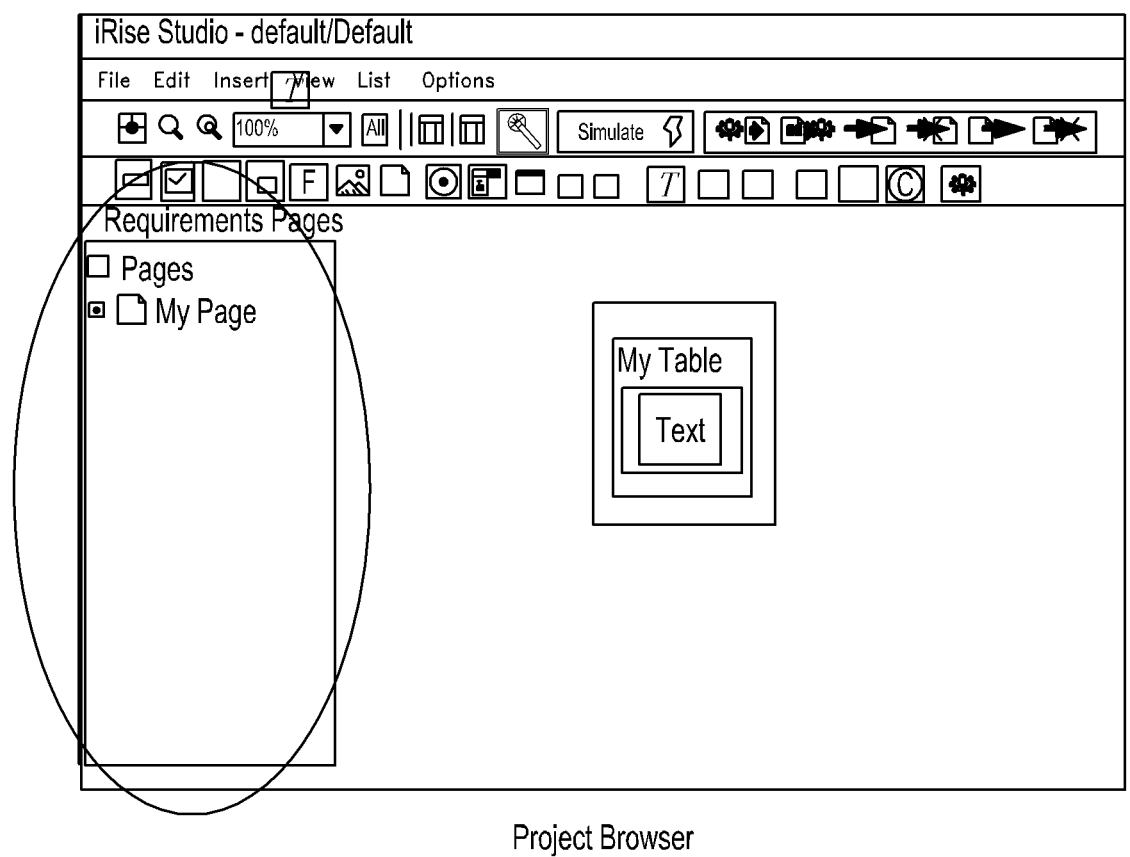
FIG. 38 displays an example of use of the project browser feature of a preferred embodiment of the present invention.
Figure 39:
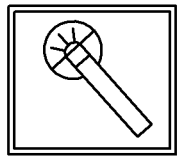
FIG. 39 is a display of an example of an icon for use in a preferred embodiment of the present embodiment.
Figure 40:
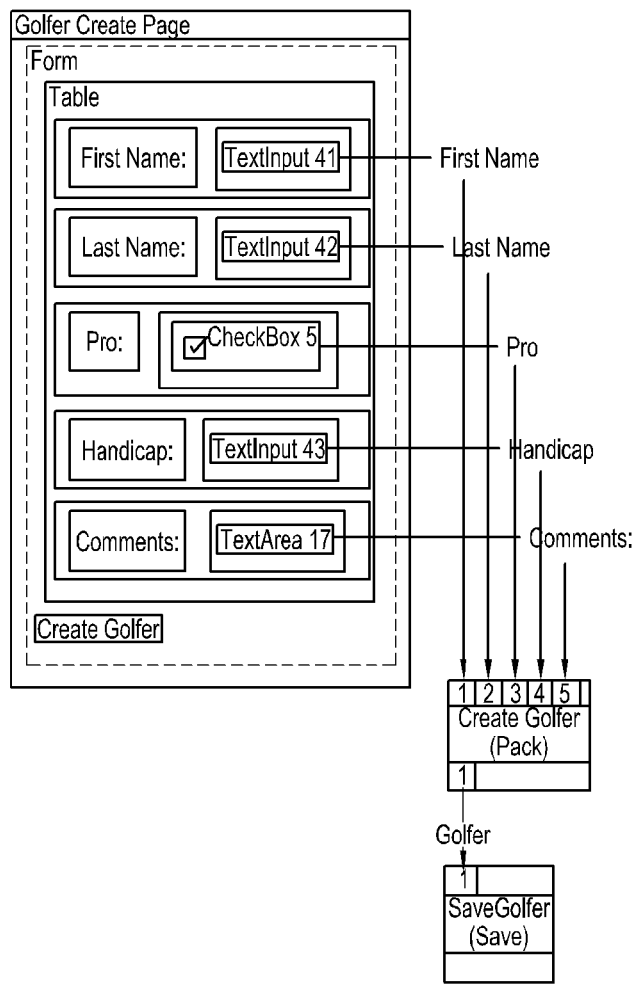
FIG. 40 is a display of an example of an IRM that accepts and saves data.
Figure 41:
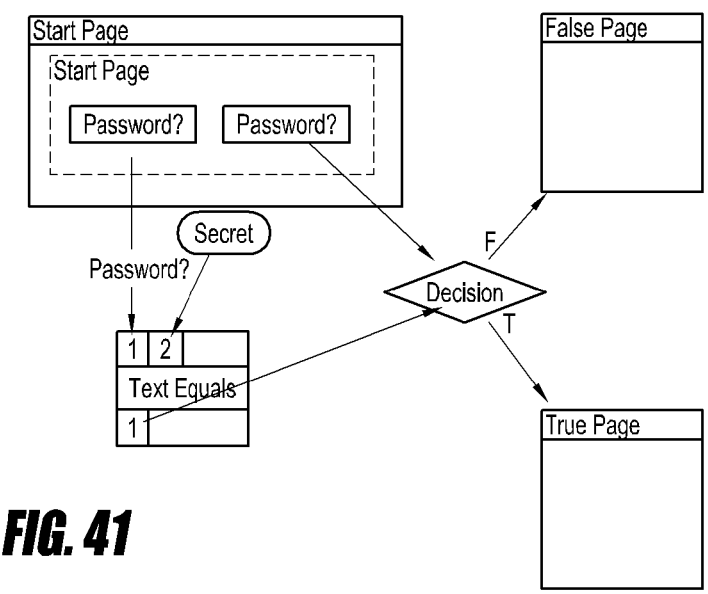
FIG. 41 is a display of an example of an IRM that checks a password.
Figure 42:
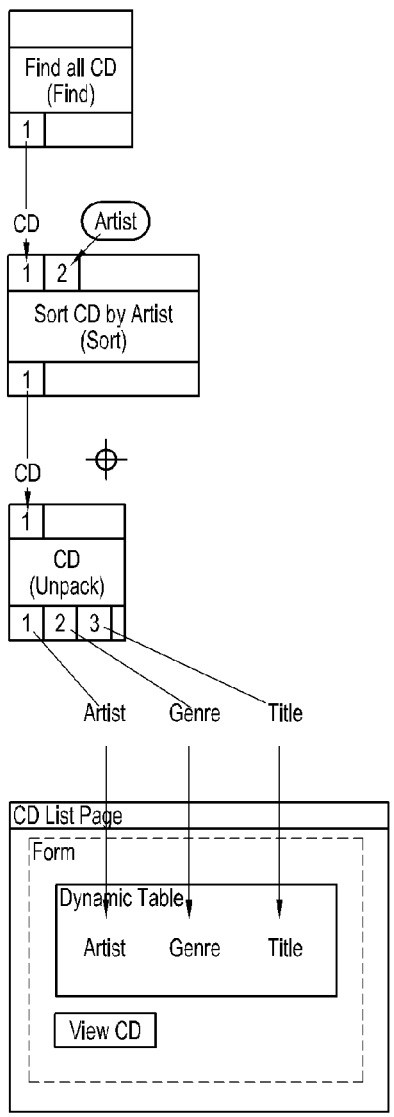
FIG. 42 is a display of an example of an IRM that displays a list of retrieved data.
Figure 43:
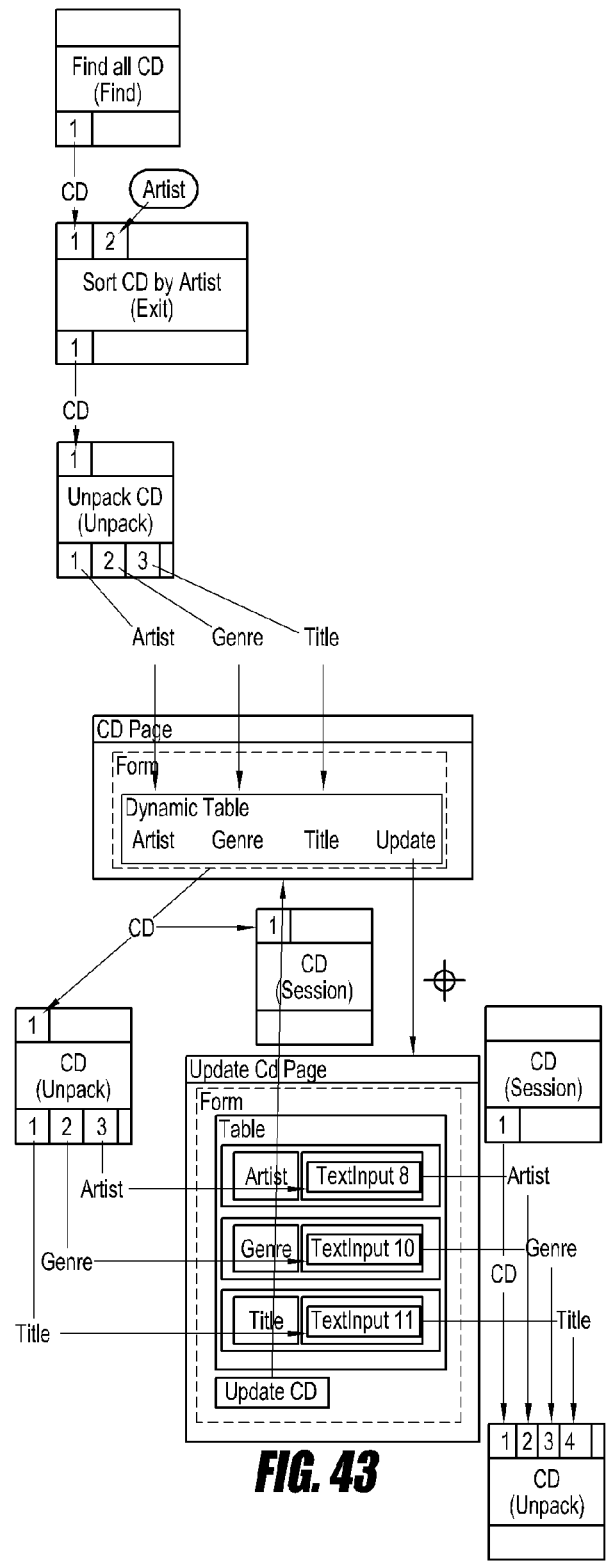
FIG. 43 is a display of an example of an IRM that displays a list of retrieved data and allows updating of that data.

With reference to FIG. 38, the user can use the project browser to access the list of requirements and the interactive representation model pages for the current application. The tabs at the top of the project browser can be used to switch between lists. The user can use F5 to toggle the project browser between on and off. Common activities executed in the project browser area include:

1) Simulating a Page
2) Centering the whiteboard on a page
3) Associating requirements to primitive
4) Finding requirements associated to a primitive
5) Filtering the requirements list.

Simulating a Page from the Project Browser

To simulate a page in project browser:
1) Click on the Pages tab in the project browser
2) Right click on the page to be simulated
3) Select 'Simulate' from the context menu.

Centering the Whiteboard on a Page from the Project Browser To center the whiteboard on a particular page:
1) Click on the Pages tab in the project browser
2) Right click on the page to be centered
3) Select 'Center On' from the right click menu
The whiteboard will automatically scroll to center on the selected page.

Associating Requirements to Primitives

A requirement is typically associated to a primitive when the requirement describes a needed or desired behavior of the subject application that the primitive represents in the interactive representation model. This association controls the presentation of requirements in the simulation Meta mode as well as their inclusion and placement on the functional specification report. This association is reflected on both the Meta mode page and the functional specification report through the use of automatically generated superscript numbers, as was previously described. To create an association between a requirement and a primitive:
1) Click on the Requirements tab in the project browser
2) Click on the desired requirement, using the (+) symbol to expand the parent classifications if necessary.
3) Right click on the primitive to be associated with the requirement.
4) Select Associate from the context menu.

To remove an association between a requirement and a primitive:
1) Click on the Requirements tab in the project browser
2) Click on the desired requirement, using the (+) symbol to expand the parent classifications if necessary.
3) Right click on the primitives to be removed from association with the requirement.
4) Select Associate from the context menu.

Finding Requirements Associated to a Primitive

To find the requirements associated to a particular primitive:
1) Click on the Requirements tab in the project browser
2) Check the checkbox labeled "for selected objects only"
3) On the whiteboard, click the primitives of interest
The requirements tab will only display the requirements associated to the selected primitives.

Finding Primitives Associated to a Requirement

To find the primitives associated to a particular requirement:
1) Click on the Requirements tab in the project browser
2) Right click on the requirement that of interest
3) Pick 'Find Associated' from the context menu.
The whiteboard will highlight and center on the first primitive that is associated to the requirement. If there is more than one primitives associated to the selected requirement, pressing F3 will find 'find next'.

Filtering the Requirements List

The filters under the List main menu option allow the user to filter the requirement list according to the Modeled attribute. To filter out requirements that are not modeled:
1) Click on List in the main menu
2) Uncheck the "not modeled" option
To filter out requirements that are modeled:
1) Click on List in the main menu
2) Uncheck the "modeled" option While the present invention has been described in connection with what is presently considered to be the most practical and preferred embodiments, it is to be understood that the invention is not to be limited to the disclosed embodiments, but to the contrary, is intended to cover various modifications and equivalent arrangements included within the spirit of the invention, which will be set forth in claims in a corresponding utility application and to be accorded the broadest interpretation so as to encompass all such modifications and equivalent structures.

What is claimed is:

1. An interactive model development system comprising:
at least one computing device; and
a non-transitory computer-readable medium having computer-executable interactive model development software including a plurality of software components stored thereon, the software components configure for execution by the at least one computing device and including at least:
a first component configured to:
provide a plurality of primitives for use in developing an interactive representation model of a proposed software application;
provide a first user interface for display via which a user can select a first primitive from the plurality of primitives, drag the first primitive to a first location in an interactive representation model design area, and drop the first primitive at the first location in the interactive representation model design area, wherein the first display primitive comprises a button primitive or an image primitive;
in response to the user's selection and dragging of the first primitive to the first location in the interactive representation model design area, cause the first primitive to appear at the first location;
provide a second user interface for display via which the user can edit properties associated with the first primitive;
in response to the user's editing of a first property associated with the first primitive, associate the edited first property with the first primitive; and
enable the user to designate the first display primitive as hidden and, in response to the user designating the first display primitive as hidden, updating the interactive representation model to include a visual indication in the interactive representation model design area that the first display primitive is in a hidden state;

a second component configured to:
  enable the user to add a first plurality of reference primitives to the interactive representation model, each of the reference primitives in the first plurality of reference primitives associated with an identifier of a first referent primitive; and
  enable the user to change a particular property of the referent primitive within the interactive model development software application such that subsequent execution of ones of the first plurality of reference primitives causes rendering of the referent primitive including the changed particular property;

a third component configured to:
  receive a text comment in association with the first primitive;
  authenticate respective members of a team to access the interactive representation model;
  enable authenticated members of the team to access and modify the interactive representation model via respective user interfaces of the interactive model development system;
  store indications of changes to the interactive representation model made by respective authenticated members;
  provide a history interactive control configured to, upon selection by the user, generate a history user interface listing changes made to the interactive representation model, a particular authenticated user that made each change, and a particular date that each change was made; and
  enable authenticated members of the team to conduct an online discussion regarding the interactive representation model, wherein the online discussion is recorded as a threaded discussion for later access by one or more members of the team;

a fourth component configured to:
  generate a browser readable version of the interactive representation model of the proposed software application in accordance with inputs received via one or more of the first and second user interfaces, the browser readable version comprising one or more HTML files that are generated without manually programming in HTML and are configured for rendering by a browser in order to:
    display in the browser a representation of the first primitive and a text comment indicator associated with the first primitive indicating that the text comment has been associated with the first primitive, wherein the text comment indicator does not include the text comment;
    in response to selection of the text comment indicator by a user of the browser, display in the browser the text comment;
    display a mode selection indicator; and
    in response to selection of the mode selection indicator, toggle between a first display mode and a second display mode of the browser readable version, wherein in the first display mode the text comment indicator is not displayed in the browser and in a second display mode the text comment indicator is displayed in the browser; and a fifth component configured to:
  provide a page selection pane providing a listing of pages of the interactive representation model;
  provide one or more page selection controls configured to allow the user to select one or more of the listed pages for inclusion in a document including a rendered image and associated text comments of each selected page of the interactive representation model, wherein the rendered image comprises a simulated view of the browser readable version of the interactive representation model and does not include the associated text comments;
  provide a comment indicator selection control configured to toggle between including and not including text comment indicators within each rendered image of the selected one or more pages, the text comment indicators representing the associated text comments; and
  generate the document in accordance with the selected one or more pages and the comment indicator selection control, wherein the document is configured for rendering in an external third party software application.

\* \* \* \* \*